US006509099B1

(12) United States Patent
Urata et al.

(10) Patent No.: US 6,509,099 B1
(45) Date of Patent: Jan. 21, 2003

(54) PHOSPHATE-TREATED STEEL PLATE

(75) Inventors: Kazuya Urata, Fukuyama (JP); Takahiro Kubota, Fukuyama (JP); Masaru Sagiyama, Fukuyama (JP); Satoru Ando, Fukuyama (JP); Tatsuya Miyoshi, Fukuyama (JP); Masaaki Yamashita, Fukuyama (JP)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 09/627,877

(22) Filed: Jul. 28, 2000

(30) Foreign Application Priority Data

| | | | |
|---|---|---|---|
| Aug. 2, 1999 | (JP) | .......................................... | 11-219209 |
| Dec. 28, 1999 | (JP) | .......................................... | 11-374904 |
| Dec. 28, 1999 | (JP) | .......................................... | 11-374905 |
| Dec. 28, 1999 | (JP) | .......................................... | 11-374906 |

(51) Int. Cl.[7] ................................................ B32B 27/00
(52) U.S. Cl. .................................................... 428/423.1
(58) Field of Search ....................................... 428/423.1

(56) References Cited

U.S. PATENT DOCUMENTS 3,970,621 A * 7/1976 Kondo et al. ............ 428/323.1
5,276,072 A * 1/1994 Ishii et al.

FOREIGN PATENT DOCUMENTS

| | | | |
|---|---|---|---|
| JP | 56-136979 | A | 10/1981 |
| JP | 58-197284 | A | 11/1983 |
| JP | 63-004916 | B | 2/1988 |
| JP | 7-138764 | A | 5/1995 |
| JP | 9-049086 | A | 2/1997 |

* cited by examiner

*Primary Examiner*—Terressa M. Boykin
(74) *Attorney, Agent, or Firm*—Frishauf, Holtz, Goodman & Chick, P.C.

(57) ABSTRACT

A phosphate-treated steel plate comprises a zinc-base plated steel plate; a zinc phosphate coating layer formed on the surface of the zinc-base plated steel plate; and an organic or inorganic coating formed on the zinc phosphate coating layer. The organic coating comprises at least one organic resin selected from the group consisting of an ethylene-base resin, an epoxy-base resin, a urethane-base resin, and an acrylic-base resin. The inorganic coating comprises a phosphate coating consisting mainly of a phosphate.

59 Claims, No Drawings

PHOSPHATE-TREATED STEEL PLATE

BACKGROUND OF THE INVENTION

1. Field of the Invention

The present invention relates to a phosphate-treated steel plate with a substrate of zinc-base plated steel plate, which is used for body plates of automobiles and for household electric appliances, and the like.

2. Description of the Related Arts

Main stream of surface-treated steel plates for body plates of automobiles in prior art was electrolytic Zn—Ni alloy plated steel plates, organic composite coating steel plates (electrolytic Zn—Ni alloy plating+chromate coating+ organic coating), and alloyed hot dip galvanized steel plates. In recent years, automobile manufacturers have tried to use inexpensive 100% zinc plated steel plates as the body plates of automobiles in view of cost reduction. The 100% zinc plated steel plates have, however, a plating layer in soft and with low melting point, so that the 100% zinc plated steel plates tend to induce fusion between plating layer and tool during press-forming, which raises a problem of easy occurrence of press-crack at portions of complex shapes. Accordingly, development of materials having superior lubrication performance was waited. In this regard, there have been introduced responding technologies given below.

(1) JP-A-7-138764, (the term "JP-A-" referred to herein signifies "Unexamined Japanese Patent Publication"), (hereinafter referred to as the "Prior Art 1"), discloses a zinc phosphate-treated steel plate which comprises: a zinc-containing metal plated steel plate; a zinc phosphate coating layer having a specified weight ratio of zinc to phosphorus and having a specified weight ratio of a specified metal, formed on the zinc-containing metal plated plate; and a lubricant oil layer on the zinc phosphate coating layer.

(2) JP-A-9-049086, (hereinafter referred to as the "Prior Art 2"), discloses a method for manufacturing an electroplated steel plate having high whiteness degree and excellent coatability, which method comprises the step of treating an electrolytically galvanized steel plate using a treatment solution containing specified amount of phosphoric acid ion, zinc ion, magnesium ion, nickel ion, and other ions, under a specified condition.

The zinc phosphate-treated steel plates which are disclosed in above-given Prior Arts 1 and 2 show an improvement in lubrication to some degree. The improvement effect is, however, not a satisfactory level. Furthermore, the zinc phosphate coating on these steel plates has a porous structure, so that the steel plates show poor corrosion resistance at portions where the electrodeposition coating cannot fully cover and where substrate steel plate is likely left exposed even after the electrodeposition coating, which portions include flange section and hem section observed at joints of body plates of automobiles. In addition, the electroplated steel plates which are manufactured by the technology disclosed in the Prior Art 2 give not satisfactory level of coating adhesiveness and of post-coating corrosion resistance in the case of two or more coating layers which are applied to the steel plates for body plates of automobiles.

As for the technology to improve the corrosion resistance of zinc phosphate-treated steel plates, prior art in the household electric appliances applied the zinc phosphate treatment followed by sealing treatment using a chromate-base aqueous solution. The conventional sealing technology for the zinc phosphate-treated steel plates uses hexavalent chromium which is a substance under environmental regulations. Therefore, technology which does not use chromium was wanted. Responding to the need, the following-listed technologies have been proposed.

(3) JP-A-56-136979, (hereinafter referred to as the "Prior Art 3"), discloses a treatment method applying phosphate treatment to a cold-rolled steel plate or a galvanized steel plate, then immediately applying a post-treatment using a treatment solution consisting mainly of a chelating agent.

(4) JP-A-58-197284, (hereinafter referred to as the "Prior Art 4"), discloses a method of treament before coating for zinc-base plated steel plates, which method comprises the steps of: applying phosphate treatment to the zinc plated steel plates, then applying treatment using an aqueous solution containing a polyacrylic acid and a aromatic polyhydric alcohol.

(5) JP-B-63-4916, (the term "JP-B-" referred to herein signifies "Examined Japanese Patent Publication"), (hereinafter referred to as the "Prior Art 5"), discloses a composite plated steel plate having excellent durability, which steel plate comprises a steel plate, a Zn—Ni alloy plating, a phosphoric acid coating at coating weights of from 1 to 2 g/m$^2$ on the Zn—Ni alloy plating, and a polymer coating having thicknesses of from 5 to 10 $\mu$m on the phosphoric acid coating.

The above-described conventional zinc phosphate-treated steel plates have, however, problems given below. That is, the zinc phosphate-treated steel plates in the Prior Arts 3 and 4 use ordinary zinc phosphate coating, so that these steel plates have no coating adhesiveness that is required as the steel plates for automobiles. In addition, the organic sealing which is disclosed in these prior arts is dissolved or degraded owing to the contact with alkaline or acidic solution met in the process of automobile body assembly: [shearing→pressing→welding alkali degreasing→chemical conversion electrodeposition coating→intermediate coating and top coating]. As a result, the corrosion resistance of these steel plates is poor.

The zinc phosphate-treated steel plate of the Prior Art 5 uses ordinary zinc phosphate coating, similar with that of the Prior Arts 3 and 4, so that the steel plate has no coating adhesiveness that is required as the steel plates for automobiles. In addition, since the organic coating is very thin, 5 to 10 $\mu$m, the spot welding is very difficult, and the coating is easily peeled during the press-forming stage owing to the bending and unbending at bead portions, (resulting in poor anti-powdering performance), further the peeled coating degrades the lubricant performance, which results in poor press-formability.

Consequently, prior arts fail to satisfy all of the required performance of: corrosion resistance, anti-powdering performance, lubrication, coating adhesiveness, and weldability.

SUMMARY OF THE INVENTION

An object of the present invention is to provide an environmentally friendly surface-treated steel plate which has excellent corrosion resistance, anti-powdering performance, lubrication, coating adhesiveness, and weldability, and which contains no chromium.

To achieve the above-given object, the present invention provides a phosphate-treated steel plate which comprises: a zinc-base plated steel plate; a zinc phosphate coating layer formed on the surface of the zinc-base plated steel plate; and an organic coating formed on the zinc phosphate coating layer.

The zinc phosphate coating layer contains at least one substance selected from the group consisting of nickel, manganese, and magnesium, at coating weights of from 0.2 to 2.5 g/m$^2$.

The organic coating consists of at least one organic resin selected from the group consisting of an ethylene-base resin, an epoxy-base resin, a urethane-base resin, and an acrylic-base resin.

The epoxy-base resin is preferably a block urethane-modified resin prepared by mixing a modified epoxy resin (A) comprising an epoxy resin, a multifunctional amine, and a monoisocyanate, and a block urethane (B) comprising a polyol, a polyisocyanate, and a block agent, at mixing rates (A/B) of from 95/5 to 50/50 (weight ratio of nonvolatile matter).

The epoxy-base resin is preferably an epoxy-base resin prepared by mixing 5 to 80 parts by weight (solid content) of a polyisocyanate compound having at least two isocyanate groups in a single molecule thereof, and 100 parts by weight (solid content) of a substrate resin in which at least one basic nitrogen atom and at least two primary hydroxide groups are added to a terminal of the molecular chain of the epoxy resin.

The present invention provides a phosphate-treated steel plate which comprises: a zinc-base plated steel plate; a zinc phosphate coating formed on the zinc-base plated steel plate; and a phosphate coating formed on the zinc phosphate coating.

The zinc phosphate coating consists mainly of zinc phosphate. The phosphate coating consists mainly of a phosphate of at least one metal selected from the group consisting of Mg, Al, Co, Mn, and Ca.

DESCRIPTION OF THE PREFERRED EMBODIMENT

Preferred Embodiment 1

The inventors of the present invention investigated the zinc phosphate composite treated steel plates focusing on the relation of coating in terms of structure, corrosion resistance, anti-powdering performance, lubrication, coating adhesiveness, and weldability. Thus, the investigation derived the following-described findings.

(1) As for the improvement in corrosion resistance, coating adhesiveness, lubrication, and anti-powdering performance, it is effective to optimize the composition of zinc phosphate which forms the first layer, and to establish a dual-layer structure which comprises the zinc phosphate coating and an organic coating consisting mainly of a specified organic resin as the top layer for sealing.

(2) The corrosion resistance is further improved by adding a specified rust-preventive additive at a specified amount to the organic coating, without degrading the lubrication, the coating adhesiveness, and the weldability.

(3) The lubrication and the anti-powdering performance are further improved by adding a specified lubricant at a specified amount to the organic coating, without degrading the coating adhesiveness and the weldability.

(4) The lubrication, the corrosion resistance, the coating adhesiveness, the weldability, and the anti-powdering performance are improved by optimizing the coating weight of the zinc phosphate coating as the first layer and of the organic coating as the second layer.

The present invention was established on the basis of above-described findings, and the present invention is characterized in the constitution described in the following.

That is, the present invention provides a zinc phosphate composite treated steel plate having excellent corrosion resistance, anti-powdering performance, lubrication, and coating adhesiveness, which steel plate comprises: a zinc-base plated steel plate; a first layer of zinc phosphate coating layer having coating weights of from 0.2 to 2.5 g/m$^2$, containing at least one substance selected from the group consisting of nickel, manganese, and magnesium, formed on the surface of the zinc-base plated steel plate; and a second layer of an organic coating consisting mainly of at least one organic resin selected from the group consisting of an ethylene-base resin, an epoxy-base resin, a urethane-base resin, and an acrylic-base resin, formed on the zinc phosphate coating layer.

The content of at least one substance selected from the group consisting of nickel, manganese, and magnesium, in the zinc phosphate coating is preferably in a range of from 0.5 to 8.5 mass % as the total thereof.

The organic coating as the second layer preferably contains a solid lubricant and/or a rust-preventive additive as components other than the organic resin.

The rust-preventive additive is preferably at least one substance selected from the group consisting of a silica and a phosphate. The silica is preferably at least one substance selected from the group consisting of ion-exchanged silica, fumed silica, and colloidal silica. Furthermore, the ion-exchanged silica is preferably Ca-exchanged silica.

The phosphate is preferably at least one substance selected from the group consisting of a phosphate of calcium, aluminum, and zinc.

The solid lubricant is preferably at least one substance selected from the group consisting of polyethylene wax, tetrafluoroethylene resin, and boron nitride. The average particle size of the solid lubricant is preferably in a range of from 0.05 to 25 μm. The polyethylene wax preferably has a softening point in a range of from 100 to 135° C.

The content of the rust-preventive additive in the organic coating is preferably in a range of from 1 to 100 parts by weight as solid content to 100 parts by weight of the organic resin. And the content of the solid lubricant is preferably in a range of from 1 to 80 parts by weight as solid content to 100 parts by weight of the organic resin.

The coating weight of the organic coating film is preferably in a range of from 0.05 to 1.5 g/m$^2$.

As the uppermost layer, a rust-preventive oil film layer as the third layer is preferably formed at coating weights of from 0.01 to 10 g/m$^2$.

The surface-treated steel plates according to the present invention are applicable not only to automobiles and household electric appliances, but also to building materials and the like.

The detail of the present invention is described in the following giving the reasons to limit the specification.

The steel plates which become the substrate of the zinc-base plated steel plates according to the present invention include: all kinds of cold-rolled steel plates for soft-working, such as cold-rolled steel plates for general working (CQ), cold-rolled steel plates for deep drawing (DQ), cold-rolled steel plates for very deep drawing (DDQ), and cold-rolled steel plates for ultra deep drawing (EDDQ); all kinds of high tension steel plates ranging from high tension steel plates of relatively low strength level having baking-hardening property to general high tension steel plates having more than 390 MPa of tensions; and de-scaled hot-rolled steel plates.

Examples of the plating layers of the zinc-base plated steel plates are Zn plating, Zn—Ni alloy plating (10 to 15 mass % of Ni content), Zn—Fe ally plating (5 to 25 mass % or 60 to 90 mass % of Fe content), Zn—Mn alloy plating (30 to 80 mass % of Mn content), Zn—Co alloy plating (0.5 to 15 mass % of Co), Zn—Cr ally plating (5 to 30 mass % of Cr), Zn—Al alloy plating (3 to 60 mass % of Al content). Each of the above-given plating compositions may further include alloying element such as Co, Fe, Ni, and Cr, and oxide or salt of silica, alumina, slightly soluble chromate, or the like, and polymer. Among the above-described plating layers, two or more layers of the same kind or different kind may be applied to form a composite layer.

The plated steel plate may be the one prepared by applying plating of Ni or the like at a small coating weight onto the steel plate, followed by applying various kinds of plating given above.

The various kinds of plating described above may be formed by either one of electrolytic method, fusion method, and vapor phase method. A preferred coating weight of plating is not less than 10 g/m$^2$. Less than 10 g/m$^2$ of coating weight induces problems because of poor corrosion resistance. In the case of Zn—Ni alloy plating, Zn—Fe alloy plating, Zn—Mn alloy plating, Zn—Co alloy plating, and Zn—Cr alloy plating, the anti-powdering performance degrades when the coating weight exceeds 60 g/m$^2$, so the coating weight is preferably in a range of from 10 to 60 g/m$^2$. For further improved corrosion resistance and anti-powdering performance, the coating weight is preferably in a range of from 15 to 60 g/m$^2$.

To prevent generation of film defects and irregularity on the surface of the zinc phosphate composite coating on the plating film, which processing is described later, it is possible to apply treatment of alkaline degreasing, solvent degreasing, and surface preparation treatment on the plating film, in advance. These pre-treatments include (1) the treatment using an acidic or alkaline aqueous solution containing at least one metallic ion selected from the group consisting of Ni ion, Co ion, and Fe ion, (2) the treatment contacting with a titanium colloid aqueous solution, and (3) the treatment to etch the top layer of the metallic oxide formed on the surface of the plated steel plate using an inorganic acid, an organic acid, or a cheleting compound such as EDTA and NTA. The effect of the present invention is available with any of these kinds of steel plates as the substrate.

On the above-described zinc-base plated steel plates, a zinc phosphate coating is formed as the first layer, and an organic coating is formed as the second layer on the first layer. The zinc-phosphate coating of the first layer improves the coating adhesiveness owing to the anchor effect, and contributes to the improvement of lubrication by preventing the direct contact between the steel plate and the tools during sliding actions.

According to the present invention, a zinc phosphate coating containing at least one substance selected from the group consisting of nickel, manganese, and magnesium is applied. The coating exists presumably in a form that a portion of zinc in the zinc phosphate coating is substituted by the above-described metal contained in the coating. That form of coating induces the interaction with the organic coating as the top layer, thus providing excellent corrosion resistance, anti-powdering performance, lubrication, and coating adhesiveness.

The content of at least one substance selected from the group consisting of nickel, manganese, and magnesium, in the zinc phosphate coating is preferably in a range of from 0.5 to 8.5 mass % as the total. By specifying the total content of these metals in the coating in that range, the corrosion resistance, the lubrication, and the coating adhesiveness are further improved. When particularly superior corrosion resistance and coating adhesiveness are required, it is more preferable to specify the total content of nickel, manganese, and magnesium to a range of from 3 to 6 mass %. The corrosion resistance and the coating adhesiveness are drastically improved by the coexistence of nickel and manganese, nickel and magnesium, or nickel and manganese and magnesium, in the zinc phosphate coating.

The coating weight of the zinc phosphate coating as the first layer is preferably in a range of from 0.2 to 2.5 g/m$^2$. If the coating weight thereof is less than 0.2 g/m$^2$, the coating adhesiveness and the corrosion resistance degrade. If the coating weight thereof exceeds 2.5 g/m$^2$, the spot weldability degrades, and the powdering under sliding condition increases, and the lubrication also degrades. In view of lubrication, coating adhesiveness, corrosion resistance, and weldability, more preferable range of coating weight is from 0.5 to 1.5 g/m$^2$, and most preferably from 0.5 to 1.0 g/m$^2$. The method of zinc phosphate treatment for forming the zinc phosphate coating may be either one of reaction type treatment, coating type treatment, and electrolytic type treatment.

An example of the reaction type treatment is that a plated steel plate is subjected to degreasing, washing with water, and surface preparation treatment, followed by contacting with a treatment solution of an aqueous solution consisting mainly of: phosphoric acid ion, nitric acid ion, and zinc ion, and at least one substance selected from the group consisting of nickel ion, manganese ion, and magnesium ion; further containing, at need, (1) and (2) given below, then washing with water and drying.

(1) At least one substance selected from the group consisting of iron ion, cobalt ion, and calcium ion.

(2) At least one substance selected from the group consisting of peroxide, fluoride ion, fluorine complex ion, and nitrous acid ion.

Regarding the coating type treatment, at least one side of the plated steel plate is coated with a zinc phosphate treatment solution consisting mainly of phosphoric acid ion, nitric acid ion, and zinc ion, and at least one substance selected from the group consisting of nickel ion, manganese ion, and magnesium ion. Any kind of coating method is applicable. That is, coating by roll-coater method, coating by immersion method or spray method followed by applying air-knife method or roll-squeezing method to adjust the coating weight may be used. After coating a zinc phosphate treatment solution onto the surface of the plated steel plate, drying may be given using a drier, a hot air furnace, a high frequency induction heating furnace, or an infrared furnace to form the zinc phosphate coating.

The drying temperature is preferably in a range of from 70 to 400° C. as the ultimate plate temperature. If the drying temperature is less than 70° C., the drying of coating becomes insufficient, which induces stickiness of the coating and degradation in coating adhesiveness, and induces irregular coating on forming the organic coating of the second layer. If the ultimate plate temperature exceeds 400° C., the effect saturates, which not only is uneconomical but also degrades corrosion resistance owing to the tendency of defect occurrence in coating. Accordingly, more preferable baking temperature is in a range of from 100 to 300° C., and most preferable one is from 120 to 170° C.

The organic coating formed as the second layer on the zinc phosphate coating is described below. According to the present invention, the organic coating formed on the above-described zinc phosphate coating is an organic coating consisting mainly of at least one organic resin selected from the group consisting of an ethylene-base resin, an epoxy-base resin, a urethane-base resin, and an acrylic-base resin. By using these resins, the favorable coating adhesiveness and corrosion resistance are attained. Examples of these resins are the following.

Examples of the ethylene-base resin are: an ethylene-base copolymer such as ethylene-acrylic acid copolymer, ethyelen-methacrylic acid copolymer, and carboxyl-modified polyolefin resin; an ethylene-unsaturated carboxylic acid copolymer; an ethylene-base ionomer; and resins prepared by modifying those resins with alkyd resin, epoxy resin, phenolic resin, and the like.

Examples of the epoxy resin are: aromatic epoxy resins which are prepared either by introducing glycidyl group through the reaction between a polyphenol such as Bisphenol A, Bisphenol B, Bisphenol F, and novorak type phenol and an epihalohydrin such as epichlorohydrin, or by increasing their molecular weight through further reaction between the product of glycidyl group-introduction reaction and a polyphenol; aliphatic epoxy resins; and alicyclic epoxy resins. Among these epoxy resins, particularly when film-forming is required at a low temperature, the epoxy resins having not less than 1,500 of average molecular weight are preferred.

In addition, resins prepared by reacting various kinds of modifiers with the epoxy group or the hydroxyl group in the above-described epoxy resins may be applied. Examples of these resins are: an epoxy-ester resin prepared by reacting with a drying oil fatty acid; an epoxy-acrylate resin prepared by modifying using a polymerizable unsaturated monomer component containing acrylic acid, methacrylic acid, and the like; a urethane-modified epoxy resin prepared by reacting with an isocyanate compound; a polybasic acid-modified epoxy resin; an acrylic resin-modified epoxy resin; an alkyd (or polyester)-modified epoxy resin; a polybutadiene-modified epoxy resin; a phenol-modified epoxy resin; and an amine or polyamine-modified epoxy resin.

Examples of the acrylic-base resin are: polyacrylic acid and its copolymer; polyacrylic acid ester and its copolymer; polymethacrylic acid and its copolymer; polymethacrylic acid ester and its copolymer; urethane-acrylic acid copolymer (or urethane-modified acrylic resin); styrene-acrylic acid copolymer; and resins prepared by modifying those resins with other alkyd resin, epoxy resin, phenol resin, and the like.

Examples of the urethane-base resin are: a polycarbonate-base polyurethane resin; a polyester-base polyurethane resin; and a polyether-base polyurethane resin.

According to the present invention, the above-described organic resins may be applied separately or mixing two or more of them. When particularly superior coating adhesiveness and corrosion resistance are required, it is preferred to use an epoxy-base resin, an ethylene-base resin, or an acrylic-base resin. These organic resins may be either one of water-soluble type, water-dispersing type, organic solvent-soluble type, and organic solvent-dispersing type.

According to the present invention, the organic coating may include a rust-preventive additive or a solid lubricant, or both of them, at need.

When particularly superior corrosion resistance is required, the addition of a rust-preventive additive is effective. Examples of preferred rust-preventive additive according to the present invention are a silica, a phosphate, a molybdate, a phosphomolybdate (for example, aluminum phosphomolybdate), an organic phosphoric acid and its salt (for example, phytic acid, phosphonic acid, and their metallic salt, alkali metal salt, alkali earth metallic salt); an organic inhibitor (for example, hydrazine derivative, thiol compound). These rust-preventive additives may be used separately or mixing two or more of them.

Among these rust-preventive additives, silica and phosphate are more preferable. Examples of the silica are ion-exchanged silica prepared by fixing a metallic ion of calcium, magnesium, and the like, onto the surface of the porous silica gel powder; fumed silica; colloidal silica; and organosilica sol. These silicas may be used separately or two or more of them together. Among these silicas, more preferable ones are the ion-exchanged silica, the fumed silica having primary particle sizes of from 5 to 50 nm, and the colloidal silica, and most preferable one is the calcium ion-exchanged silica having 1 mass % or more of calcium concentration.

The phosphate according to the present invention is not limited by the skeleton and the degree of condensation of the phosphoric acid ions, and it may be either one of normal salt, dihydrogen salt, monohydrogen salt, and phosphite. The normal salt includes orthophosphate, all kinds of condensed phosphate such as polyphosphate (for example, zinc phosphate, calcium phosphate, aluminum dihydrogen phosphate, zinc phosphate). Among them, more preferable ones are at least one phosphate selected from the group consisting of phosphate of zinc, of calcium, and of aluminum. Use of above-given silica and phosphate together provides particularly superior corrosion resistance.

According to the present invention, mixing a solid lubricant in the organic coating provides further superior lubrication performance. Examples of the solid lubricant preferred in the present invention are the following.

(1) Polyolefin wax, paraffin wax: for example, polyethylene wax, synthesized paraffin, micro wax, chlorinated hydrocarbon.

(2) Fluororesin-base wax: for example, polyfluoroethylene resin (polytetrafluoroethylene resin), polyfluorovynil resin, polyfluorovinylidene resin.

(3) Fatty acid amid-base compounds: for example, stearic acid amide, palmitic acid amide, methylene bis-stearoamide, ethylene bis-stearoamide, oleic acid amide, ethyl acid amide, alkylene bis-fatty acid amide.

(4) Metallic soaps: for example, calcium stearate, zinc stearate, calcium laurate, calcium palmitate.

(5) Metallic sulfides: for example, molybdenum disulfide, tungsten disulfide.

(6) Other: for example, graphite, graphite fluoride, boron nitride.

When particularly superior lubrication is required, it is preferable to use at least one compound selected from the group consisting of polyethylene wax, polytetrafluoroethylene resin, and boron nitride. Use of polyethylene wax and polytetrafluoroethylene resin together provides further superior lubrication performance.

The average particle size of the solid lubricant is preferably in a range of from 0.05 to 25 $\mu$m. If the particle size is less than 0.05 $\mu$m, the surface concentration of the lubricant is enriched to widen the occupied area of lubricant on the uppermost surface layer of the organic coating, which degrades the coating adhesiveness. On the other hand, if the particle size exceeds 25 $\mu$m, the lubricant separates from the organic coating, which fails to attain the required lubrication, also results in poor corrosion resistance. To obtain excellent coating adhesiveness, corrosion resistance, lubrication, and anti-powdering performance, the average particle size is preferably in a range of from 1 to 15 $\mu$m, and most preferably from 3 to 10 $\mu$m. By regulating the softening point of polyethylene wax to a range of from 100 to 135° C., more preferably from 110 to 130° C., the lubrication and the anti-powdering performance are further improved.

A preferable content of lubricant and/or rust-preventive additive in the organic coating is in a range of from 1 to 100 parts by weight of the rust-preventive additive as solid content to 100 parts by weight of the organic resin, and in a range of from 1 to 80 parts by weight of the solid lubricant as solid content to 100 parts by weight of the organic resin.

If the content of the rust-preventive additive is less than 1 part by weight to 100 parts by weight of the organic resin, the improvement in corrosion resistance becomes insufficient. If the content of the rust-preventive additive exceeds 100 parts by weight to 100 parts by weight of the organic resin, the coating adhesiveness and the lubrication degrade. Accordingly, a preferable range of the content is from 10 to 80 parts by weight, most preferably from 20 to 70 parts by weight, in view of coating adhesiveness, lubrication, and corrosion resistance.

On the other hand, if the content of the solid lubricant is less than 1 part by weight to 100 parts by weight of the organic resin, the improvement effect of the lubrication is not sufficient. If the content exceeds 80 parts by weight, the coating adhesiveness and the corrosion resistance degrade. Thus, a preferable range of the content is from 3 to 50 parts by weight, and most preferably from 5 to 35 parts by weight, in view of coating adhesiveness, lubrication, and corrosion resistance.

The organic coating according to the present invention consists mainly of the above-described organic resin and, at need, the rust-preventive additive and/or the solid lubricant. Adding to those components, other components may further be added to the organic coating unless they do not give bad influence to the quality and performance of the organic coating. Examples of other applicable components are: an organic resin (for example; alkyd-base resin; fluorine-base resin; acrylic-silicone resin; silicone resin, phenol-base resin; melamine-base resin, amino-base resin); fine oxide particles such as those of alumina and zirconia; a conductive pigment; a color pigment (for example, condensed polycyclic organic pigment, phthalocyanine-base pigment); a color dye (for example, azo-base dye, azo-base metallic complex salt dye); a curing agent (for example, polyamine-base curing agent, acid anhydride curing agent, methylol group-contained initial condensate, polyisocyanate compound having at least two isocyanate groups in a single molecule); a film-forming assistant; a dispersion-improving agent; and a defoaming agent. These other components may be added separately or two or more thereof together.

A preferable range of coating weight of the organic coating is from 0.05 to 1.5 g/m$^2$. If the coating weight is less than 0.05 g/m$^2$, the corrosion resistance and the lubrication degrade. If the coating weight exceeds 1.5 g/m$^2$, the weldability degrades. Thus, a preferable range of the coating weight is from 0.1 to 1.0 g/m$^2$, and most preferably from 0.2 to 0.6 g/m$^2$, in view of lubrication, corrosion resistance, coating adhesiveness, and weldability.

According to the present invention, the method for forming the organic coating comprises the steps of: applying a coating composition consisting mainly of the above-described organic resin and, at need, the above-described rust-preventive additive and/or the lubricant on to at least one side of the surfaces of the steel plate coated with the above-described zinc phosphate coating; drying the coating composition to form the coating. Before applying the coating composition, it is possible to arbitrarily give a preliminary treatment such as washing with water and drying the steel plate on which the zinc phosphate coating was formed.

Any type of method for applying the coating composition onto the steel plate may be adopted. Normally, the application is done by roll-coater method. However, it is possible to, after applying by immersion method and spray method, adjust the coating weight by air-knife method or roll-squeezing method.

The drying after applied the coating composition may be done by a drier, a hot-air furnace, a high frequency induction heating furnace, or an infrared furnace. A preferred drying temperature is in a range of from 50 to 300° C. as the ultimate plate temperature. If the drying temperature is lower than 500° C., the coating is insufficiently dried to induce stickiness on the coating, and the coating is damaged on touching to rolls after drying, which degrades the coating adhesiveness, the corrosion resistance, and the lubrication performance. If the ultimate plate temperature exceeds 300° C., further effect cannot be expected, and the production cost becomes unfavorable. In this respect, a preferable range of baking temperature is from 100 to 200° C., most preferably from 120 to 170° C.

The present invention deals with a steel plate having the above-described coating structure on both sides or on one side thereof. Consequently, examples of the mode for carrying out the present invention are the following.

| | |
|---|---|
| (1) One side | :Steel plate surface + Zinc phosphate composite coating + Organic coating |
| The other side | :Steel plate surface + Zinc phosphate composite coating |
| (2) One side | :Steel plate surface + Zinc phosphate composite coating + Organic coating |
| The other side | :Steel plate surface |
| (3) Both sides | :Steel plate surface + Zinc phosphate composite coating + Organic coating |

According to the present invention, the organic coating may further be covered with a rust-preventive oil layer as the third layer. The rust-preventive oil consists mainly of a rust-preventive additive (for example, oil-soluble surfactant), a petroleum-base base material (for example, mineral oil, solvent), an oil film adjuster (for example, mineral oil, crystallizing material, a viscous material), an antioxidizing agent (for example, phenol-base antioxidant), a lubricant (for example, extreme-pressure additive). Examples of the rust-preventive oil are a normal rust-preventive oil, a cleaning rust-preventive oil, a lubrication rust-preventive oil. Examples of the normal rust-preventive oil are a finger print removal type rust-preventive oil which is prepared by dissolving and decomposing a base material in a petroleum-base solvent, a solvent cutback type rust-preventive oil, a lubricant oil type rust-preventive oil using petrolactam and wax as the base materials, and a volatile rust-preventive oil.

A preferable coating weight of the rust-preventive oil film is in a range of from 0.01 to 10 g/m$^2$. If the coating weight is less than 0.01 g/m$^2$, the effect of rust-preventive oil application cannot be attained. If the coating weight exceeds 10 g/m$^2$, the degreasing ends insufficiently, which results in poor coating adhesiveness. For attaining further superior corrosion resistance and coating adhesiveness, the coating weight is preferably in a range of from 0.5 to 3 g/m$^2$.

Embodiments

Cold-rolled steel plates each having a plate thickness of 0.7 mm and a surface roughness (Ra) of 1.0 μm were used to prepare plated steel plates by applying plating of zinc-base coating. Thus prepared plated steel plates were subjected to alkali degreasing, washing with water, and surface preparation treatment, then were brought into contact with a zinc phosphate treatment solution, followed by washing with water and drying, thus obtaining the zinc phosphate-treated steel plates. Onto the zinc phosphate-treated steel plates, respective coating compositions were applied using the roll coater method, which were then dried without washing with water. Then, a rust-preventive oil or a cleaning oil was applied to the dried steel plates. The obtained surface-treated steel plates were tested to determine lubrication performance, anti-powdering performance, coating adhesiveness, and weldability. Individual conditions are described below.

EXAMPLE 1

(1) Plated Steel Plates

Table 1 shows the kinds of plating and the coating weights applied onto the zinc-base plated steel plates used in Example 1.

(2) Zinc Phosphate Composite Treatment

Each of the plated steel plates was treated by degreasing and washing with water to clean the surface. The composition, the treatment temperature, and the treatment time for the surface-preparation solution and the zinc phosphate treatment solution were adjusted. The zinc phosphate composite-treated steel plates listed in Table 2 were prepared, each of which gives different coating weight and coating composition. The following is an example of the method for preparing the zinc phosphate-treated steel plates.

[Zinc Phosphate Composite Coating Steel Plate 1]

A plated steel plate (A in Table 1) was treated by degreasing (FCL 4480, produced by Nihon Parkerizing Co., Ltd., 18 g/litter (hereinafter denote to "g/l"), 45° C., 120 seconds spraying), then by washing with water (20 seconds spraying). The steel plate was further treated by surface preparation treatment (PREPAREN Z, produced by Nihon Parkerizing Co., Ltd., 1.5 g/l, room temperature, 2 seconds spraying). Thus treated steel plate was immersed in a zinc phosphate treatment solution (described below) at 45° C. for 1 second, followed by washing with water and drying, to obtain the zinc phosphate composite coating steel plate 1.

| [Zinc phosphate treatment solution 1] | |
|---|---|
| Phosphoric acid ion | :20 g/l |
| Nitric acid ion | :3 g/l |
| Fluorine ion | :1.5 g/l |
| Zinc ion | :1.3 g/l |
| Nickel ion | :0.5 g/l |
| Manganese ion | :0.5 g/l |
| Nitrite ion | :0.3 g/l |
| Acid ratio (total acid/free acid) | :21 |

[Zinc Phosphate Composite Coating Steel Plate 2]

The same treatment as in the zinc phosphate composite coating steel plate 1 was applied except that the plated steel plate of above-described zinc phosphate composite coating steel plate 1 was B in Table 1 instead of A in Table 1.

[Zinc Phosphate Composite Coating Steel Plate 3]

The same treatment as in the zinc phosphate composite coating steel plate 1 was applied except that the plated steel plate of above-described zinc phosphate composite coating steel plate 1 was C in Table 1 instead of A in Table 1, and that the time for zinc phosphate treatment was selected to 4 seconds.

(3) Coating Composition (3-1) Organic Resin

Table 3 shows the organic resins used in the coating compositions.

(3-2) Rust-preventive Additive

Table 4 shows the rust-preventive additives used in the coating compositions.

(3-3) Lubricant

Table 5 shows the solid lubricants used in the coating compositions.

(3-4) Coating Composition

Table 6 shows the coating compositions used in Example 1. In Table 6, *1 through *4 denote the following.

*1: organic resin given in Table 3.

*2: rust-preventive additive given in Table 4.

*3: parts by weight to 100 parts by weight of the organic resin (solid content).

*4: lubricant given in Table 5.

(4) Rust-preventive Oil

Table 7 shows the rust-preventive oils used in Example 1.

Table 8 shows the kinds of thus prepared surface-treated steel plates and their tested performance of lubrication, anti-powdering performance, corrosion resistance, and coating adhesiveness. In Table 8, *1 through *3 denote the following.

*1: zinc phosphate composite coating steel plate given in Table 2.

*2: coating composition given in Table 6.

*3: rust-preventive oil given in Table 7.

The method for evaluating each characteristic is described below.

Lubrication

A pull-out force was determined under the sliding condition given below, to give evaluation using the formula of:

Friction factor=(Pull-out force)/(Applied force)

The evaluation criteria are the following.

| (Sliding condition) | |
|---|---|
| Tool contact area | :50 × 10 mm |
| Tool material | :SKD 11 |
| Applied pressure | :400 kgf |
| Sliding speed | :0.2 m/min |

(Evaluation Criteria)

◎: not more than 0.15

○: more than 0.15 and more than 0.17

Δ: more than 0.15 and not more than 0.20

X: more than 0.20

Anti-powdering Performance

A specimen was sheared to 30 mm in width, then was tested by draw-bead test under the conditions of a tip radius of bead of 0.5 mm, a bead height of 4 mm, a pressing force of 500 kgf, a pull-out speed of 200 mm/min. After that, the portion of the bead subjected to sliding was tested by adhesive-tape peeling, thus determining the peeled amount of coating per unit area before and after the test. The evaluation criteria are the following.

◎: less than 2 $g9m^2$

○+: more less than 2 $g/m^2$ and less than 3 $g/m^2$

○: not less than 3 $g/m^2$ and less than 4 $g/m^2$

Δ: not less than 4 $g/m^2$ and less than 6 $g/m^2$

X: not less than 6 $g/m^2$

Corrosion Resistance

1) Exposed Corrosion Resistance

A specimen was treated by degreasing (FCL 4460, produced by Nihon Parkerizing Co., Ltd., 45° C., immersion for 120 seconds). Edges and rear face of the specimen were sealed by adhesive tape. Then the accelerated corrosion test with cycles of combined corrosion test described below was applied to the specimen. The evaluation was given by the degree of rust generation after 10 cycles using the evaluation criteria given below.

| <Combined corrosion test cycle> | |
|---|---|
| Salt spray | :35° C., 2 hours |
| → Drying | :60° C., 4 hours |
| → 95% RH humidification | :50° C., 2 hours |

<Evaluation Criteria>

⊚: no generation of rust

○+: rust area less than 25%

○: rust area not less than 25% and less than 50%

Δ: rust area not less than 50% and less than 75%

X: rust area not less than 75%

2) Corrosion Resistance After Coating

A specimen was applied by 3 coat coating described below. Then cross-cut was given on the specimen using a cutter knife. After sealed on both edges and rear face of the specimen with adhesive tape, the accelerated corrosion test with cycles of combined corrosion test described below was applied to the specimen. The evaluation was given by the single-side bulging width at the cross-cut section after 180 cycles using the evaluation criteria given below.

| Coating (3 coat) | |
|---|---|
| Zinc phosphate treatment | :SD 6500 MZ (standard condition) |
| Electrodeposition coating | :V20, film thickness 20 μm |
| Intermediate coating | :OT0870 (white color sealer), film thickness 35 μm |
| Top coating | :OT0647PT (shush white), film thickness 35 μm |

<Combined Corrosion Test Cycle>

Salt spray 1 hour→Drying 6 hours→Humidifying 1 hour

<Evaluation Criteria>

⊚: less than 1 mm

○+: not less than 1 mm and less than 2 mm

○: not less than 2 mm and less than 4 mm

Δ: not less than 4 mm and less than 6 mm

X: not less than 6 mm

Coating Adhesiveness 1

A specimen was applied by 3 coat coating described below, and was allowed to stand for 24 hours or more. Then, the specimen was immersed in an ion-exchanged water at 50° C. for 240 hours. Within 30 minutes after the specimen was taken out from the water, 100 grid cuts were given to the coating at 2 mm of spacing. Adhesive tapes were attached to the grids, and were peeled off from the grids to determine the residual coating rate. The evaluation criteria are the following.

| Coating (3 coat) | |
|---|---|
| Zinc phosphate treatment | :SD 6500 MZ (standard condition) |
| Electrodeposition coating | :V20, film thickness 20 μm |
| Intermediate coating | :OT0870 (white color sealer), film thickness 35 μm |
| Top coating | :OT0647PT (shush white), film thickness 35 μm |

Evaluation Criteria

⊚: no peeling occurred

○: peeling rate less than 3%

Δ: peeling rate not less than 3% and less than 10%

X:peeling rate not less than 10%

Coating Adhesiveness 2

A specimen was treated by degreasing, then was coated with a commercial coating DELICON 700 at a thickness of 0 μm. The specimen was immersed in boiling water for 120 minutes, then 100 grid cuts were given to the coating at 1 mm of spacing. The Erichsen extrusion to 5 mm was applied to the specimen. Adhesive tapes were attached to the grids, and were peeled off from the grids to determine the residual coating rate. The evaluation criteria are the following.

Evaluation Criteria

⊚: no peeling occurred

○: peeling rate less than 3%

Δ: Peeling rate not less than 3% and less than 10%

X: peeling rate not less than 10%

Weldability

A specimen was tested by successive spot welding under the conditions of a pressing force of 200 kgf, a current-applying time of 14 cycle/50 Hz, and a welding current of 9 KA. The evaluation was given by the number of successive spot welding. The evaluation criteria are the following.

⊚: not less than 2500

○: not less than 1500 and less than 2500

Δ: not less than 500 and less than 1500

X: less than 500

TABLE 1

| | |
|---|---|
| A | Alloyed hot dip galvanized steel plate (coating weight: 60 $g/m^2$) |
| B | Electrolytically galvanized steel plate (coating weight: 30 $g/m^2$) |
| C | Electrolytically Zn-11% Ni alloy plated steel plate (coating weight: 20 $g/m^2$) |
| D | Hot dip galvanized steel plate (coating weight: 90 $g/m^2$) |
| E | Electrolytically Zn-1% Co alloy plated steel plate (coating weight: 30 $g/m^2$) |
| F | Two-layer alloyed hot dip galvanized steel plate (coating weight: 5 $g/m^2$ for upper layer; 60 $g/m^2$ for lower layer) |
| G | Hot dip Zn-5% Al-0.5% Mo alloy plated steel plate (coating weight: 90 $g/m^2$) |
| H | Hot dip Zn-55% Al-1.6% Si alloy plated steel plate (coating weight: 75 $g/m^2$) |
| I | Hot dip Zn-0.5% Mn alloy plated steel plate (coating weight: 150 $g/m^2$) |

TABLE 2

| No. | Plated steel plate*[1] | Coating weight of zinc phosphate coating ($g/m^2$) | Ni content in zinc phosphate coating (mass %) | Mn content in zinc phosphate coating (mass %) |
|---|---|---|---|---|
| 1 | A | 0.4 | 0.06 | 0.5 |
| 2 | B | 0.7 | 1.0 | 2.8 |
| 3 | C | 0.6 | 0.2 | 1.8 |
| 4 | D | 1.0 | 2.0 | 3.0 |
| 5 | E | 1.0 | 0.9 | 2.5 |
| 6 | F | 1.0 | 2.7 | 3.0 |
| 7 | G | 1.0 | 2.8 | 3.2 |
| 8 | H | 1.0 | 2.1 | 3.2 |
| 9 | I | 1.0 | 2.8 | 3.2 |
| 10 | B | 1.0 | 3.0 | — |
| 11 | B | 1.0 | — | 3.5 |
| 12 | B | 0.5 | 0.1 | 0.5 |
| 13 | B | 1.0 | 0.4 | 0.6 |
| 14 | B | 1.0 | 3.0 | 5.0 |
| 15 | B | 1.1 | 4.9 | 5.6 |
| 16 | B | 1.0 | — | — |
| 17 | B | 0.0 | — | — |
| 18 | B | 0.2 | 0.9 | 2.4 |
| 19 | B | 0.5 | 1.0 | 2.7 |
| 20 | B | 1.5 | 2.8 | 3.1 |
| 21 | B | 2.0 | 2.8 | 3.1 |
| 22 | B | 2.5 | 2.8 | 3.1 |
| 23 | B | 3.0 | 2.8 | 3.1 |

*[1]: Plated steel plate given in Table 1

TABLE 3

| | |
|---|---|
| A | Vinyl acetate-acrylic acid copolymer |
| B | Styrene-acrylic acid copolymer |
| C | Ethylene-acrylic acid copolymer, and Na neutralized ionomer resin |
| D | Ethylene-methacrylic acid copolymer, and Na neutralized ionomer resin |
| E | Ethylene-acrylic acid copolymer |
| F | Urethane resin |
| G | Epoxy resin |
| H | Phenol resin |
| I | Polyester resin |
| J | Allyl-silicon resin |
| K | Alkyd resin |

TABLE 4

| No. | Rust-preventive additive |
|---|---|
| 1 | Zinc phosphate |
| 2 | Calcium phosphate |
| 3 | Fine silica powder "AEROSILR-811", produced by Nippon Aerosil Co., Ltd. |
| 4 | Fine silica powder "AEROSIL 200", produced by Nippon Aerosil Co., Ltd. |
| 5 | Fine silica powder "AEROSIL 300", produced by Nippon Aerosil Co., Ltd. |
| 6 | Fine silica powder "SNOWTEX OS", produced by Nissan Chemical Industries Co., Ltd. |
| 7 | Ion-exchanged silica: Ca-exchanged silica "SHIELDEX C303" (Ca concentration: 3 wt. %), produced by W. R. Grace & Co. |
| 8 | Aluminum phosphomolybdate |
| 9 | Aluminum phosphate |

TABLE 5

| No. | Lubricant | Particle size (μm) | Softening point (° C.) |
|---|---|---|---|
| 1 | Tungsten disulfide | 3 | — |
| 2 | Molybdenum disulfide | 3 | — |
| 3 | Graphite | 3 | — |
| 4 | Boron nitride | 3 | — |
| 5 | Polyethylene | 0.05 | 120 |
| 6 | Polyethylene | 1 | 120 |
| 7 | Polyethylene | 8 | 125 |
| 8 | Polyethylene | 3 | 125 |
| 9 | Polyethylene | 5 | 130 |
| 10 | Polyethylene | 10 | 130 |
| 11 | Polyethylene | 15 | 130 |
| 12 | Polyethylene | 25 | 130 |
| 13 | Polyethylene | 30 | 130 |
| 14 | Tetrafluoroethylene resin | 3 | — |
| 15 | Polypropylene | 3 | — |
| 16 | Polyethylene | 8 | 100 |
| 17 | Polyethylene | 8 | 110 |
| 18 | Polyethylene | 8 | 130 |
| 19 | Polyethylene | 8 | 135 |
| 20 | Polyethylene | 8 | 137 |

TABLE 6-1

| No. | Resin*[1] | Rust-preventive additive*[2] | Content*[3] | Lubricant*[4] | Content*[3] |
|---|---|---|---|---|---|
| 1 | A | 5 | 20 | 7 | 10 |
| 2 | B | 5 | 20 | 7 | 10 |
| 3 | C | 5 | 20 | 7 | 10 |
| 4 | D | 5 | 20 | 7 | 10 |
| 5 | E | 5 | 20 | 7 | 10 |
| 6 | F | 5 | 20 | 7 | 10 |
| 7 | G | 5 | 20 | 7 | 10 |
| 8 | H | 5 | 20 | 7 | 10 |
| 9 | I | 5 | 20 | 7 | 10 |
| 10 | J | 5 | 20 | 7 | 10 |
| 11 | K | 5 | 20 | 7 | 10 |
| 12 | C | 1 | 20 | 7 | 10 |
| 13 | C | 2 | 20 | 7 | 10 |
| 14 | C | 3 | 20 | 7 | 10 |
| 15 | C | 4 | 20 | 7 | 10 |
| 16 | C | 6 | 20 | 7 | 10 |
| 17 | C | 7 | 20 | 7 | 10 |
| 18 | C | 8 | 20 | 7 | 10 |
| 19 | C | 9 | 20 | 7 | 10 |
| 20 | C | 5 | 20 | 1 | 10 |
| 21 | C | 5 | 20 | 2 | 10 |
| 22 | C | 5 | 20 | 3 | 10 |
| 23 | C | 5 | 20 | 4 | 10 |
| 24 | C | 5 | 20 | 5 | 10 |
| 25 | C | 5 | 20 | 6 | 10 |
| 26 | C | 5 | 20 | 8 | 10 |
| 27 | C | 5 | 20 | 9 | 10 |
| 28 | C | 5 | 20 | 10 | 10 |
| 29 | C | 5 | 20 | 11 | 10 |
| 30 | C | 5 | 20 | 12 | 10 |

TABLE 6-2

| No. | Resin*[1] | Rust-preventive additive*[2] | Content*[3] | Lubricant*[4] | Content*[3] |
|---|---|---|---|---|---|
| 31 | C | 5 | 20 | 13 | 10 |
| 32 | C | 5 | 20 | 14 | 10 |
| 33 | C | 5 | 20 | 15 | 10 |
| 34 | C | 5 | 20 | 16 | 10 |
| 35 | C | 5 | 20 | 17 | 10 |
| 36 | C | 5 | 20 | 18 | 10 |
| 37 | C | 5 | 20 | 19 | 10 |

TABLE 6-2-continued

| No. | Resin*1 | Rust-preventive additive*2 | Content*3 | Lubricant*4 | Content*3 |
|---|---|---|---|---|---|
| 38 | C | 5 | 20 | 20 | 10 |
| 39 | C | — | — | — | — |
| 40 | C | 5 | 1 | 7 | 10 |
| 41 | C | 5 | 10 | 7 | 10 |
| 42 | C | 5 | 30 | 7 | 10 |
| 43 | C | 5 | 40 | 7 | 10 |
| 44 | C | 5 | 70 | 7 | 10 |
| 45 | C | 5 | 80 | 7 | 10 |
| 46 | C | 5 | 90 | 7 | 10 |
| 47 | C | 5 | 100 | 7 | 10 |
| 48 | C | 5 | 150 | 7 | 10 |
| 49 | C | 5 | 20 | 7 | 1 |
| 50 | C | 5 | 20 | 7 | 3 |
| 51 | C | 5 | 20 | 7 | 5 |
| 52 | C | 5 | 20 | 7 | 10 |
| 53 | C | 5 | 20 | 7 | 20 |
| 54 | C | 5 | 20 | 7 | 35 |
| 55 | C | 5 | 20 | 7 | 50 |
| 56 | C | 5 | 20 | 7 | 80 |
| 57 | C | 5 | 20 | 7 | 100 |
| 58 | C | — | — | 7 | 10 |
| 59 | C | 5 | 20 | — | — |

TABLE 7

| No. | Name |
|---|---|
| 1 | Rust-preventive oil “NOX-RUST 530F”, produced by PERKER KOUSAN |
| 2 | Rust-preventive oil “DAPHNIS OIL COAT SK”, produced by Nippon Oil Co., Ltd. |
| 3 | Cleaning rust-preventive oil “PRETON R303P”, produced by SUGIMURA CHEMICAL |
| 4 | Cleaning rust-preventive oil “PRETON R303P”, produced by SUGIMURA CHEMICAL |
| 5 | Cleaning rust-preventive oil “RUSTCLEAN K”, produced by Nippon Oil Co., Ltd. |
| 6 | Cleaning rust-preventive oil “P-1600B”, produced by Nippon Oil Co., Ltd. |
| 7 | Lubrication rust-preventive oil “NOX-RUST 550HN”, produced by PERKER KOUSAN |
| 8 | Lubrication rust-preventive oil “NOX-RUST Mu-10”, produced by PERKER KOUSAN |

TABLE 8-1

| Classification | No. | Zinc phosphate composite coating steel plate*1 | Coating composition*2 | Coating weight of organic coating (g/m²) | Drying temperature (° C.) | Rust-preventive oil*3 | Coating weight of rust-preventive oil (g/m²) |
|---|---|---|---|---|---|---|---|
| E | 1 | 1 | 3 | 0.4 | 140 | 2 | 1 |
| E | 2 | 2 | 3 | 0.4 | 140 | 2 | 1 |
| E | 3 | 3 | 3 | 0.4 | 140 | 2 | 1 |
| E | 4 | 4 | 3 | 0.4 | 140 | 2 | 1 |
| E | 5 | 5 | 3 | 0.4 | 140 | 2 | 1 |
| E | 6 | 6 | 3 | 0.4 | 140 | 2 | 1 |
| E | 7 | 7 | 3 | 0.4 | 140 | 2 | 1 |
| E | 8 | 8 | 3 | 0.4 | 140 | 2 | 1 |
| E | 9 | 9 | 3 | 0.4 | 140 | 2 | 1 |
| E | 10 | 10 | 3 | 0.4 | 140 | 2 | 1 |
| E | 11 | 11 | 3 | 0.4 | 140 | 2 | 1 |
| E | 12 | 12 | 3 | 0.4 | 140 | 2 | 1 |
| E | 13 | 13 | 3 | 0.4 | 140 | 2 | 1 |
| E | 14 | 14 | 3 | 0.4 | 140 | 2 | 1 |
| E | 15 | 15 | 3 | 0.4 | 140 | 2 | 1 |
| C | 16 | 16 | 3 | 0.4 | 140 | 2 | 1 |
| C | 17 | 17 | 3 | 0.4 | 140 | 2 | 1 |
| E | 18 | 18 | 3 | 0.4 | 140 | 2 | 1 |
| E | 19 | 19 | 3 | 0.4 | 140 | 2 | 1 |
| E | 20 | 20 | 3 | 0.4 | 140 | 2 | 1 |
| E | 21 | 21 | 3 | 0.4 | 140 | 2 | 1 |
| E | 22 | 22 | 3 | 0.4 | 140 | 2 | 1 |
| C | 23 | 23 | 3 | 0.4 | 140 | 2 | 1 |
| E | 24 | 2 | 1 | 0.4 | 140 | 2 | 1 |
| E | 25 | 2 | 2 | 0.4 | 140 | 2 | 1 |
| E | 26 | 2 | 4 | 0.4 | 140 | 2 | 1 |
| E | 27 | 2 | 5 | 0.4 | 140 | 2 | 1 |
| E | 28 | 2 | 6 | 0.4 | 140 | 2 | 1 |
| E | 29 | 2 | 7 | 0.4 | 140 | 2 | 1 |
| C | 30 | 2 | 8 | 0.4 | 140 | 2 | 1 |

E: Example
C: Comparative Example

TABLE 8-2

| | | | | Corrosion resistance | | Coating adhesiveness | | |
|---|---|---|---|---|---|---|---|---|
| Classification | No. | Lubrication | Anti-powdering performance | Without coating | After coating | 1 | 2 | Weldability |
| E | 1 | ◎ | ○ | ◎ | ○ | ○ | ○ | ○ |
| E | 2 | ◎ | ◎ | ◎ | ◎ | ◎ | ◎ | ◎ |
| E | 3 | ◎ | ◎ | ◎ | ◎ | ◎ | ◎ | ◎ |
| E | 4 | ◎ | ○ | ◎ | ○ | ◎ | ◎ | ○ |
| E | 5 | ◎ | ◎ | ◎ | ◎ | ◎ | ◎ | ◎ |
| E | 6 | ◎ | ◎ | ◎ | ◎ | ◎ | ◎ | ◎ |
| E | 7 | ◎ | ○ | ◎ | ◎ | ◎ | ◎ | Δ |
| E | 8 | ◎ | ○ | ◎ | ◎ | ◎ | ◎ | Δ |
| E | 9 | ◎ | ○ | ◎ | ◎ | ◎ | ◎ | Δ |
| E | 10 | ◎ | ◎ | ◎ | ○+ | ◎ | ◎ | ◎ |
| E | 11 | ◎ | ◎ | ○+ | ○ | ○ | ◎ | ◎ |
| E | 12 | ◎ | ○ | ◎ | ○ | ○ | ○ | ◎ |
| E | 13 | ◎ | ◎ | ◎ | ○ | ◎ | ◎ | ◎ |
| E | 14 | ◎ | ◎ | ◎ | ○ | ◎ | ◎ | ◎ |
| E | 15 | ◎ | ○ | ◎ | ○ | ○ | ○ | ◎ |
| C | 16 | ○ | ○ | ◎ | Δ | x | Δ | ◎ |
| C | 17 | Δ | ○ | x | x | x | x | ◎ |
| E | 18 | ○ | ○ | ○ | Δ | Δ | Δ | ◎ |
| E | 19 | ◎ | ◎ | ◎ | ◎ | ◎ | ◎ | ◎ |
| E | 20 | ◎ | ○ | ◎ | ◎ | ◎ | ◎ | ○ |
| E | 21 | ○ | ○ | ◎ | ◎ | ◎ | ◎ | ○ |
| E | 22 | ○ | Δ | ◎ | ◎ | ◎ | ◎ | Δ |
| C | 23 | Δ | x | ◎ | ◎ | ◎ | ◎ | Δ |
| E | 24 | ◎ | ◎ | ◎ | ○ | ○ | ○ | ◎ |
| E | 25 | ◎ | ◎ | ◎ | ○ | ○ | ○ | ◎ |
| E | 26 | ◎ | ◎ | ◎ | ◎ | ◎ | ◎ | ◎ |
| E | 27 | ◎ | ◎ | ◎ | ○ | ○ | ◎ | ◎ |
| E | 28 | ◎ | ◎ | ◎ | Δ | Δ | Δ | ◎ |
| E | 29 | ◎ | ◎ | ◎ | ◎ | ◎ | ◎ | ◎ |
| C | 30 | ◎ | ◎ | x | x | x | x | ◎ |

E: Example
C: Comparative Example

TABLE 8-3

| Classification | No. | Zinc phosphate composite coating steel plate*1 | Coating composition*2 | Coating weight of organic coating ($g/m^2$) | Drying temperature (° C.) | Rust-preventive oil*3 | Coating weight of rust-preventive oil ($g/m^2$) |
|---|---|---|---|---|---|---|---|
| C | 31 | 2 | 9 | 0.4 | 140 | 2 | 1 |
| C | 32 | 2 | 10 | 0.4 | 140 | 2 | 1 |
| C | 33 | 2 | 11 | 0.4 | 140 | 2 | 1 |
| E | 34 | 2 | 12 | 0.4 | 140 | 2 | 1 |
| E | 35 | 2 | 13 | 0.4 | 140 | 2 | 1 |
| E | 36 | 2 | 14 | 0.4 | 140 | 2 | 1 |
| E | 37 | 2 | 15 | 0.4 | 140 | 2 | 1 |
| E | 38 | 2 | 16 | 0.4 | 140 | 2 | 1 |
| E | 39 | 2 | 17 | 0.4 | 140 | 2 | 1 |
| E | 40 | 2 | 18 | 0.4 | 140 | 2 | 1 |
| E | 41 | 2 | 19 | 0.4 | 140 | 2 | 1 |
| E | 42 | 2 | 20 | 0.4 | 140 | 2 | 1 |
| E | 43 | 2 | 21 | 0.4 | 140 | 2 | 1 |
| E | 44 | 2 | 22 | 0.4 | 140 | 2 | 1 |
| E | 45 | 2 | 23 | 0.4 | 140 | 2 | 1 |
| E | 46 | 2 | 24 | 0.4 | 140 | 2 | 1 |
| E | 47 | 2 | 25 | 0.4 | 140 | 2 | 1 |
| E | 48 | 2 | 26 | 0.4 | 140 | 2 | 1 |
| E | 49 | 2 | 27 | 0.4 | 140 | 2 | 1 |
| E | 50 | 2 | 28 | 0.4 | 140 | 2 | 1 |
| E | 51 | 2 | 29 | 0.4 | 140 | 2 | 1 |
| E | 52 | 2 | 30 | 0.4 | 140 | 2 | 1 |
| E | 53 | 2 | 31 | 0.4 | 140 | 2 | 1 |
| E | 54 | 2 | 32 | 0.4 | 140 | 2 | 1 |
| E | 55 | 2 | 33 | 0.4 | 140 | 2 | 1 |
| E | 56 | 2 | 34 | 0.4 | 140 | 2 | 1 |
| E | 57 | 2 | 35 | 0.4 | 140 | 2 | 1 |
| E | 58 | 2 | 36 | 0.4 | 140 | 2 | 1 |

TABLE 8-3-continued

| Classification | No. | Zinc phosphate composite coating steel plate*1 | Coating composition*2 | Coating weight of organic coating (g/$m^2$) | Drying temperature (° C.) | Rust-preventive oil*3 | Coating weight of rust-preventive oil (g/$m^2$) |
|---|---|---|---|---|---|---|---|
| E | 59 | 2 | 37 | 0.4 | 140 | 2 | 1 |
| E | 60 | 2 | 38 | 0.4 | 140 | 2 | 1 |
| E | 61 | 2 | 39 | 0.4 | 140 | 2 | 1 |

E: Example
C: Comparative Example

TABLE 8-4

| Classification | No. | Lubrication | Anti-powdering performance | Corrosion resistance: Without coating | Corrosion resistance: After coating | Coating adhesiveness 1 | Coating adhesiveness 2 | Weldability |
|---|---|---|---|---|---|---|---|---|
| C | 31 | ⊚ | ⊚ | x | x | x | x | ⊚ |
| C | 32 | ⊚ | ⊚ | x | x | x | x | x |
| C | 33 | ⊚ | ⊚ | x | x | x | x | ⊚ |
| E | 34 | ⊚ | ○ | ⊚ | ⊚ | ⊚ | ⊚ | ⊚ |
| E | 35 | ⊚ | ⊚ | ⊚ | ⊚ | ⊚ | ⊚ | ⊚ |
| E | 36 | ⊚ | ⊚ | ⊚ | ⊚ | ⊚ | ⊚ | ⊚ |
| E | 37 | ⊚ | ○ | ⊚ | ⊚ | ⊚ | ⊚ | ⊚ |
| E | 38 | ⊚ | ○ | ○+ | ○+ | ⊚ | ⊚ | ⊚ |
| E | 39 | ⊚ | ○ | ⊚ | ⊚ | ⊚ | ⊚ | ⊚ |
| E | 40 | ⊚ | ⊚ | ○ | ○ | ⊚ | ⊚ | ⊚ |
| E | 41 | ⊚ | ⊚ | ○+ | ○+ | ⊚ | ⊚ | ⊚ |
| E | 42 | ○ | ○+ | ○ | ○ | ⊚ | ⊚ | ⊚ |
| E | 43 | ○ | ○+ | ○ | ○ | ⊚ | ⊚ | ⊚ |
| E | 44 | ⊚ | ⊚ | Δ | Δ | ⊚ | ⊚ | ⊚ |
| E | 45 | ⊚ | ⊚ | ⊚ | ⊚ | ⊚ | ⊚ | ⊚ |
| E | 46 | ⊚ | ⊚ | ⊚ | ○ | Δ | Δ | ⊚ |
| E | 47 | ⊚ | ○ | ⊚ | ⊚ | ○ | ⊚ | ⊚ |
| E | 48 | ⊚ | ⊚ | ⊚ | ⊚ | ⊚ | ⊚ | ⊚ |
| E | 49 | ⊚ | ⊚ | ⊚ | ⊚ | ⊚ | ⊚ | ⊚ |
| E | 50 | ⊚ | ⊚ | ⊚ | ⊚ | ⊚ | ⊚ | ⊚ |
| E | 51 | ⊚ | ○+ | ⊚ | ⊚ | ⊚ | ⊚ | ⊚ |
| E | 52 | ○ | ○ | ○ | ○ | ⊚ | ⊚ | ⊚ |
| E | 53 | ○ | ○ | Δ | ○ | ⊚ | ⊚ | ⊚ |
| E | 54 | ⊚ | ⊚ | ⊚ | ⊚ | ⊚ | ⊚ | ⊚ |
| E | 55 | ○+ | ○ | ⊚ | ⊚ | ⊚ | ⊚ | ⊚ |
| E | 56 | ○+ | ○+ | ⊚ | ⊚ | ⊚ | ⊚ | ⊚ |
| E | 57 | ⊚ | ⊚ | ⊚ | ⊚ | ⊚ | ⊚ | ⊚ |
| E | 58 | ⊚ | ⊚ | ⊚ | ⊚ | ⊚ | ⊚ | ⊚ |
| E | 59 | ○+ | ○+ | ⊚ | ⊚ | ⊚ | ⊚ | ⊚ |
| E | 60 | ○+ | ○ | ⊚ | ⊚ | ⊚ | ⊚ | ⊚ |
| E | 61 | Δ | ○ | ○ | ○ | ⊚ | ⊚ | ⊚ |

E: Example
C: Comparative Example

TABLE 8-5

| Classification | No. | Zinc phosphate composite coating steel plate*1 | Coating composition*2 | Coating weight of organic coating (g/$m^2$) | Drying temperature (° C.) | Rust-preventive oil*3 | Coating weight of rust-preventive oil (g/$m^2$) |
|---|---|---|---|---|---|---|---|
| E | 62 | 2 | 40 | 0.4 | 140 | 2 | 1 |
| E | 63 | 2 | 41 | 0.4 | 140 | 2 | 1 |
| E | 64 | 2 | 42 | 0.4 | 140 | 2 | 1 |
| E | 65 | 2 | 43 | 0.4 | 140 | 2 | 1 |
| E | 66 | 2 | 44 | 0.4 | 140 | 2 | 1 |
| E | 67 | 2 | 45 | 0.4 | 140 | 2 | 1 |
| E | 68 | 2 | 46 | 0.4 | 140 | 2 | 1 |
| E | 69 | 2 | 47 | 0.4 | 140 | 2 | 1 |
| E | 70 | 2 | 48 | 0.4 | 140 | 2 | 1 |
| E | 71 | 2 | 49 | 0.4 | 140 | 2 | 1 |
| E | 72 | 2 | 50 | 0.4 | 140 | 2 | 1 |
| E | 73 | 2 | 51 | 0.4 | 140 | 2 | 1 |
| E | 74 | 2 | 52 | 0.4 | 140 | 2 | 1 |
| E | 75 | 2 | 53 | 0.4 | 140 | 2 | 1 |

TABLE 8-5-continued

| Classification | No. | Zinc phosphate composite coating steel plate*1 | Coating composition*2 | Coating weight of organic coating (g/m$^2$) | Drying temperature (° C.) | Rust-preventive oil*3 | Coating weight of rust-preventive oil (g/m$^2$) |
|---|---|---|---|---|---|---|---|
| E | 76 | 2 | 54 | 0.4 | 140 | 2 | 1 |
| E | 77 | 2 | 55 | 0.4 | 140 | 2 | 1 |
| E | 78 | 2 | 56 | 0.4 | 140 | 2 | 1 |
| E | 79 | 2 | 57 | 0.4 | 140 | 2 | 1 |
| E | 80 | 2 | 58 | 0.4 | 140 | 2 | 1 |
| E | 81 | 2 | 59 | 0.4 | 140 | 2 | 1 |
| C | 82 | 2 | — | 0 | — | 2 | 1 |
| E | 83 | 2 | 3 | 0.05 | 140 | 2 | 1 |
| E | 84 | 2 | 3 | 0.1 | 140 | 2 | 1 |
| E | 85 | 2 | 3 | 0.2 | 140 | 2 | 1 |
| E | 86 | 2 | 3 | 0.3 | 140 | 2 | 1 |
| E | 87 | 2 | 3 | 0.6 | 140 | 2 | 1 |
| E | 88 | 2 | 3 | 1 | 140 | 2 | 1 |
| E | 89 | 2 | 3 | 1.5 | 140 | 2 | 1 |
| E | 90 | 2 | 3 | 2 | 140 | 2 | 1 |
| E | 91 | 2 | 3 | 0.4 | 140 | 2 | 1 |

E: Example
C: Comparative Example

TABLE 8-6

| Classification | No. | Lubrication | Anti-powdering performance | Corrosion resistance: Without coating | Corrosion resistance: After coating | Coating adhesiveness 1 | Coating adhesiveness 2 | Weldability |
|---|---|---|---|---|---|---|---|---|
| E | 62 | ◎ | ◎ | ○+ | ○ | ◎ | ◎ | ◎ |
| E | 63 | ◎ | ◎ | ○+ | ○+ | ◎ | ◎ | ◎ |
| E | 64 | ◎ | ◎ | ◎ | ◎ | ◎ | ◎ | ◎ |
| E | 65 | ◎ | ◎ | ◎ | ◎ | ◎ | ◎ | ◎ |
| E | 66 | ◎ | ◎ | ◎ | ◎ | ◎ | ◎ | ◎ |
| E | 67 | ◎ | ◎ | ◎ | ○+ | ◎ | ◎ | ◎ |
| E | 68 | ◎ | ○ | ◎ | ○ | ◎ | ◎ | ◎ |
| E | 69 | ○ | ○ | ○+ | ○ | ◎ | ◎ | ◎ |
| E | 70 | ○ | Δ | ○ | Δ | ○ | ○ | ◎ |
| E | 71 | ○ | ○ | ◎ | ◎ | ◎ | ◎ | ◎ |
| E | 72 | ◎ | ○+ | ◎ | ◎ | ◎ | ◎ | ◎ |
| E | 73 | ◎ | ◎ | ◎ | ◎ | ◎ | ◎ | ◎ |
| E | 74 | ◎ | ◎ | ◎ | ◎ | ◎ | ◎ | ◎ |
| E | 75 | ◎ | ◎ | ◎ | ◎ | ◎ | ◎ | ◎ |
| E | 76 | ◎ | ◎ | ◎ | ◎ | ◎ | ◎ | ◎ |
| E | 77 | ◎ | ○+ | ◎ | ◎ | ◎ | ◎ | ◎ |
| E | 78 | ◎ | ○ | ○+ | ○ | ◎ | ◎ | ◎ |
| E | 79 | ○ | Δ | ○ | Δ | ○ | ○ | ◎ |
| E | 80 | ◎ | ◎ | ○ | ○ | ◎ | ◎ | ◎ |
| E | 81 | Δ | ○ | ◎ | ◎ | ◎ | ◎ | ◎ |
| C | 82 | Δ | Δ | x | Δ | ○ | ○ | ◎ |
| E | 83 | ○ | ○ | ○ | Δ | ○ | ○ | ◎ |
| E | 84 | ◎ | ○+ | ○ | ○ | ◎ | ◎ | ◎ |
| E | 85 | ◎ | ◎ | ◎ | ◎ | ◎ | ◎ | ◎ |
| E | 86 | ◎ | ◎ | ◎ | ◎ | ◎ | ◎ | ◎ |
| E | 87 | ◎ | ◎ | ◎ | ◎ | ◎ | ◎ | ◎ |
| E | 88 | ◎ | ◎ | ◎ | ◎ | ◎ | ◎ | ○ |
| E | 89 | ◎ | ◎ | ◎ | ◎ | ◎ | ◎ | Δ |
| E | 90 | ◎ | ◎ | ◎ | ◎ | ◎ | ◎ | x |
| E | 91 | ○ | ○ | Δ | Δ | Δ | Δ | ◎ |

E: Example
C: Comparative Example

TABLE 8-7

| Classification | No. | Zinc phosphate composite coating steel plate*1 | Coating composition*2 | Coating weight of organic coating (g/m$^2$) | Drying temperature (° C.) | Rust-preventive oil*3 | Coating weight of rust-preventive oil (g/m$^2$) |
|---|---|---|---|---|---|---|---|
| E | 92 | 2 | 3 | 0.4 | 50 | 2 | 1 |
| E | 93 | 2 | 3 | 0.4 | 100 | 2 | 1 |

TABLE 8-7-continued

| Classifica-cation | No. | Zinc phosphate composite coating steel plate*1 | Coating composition*2 | Coating weight of organic coating ($g/m^2$) | Drying temperature (° C.) | Rust-preventive oil*3 | Coating weight of rust-preventive oil ($g/m^2$) |
|---|---|---|---|---|---|---|---|
| E | 94 | 2 | 3 | 0.4 | 120 | 2 | 1 |
| E | 95 | 2 | 3 | 0.4 | 170 | 2 | 1 |
| E | 96 | 2 | 3 | 0.4 | 200 | 2 | 1 |
| E | 97 | 2 | 3 | 0.6 | 300 | 2 | 1 |
| E | 98 | 2 | 3 | 1 | 140 | 1 | 1 |
| E | 99 | 2 | 3 | 1.5 | 140 | 3 | 1 |
| E | 100 | 2 | 3 | 2 | 140 | 4 | 1 |
| E | 101 | 2 | 3 | 0.4 | 140 | 5 | 1 |
| E | 102 | 2 | 3 | 0.4 | 140 | 6 | 1 |
| E | 103 | 2 | 3 | 0.4 | 140 | 7 | 1 |
| E | 104 | 2 | 3 | 0.4 | 140 | 8 | 1 |
| E | 105 | 2 | 3 | 0.4 | 140 | — | — |
| E | 106 | 2 | 3 | 0.4 | 140 | 2 | 0.01 |
| E | 107 | 2 | 3 | 0.4 | 140 | 2 | 0.5 |
| E | 108 | 2 | 3 | 0.4 | 140 | 2 | 3 |
| E | 109 | 2 | 3 | 0.4 | 140 | 2 | 10 |
| E | 110 | 2 | 3 | 0.4 | 140 | 2 | 15 |

E: Example
C: Comparative Example

TABLE 8-8

| Classifica-tion | No. | Lubrication | Anti-powdering performance | Corrosion resistance: Without coating | Corrosion resistance: After coating | Coating adhesiveness 1 | Coating adhesiveness 2 | Weldability |
|---|---|---|---|---|---|---|---|---|
| E | 92 | ⊚ | ○+ | ○ | ○ | ⊚ | ⊚ | ⊚ |
| E | 93 | ⊚ | ⊚ | ○+ | ○+ | ⊚ | ⊚ | ⊚ |
| E | 94 | ⊚ | ⊚ | ⊚ | ⊚ | ⊚ | ⊚ | ⊚ |
| E | 95 | ⊚ | ⊚ | ⊚ | ⊚ | ⊚ | ⊚ | ⊚ |
| E | 96 | ⊚ | ⊚ | ⊚ | ⊚ | ⊚ | ⊚ | ⊚ |
| E | 97 | ⊚ | ⊚ | ⊚ | ⊚ | ⊚ | ⊚ | ⊚ |
| E | 98 | ⊚ | ⊚ | ⊚ | ⊚ | ⊚ | ⊚ | ⊚ |
| E | 99 | ⊚ | ⊚ | ⊚ | ⊚ | ⊚ | ⊚ | ⊚ |
| E | 100 | ⊚ | ⊚ | ⊚ | ⊚ | ⊚ | ⊚ | ⊚ |
| E | 101 | ⊚ | ⊚ | ⊚ | ⊚ | ⊚ | ⊚ | ⊚ |
| E | 102 | ⊚ | ⊚ | ⊚ | ⊚ | ⊚ | ⊚ | ⊚ |
| E | 103 | ⊚ | ⊚ | ⊚ | ⊚ | ⊚ | ⊚ | ⊚ |
| E | 104 | ⊚ | ⊚ | ⊚ | ⊚ | ⊚ | ⊚ | ⊚ |
| E | 105 | ⊚ | ○ | ⊚ | ⊚ | ⊚ | ⊚ | ⊚ |
| E | 106 | ⊚ | ○+ | ⊚ | ⊚ | ⊚ | ⊚ | ⊚ |
| E | 107 | ⊚ | ⊚ | ⊚ | ⊚ | ⊚ | ⊚ | ⊚ |
| E | 108 | ⊚ | ⊚ | ⊚ | ⊚ | ⊚ | ⊚ | ⊚ |
| E | 109 | ⊚ | ⊚ | ⊚ | ⊚ | ⊚ | ⊚ | ⊚ |
| E | 110 | ⊚ | ⊚ | ⊚ | ⊚ | ⊚ | ⊚ | ⊚ |

E: Example
C: Comparative Example

EXAMPLE 2

(1) Plated Steel Plates

Electrolytically galvanized steel plates each having a thickness of 0.7 mm, a surface roughness (Ra) of 1.0 μm. and a coating weight of 20 $g/m^2$ were used in Example 2.

(2) Zinc Phosphate Composite Treatment

In accordance with the steps given below, zinc phosphate composite coating steel plates shown in Table 2 were prepared as the specimens.

1) Degreasing→2) Washing with water→3) Surface preparation treatment→4) Phosphate treatment→5) Washing with water→6) Drying Respective conditions in each treatment step are the following.

1) Degreasing (FCL43366, produced by Nihon Parkerizing Co., Ltd., 20 g/l, 45° C., 60 seconds spraying)

2) Washing with water (20 seconds, normal temperature, spraying)

3) Surface preparation treatment (either one of the following A), B), and C))

(A) PREPAREN ZN (produced by Nihon Parkerizing Co., Ltd.) was sprayed under the conditions of 1.5 g/l, normal temperature, 2 seconds.

(B) A brush of Cashew fibers was applied for five traverses of brushing.

(C) (A) and (B) were carried out at a time.

4) Phosphate treatment

Table 9 shows the compositions of the phosphate treatment solutions. Table 10 shows other treatment conditions and coating compositions.

5) Washing with water (20 seconds, normal temperature, spraying)

6) Drying (hot air drying, 100° C., 3 minutes)

(3) Coating Composition (3-1) Organic Resin

Table 3 shows the organic resins used in the coating compositions.

(3-2) Rust-preventive Additive

Table 4 shows the rust-preventive additives used in the coating compositions.

(3-3) Lubricant

Table 5 shows the solid lubricants used in the coating composition.

(3-4) Coating Composition

Table 6 shows the coating compositions used in Example 2.

(4) Rust-preventive Oils

Table 7 shows the rust-preventive oils used in Example 2.

Table 11 shows the kinds of thus prepared surface-treated steel plates and their tested performance of lubrication, anti-powdering performance, corrosion resistance, and coating adhesiveness. In Table 11, *1 through *3 denote the following.

*1: zinc phosphate composite coating steel plate given in Table 10.

*2: coating composition given in Table 6.

*3: rust-preventive oil given in Table 7.

The method for evaluating each characteristic is the same as in Example 1.

TABLE 9

| No. | Composition of phosphate treatment solution (g/l) Zn | Mg | Ni | $PO_4$ | $NO_3$ | F | Acid ratio (Total acid/Free acid) |
|---|---|---|---|---|---|---|---|
| 1 | 0.8 | 0.5 | 2.9 | 15 | 3 | 0.5 | 15 |
| 2 | 0.8 | 0.6 | 2.4 | 19 | 5 | 0.2 | 12.5 |
| 3 | 0.6 | 0.1 | 2 | 15 | 8 | 0.9 | 17 |
| 4 | 1.4 | 0.7 | 3.2 | 12.5 | 13 | 0.5 | 10 |
| 5 | 0.8 | — | 3.6 | 12 | 5 | 0.5 | 17 |
| 6 | 0.8 | 1 | — | 15 | 2 | 0.2 | 10 |
| 7 | 0.6 | 0.3 | 1.5 | 12.5 | 14 | 0.5 | 15 |
| 8 | 0.6 | 0.08 | 3.8 | 5 | 3 | 0.3 | 12.5 |
| 9 | 1.2 | 0.9 | 2.2 | 12 | 0.2 | 0.5 | 12.5 |

TABLE 10

| No. | Activation treatment | Treatment solution No.*[1] | Treatment time (seconds) | Treatment solution temperature (° C.) | Coating weight (g/m$^2$) | Ni content (mass %) | Mg content (mass %) |
|---|---|---|---|---|---|---|---|
| 1 | A | 1 | 3 | 50 | 0.3 | 6.2 | 0.5 |
| 2 | B | 2 | 5 | 50 | 0.5 | 5 | 0.5 |
| 3 | C | 3 | 2 | 60 | 0.4 | 7.1 | 0.3 |
| 4 | A | 3 | 5 | 70 | 1.9 | 6.1 | 0.2 |
| 5 | A | 4 | 4 | 60 | 0.9 | 5.6 | 0.3 |
| 6 | A | 5 | 5 | 70 | 1.8 | 9 | — |
| 7 | B | 6 | 6 | 50 | 0.7 | — | 0.7 |
| 8 | C | 7 | 2 | 60 | 0.4 | 2.7 | 0.2 |
| 9 | A | 8 | 3 | 50 | 0.3 | 2.4 | 0.1 |
| 10 | A | 9 | 0.5 | 40 | 0.05 | 2.1 | 0.1 |

*[1]No. of phosphate treatment solution given in Table 9

TABLE 11

| Classification | No. | Zinc phosphate composite coating steel plate*[1] | Coating composition*[2] | Coating weight of organic coating (g/m$^2$) | Drying temperature (° C.) | Rust-preventive oil*[3] | Coating weight of rust-preventive oil (g/m$^2$) | Lubrication |
|---|---|---|---|---|---|---|---|---|
| E | 1 | 1 | 7 | 0.5 | 120 | 2 | 1 | ○ |
| E | 2 | 2 | 7 | 0.5 | 120 | 2 | 1 | ◎ |
| E | 3 | 3 | 7 | 0.5 | 120 | 2 | 1 | ○+ |
| E | 4 | 4 | 7 | 0.5 | 120 | 2 | 1 | ○ |
| E | 5 | 5 | 7 | 0.5 | 120 | 2 | 1 | ◎ |
| E | 6 | 6 | 7 | 0.5 | 120 | 2 | 1 | ○ |
| E | 7 | 7 | 7 | 0.5 | 120 | 2 | 1 | ◎ |
| E | 8 | 8 | 7 | 0.5 | 120 | 2 | 1 | ○+ |
| E | 9 | 9 | 7 | 0.5 | 120 | 2 | 1 | ○ |
| C | 10 | 10 | 7 | 0.5 | 120 | 2 | 1 | Δ |

TABLE 11-continued

| Classifi-cation | No. | Anti-powdering performance | Corrosion resistance Without coating | After coating | Adhesiveness Coating adhesiveness 1 | Coating adhesiveness 2 | Welda-bility |
|---|---|---|---|---|---|---|---|
| E | 1 | ○ | ○ | ○ | ◎ | ◎ | ◎ |
| E | 2 | ◎ | ◎ | ◎ | ◎ | ◎ | ◎ |
| E | 3 | ○+ | ○+ | ○ | ◎ | ◎ | ◎ |
| E | 4 | ○ | ◎ | ○ | ◎ | ◎ | ○ |
| E | 5 | ◎ | ◎ | ◎ | ◎ | ◎ | ◎ |
| E | 6 | ○ | ◎ | ○ | ○ | ◎ | ○ |
| E | 7 | ○+ | ◎ | ○ | ○ | ○ | ◎ |
| E | 8 | ○+ | ○+ | ○ | ◎ | ◎ | ◎ |
| E | 9 | ○ | ○ | ○ | ◎ | ◎ | ◎ |
| C | 10 | ○ | x | x | x | Δ | ◎ |

E: Example
C: Comparative Example

Preferred Embodiment 2

The inventors of the present invention investigated the zinc phosphate composite treated steel plates focusing on the relation of coating in terms of structure, corrosion resistance, anti-powdering performance, lubrication, coating adhesiveness, and weldability. Thus, the inventors derived the following-described findings.

(1) As for the improvement in corrosion resistance, lubrication, and coatability, it is effective to form a dual-layer structure, or to form a specified zinc phosphate coating on the surface of a zinc-base plated steel plate as the substrate, and further to form an organic coating consisting mainly of a specified organic resin onto the zinc phosphate coating.

(2) The corrosion resistance is further improved by adding a specified rust-preventive additive at a specified amount to the organic coating, without degrading the lubrication, the coating adhesiveness, and the weldability.

(3) The lubrication is further improved by adding a specified lubricant at a specified amount to the organic coating, without degrading the corrosion resistance, the coating adhesiveness, and the weldability.

(4) The lubrication, the corrosion resistance, the coatability, the weldability, and the anti-powdering performance are improved by optimizing the coating weight of the zinc phosphate composite coating layer and of the organic coating layer as the top layer.

The present invention was established on the basis of above-described findings, and the present invention is characterized in the constitution described in the following.

That is, the present invention provides a zinc phosphate composite treated steel plate having excellent corrosion resistance, anti-powdering performance, lubrication, and coatability, which steel plate comprises: a zinc-base plated steel plate; a first layer of zinc phosphate composite coating layer having coating weights of from 0.2 to 2.5 g/m$^2$, containing at least one substance selected from the group consisting of nickel, manganese, and magnesium, formed on the surface of the zinc-base plated steel plate; and a second layer of an organic coating consisting mainly of organic resins described in (1) in the following.

(1) A block urethane-modified resin prepared by mixing a modified epoxy resin (A) comprising an epoxy resin, a multifunctional amine, and a monoisocyanate, and a block urethane (B) comprising a polyol, a polyisocyanate, and a block-forming agent, at mixing rates (A/B) of from 95/5 to 50/50 (weight ratio of nonvolatile matter).

According to the present invention, the content of at least one substance selected from the group consisting of nickel, manganese, and magnesium, in the zinc phosphate composite coating is preferably in a range of from 0.5 to 8.5 mass % as the total thereof.

The organic coating preferably contains a solid lubricant and/or a rust-preventive additive as components. The content of the rust-preventive additive in the organic coating is preferably in a range of from 1 to 100 parts by weight as solid content to 100 parts by weight of the block urethane-modified epoxy resin as solid content. And the content of the solid lubricant is preferably in a range of from 1 to 80 parts by weight as solid content to 100 parts by weight of the block urethane-modified epoxy resin as solid content.

According to the present invention, the rust-preventive additive preferably contains a hydrophilic silica. The rust-preventive additive preferably contains a silica at specific surface areas of from 20 to 1000 m$^2$/g.

The solid lubricant is preferably at least one substance selected from the group consisting of polyethylene wax (preferably having softening points of from 100 to 135° C.), tetrafluoroethylene resin, and boron nitride. The average particle size of the solid lubricant is preferably in a range of from 0.05 to 25 $\mu$m.

The coating weight of the organic coating is preferably in a range of from 0.05 to 1.5 g/m$^2$.

According to the present invention, the uppermost layer preferably has a rust-preventive film layer at coating weights of from 0.01 to 10 g/m$^2$.

The detail of the present invention is described in the following giving the reasons to limit the specification.

The steel plates which become the substrate of the zinc-base plated steel plates according to the present invention include: all kinds of cold-rolled steel plates for soft-working, such as cold-rolled steel plates for general working (CQ), cold-rolled steel plates for deep drawing (DQ), cold-rolled steel plates for very deep drawing (DDQ), and cold-rolled steel plates for ultra deep drawing (EDDQ); all kinds of high tension steel plates ranging from high tension steel plates of relatively low strength level having baking-hardening property to general high tension steel plates having more than 390 MPa of tensions; and de-scaled hot-rolled steel plates.

Examples of the plating layers of the zinc-base plated steel plates are Zn plating, Zn—Ni alloy plating (10 to 15 mass % of Ni content), Zn—Fe ally plating (5 to 25 mass % or 60 to 90 mass % of Fe content), Zn—Mn alloy plating (30 to 80 mass % of Mn content), Zn—Co alloy plating (0.5 to 15 mass % of Co), Zn—Cr ally plating (5 to 30 mass % of Cr), Zn-Al alloy plating (3 to 60 mass % of Al content). Each of the above-given plating compositions may further include alloying element such as Co, Fe, Ni, and Cr, and oxide or salt of silica, alumina, slightly soluble chromate, or the like, and polymer. Among the above-described plating layers, two or more layers of the same kind or different kind may be applied to form a composite layer.

The plated steel plate may be the one prepared by applying plating of Ni or the like at a small coating weight onto the steel plate, followed by applying various kinds of plating given above.

The plated steel plate may be the one prepared by applying plating of Ni or the like at a small coating weight onto the steel plate, followed by applying various kinds of plating given above.

The plating described above may be formed by either one of electrolytic method, fusion method, and vapor phase method.

A preferred coating weight of plating is not less than 10 $g/m^2$. Less than 10 $g/m^2$ of coating weight induces problems because of poor corrosion resistance. In the case of Zn—Ni alloy plating, Zn—Fe alloy plating, Zn—Mn alloy plating, Zn—Co alloy plating, and Zn—Cr alloy plating, the anti-powdering performance degrades when the coating weight exceeds 60 $g/m^2$, so the coating weight is preferably in a range of from 10 to 60 $g/m^2$. For further improved corrosion resistance and anti-powdering performance, the coating weight is preferably in a range of from 15 to 60 $g/m^2$.

To prevent generation of film defects and irregularity on the surface of the zinc phosphate composite coating on the plating film, which processing is described later, it is possible to apply treatment of alkaline degreasing, solvent degreasing, and surface preparation treatment on the plating film, in advance. These pre-treatments include (1) the treatment using an acidic or alkaline aqueous solution containing at least one metallic ion selected from the group consisting of Ni ion, Co ion, and Fe ion, (2) the treatment contacting with a titanium colloid aqueous solution, and (3) the treatment to etch the top layer of the metallic oxide formed on the surface of the plated steel plate using an inorganic acid, an organic acid, or a cheleting compound such as EDTA and NTA. The effect of the present invention is available with any of these kinds of steel plates as the substrate.

As for the zinc phosphate composite-treated steel plate, according to the present invention, a zinc phosphate coating is formed as the first layer on the above-described zinc-base plated steel plates, and an organic coating is formed as the second layer on the first layer. The zinc-phosphate coating of the first layer improves the coating adhesiveness owing to the anchor effect, and contributes to the improvement of lubrication by preventing the direct contact between the steel plate and the tools during sliding actions.

According to the present invention, a zinc phosphate coating containing at least one substance selected from the group consisting of nickel, manganese, and magnesium is applied. The coating exists presumably in a form that a portion of zinc in the zinc phosphate coating is substituted by the above-described metal contained in the coating. That form of coating induces the interaction with the organic coating as the top layer, thus providing excellent corrosion resistance, anti-powdering performance, lubrication, and coating adhesiveness.

The content of at least one substance selected from the group consisting of nickel, manganese, and magnesium, in the zinc phosphate coating is preferably in a range of from 0.5 to 8.5 mass % as the total. By specifying the total content of these metals in the coating to that range, the corrosion resistance, the lubrication, and the coating adhesiveness are further improved. When particularly superior corrosion resistance and coating adhesiveness are required, it is more preferable to specify the total content of nickel, manganese, and magnesium to a range of from 2.5 to 7 mass %. The corrosion resistance and the coating adhesiveness are drastically improved by the existence of nickel as the essential component in a range of from 1 to 5.5 mass %, and manganese and/or magnesium in a range of from 0.5 to 4 mass % as the total.

The coating weight of the zinc phosphate composite coating as the first layer is preferably in a range of from 0.2 to 2.5 $g/m^2$. If the coating weight thereof is less than 0.2 $g/m^2$, the coating adhesiveness and the corrosion resistance degrade. If the coating weight thereof exceeds 2.5 $g/m^2$, powdering increases under sliding conditions, thus degrading the lubrication and resulting in poor spot weldability, uniformity in electrodeposition coating at polished portions, and image sharpness. In view of lubrication, coatability, corrosion resistance, and weldability, more preferable range of coating weight is from 0.5 to 2.0 $g/m^2$, and most preferably from 0.7 to 1.5 $g/m^2$.

The method of zinc phosphate treatment for forming the zinc phosphate coating layer may be either one of reaction type treatment, coating type treatment, and electrolytic type treatment.

An example of the reaction type treatment is that a plated steel plate is subjected to degreasing, washing with water, and surface preparation treatment, followed by contacting with a treatment solution of an aqueous solution consisting mainly of: phosphoric acid ion, nitric acid ion, and zinc ion, and at least one substance selected from the group consisting of nickel ion, manganese ion, and magnesium ion; further containing, at need, (1) and (2) given below, then washing with water and drying.

(1) At least one substance selected from the group consisting of iron ion, cobalt ion, and calcium ion.

(2) At least one substance selected from the group consisting of peroxide, fluoride ion, fluorine complex ion, and nitrous acid ion.

Regarding the coating type treatment, at least one side of the plated steel plate is coated with a zinc phosphate treatment solution consisting mainly of phosphoric acid ion, nitric acid ion, and zinc ion, and at least one substance selected from the group consisting of nickel ion, manganese ion, and magnesium ion. Any kind of coating method is applicable. That is, coating by roll-coater method, coating by immersion method or spray method followed by applying air-knife method or roll-squeezing method to adjust the coating weight may be used. After coating a zinc phosphate treatment solution onto the surface of the plated steel plate, drying may be given using a drier, a hot air furnace, a high frequency induction heating furnace, or an infrared furnace to form the zinc phosphate coating.

Drying temperature of the coating in the case that the coating is formed by the coating method is preferably in a range of from 70 to 400° C. as the ultimate plate temperature. If the drying temperature is less than 70° C., the drying of coating becomes insufficient, which induces stickiness of the coating and degradation in coating adhesiveness, and induces irregular coating on forming the organic coating of the second layer. If the ultimate plate temperature exceeds 400° C., the effect saturates, which not only is uneconomical but also degrades corrosion resistance owing to the tendency of defect occurrence in coating. Accordingly, more preferable baking temperature is in a range of from 100 to 300° C., and most preferable one is from 120 to 170° C.

The organic coating formed as the upper layer on the zinc phosphate composite coating is described below. According to the present invention, the organic coating formed on the zinc phosphate coating layer consisting mainly of a block urethane-modified epoxy resin prepared by mixing a modified epoxy resin (A) comprising an epoxy resin, a multifunctional amine, and a monoisocyanate, and a block urethane (B) comprising a polyol, a polyisocyanate, and a block-forming agent, at mixing rates (A/B) of from 95/5 to 50/50 (weight ratio of nonvolatile matter).

Examples of the epoxy resin are: an epoxy resin prepared by glycidil-etherification of Bisphenol A, Bisphenol F, and Novolak; and an epoxy resin prepared by glycidil-etherfication of Bisphenol A with the addition of propylene oxide or ethylene oxide. Furthermore, an aliphatic epoxy resin, an alicyclic epoxy resin, and a polyether-base epoxy resin may be applied. Two or more of these epoxy resins may be applied. In view of corrosion resistance, the epoxy resins preferably have epoxy equivalents of not less than 400.

The modified epoxy resin (A) according to the present invention is an epoxy resin modified by a multifunctional amine and a monoisocyanate.

Modification of epoxy resin by a multifunctional amine is conducted by reacting the glycidil group in the epoxy resin with a multifunctional amine. Examples of the multifunctional amine are: a primary alkanol amine such as ethanol amine, propanol amine, isopropanol amine, and butanol amine; a primary alkyl amine such as propyl amine, butyl amine, octyl amine, and decyl amine; an amine having two or more of active hydrogens in a single molecule, such as ethylene diamime, diethylene triamine, tetraethylene pentamine, xylene diamine, aminoethyl pyperadine, and norbornane diaminomethyl. Two or more of these amines may be applied together. In view of corrosion resistance and coating adhesiveness, alkanol amine is preferred.

The corrosion resistance is further improved by modifying an epoxy resin by monoisocyanate. The monoisocyanate may be the one prepared by reacting phosgene with an aliphatic monoamine or an aromatic monoamine. Alternatively, a monoisocyanate may be the one prepared by reacting an isocyanate group at a molecular terminal of diisocyanate compound with either one of an aliphatic alcohol, an aromatic alcohol, and an alicyclic alcohol. The alcohol is preferably the one having 4 or more of carbon atoms in view of solubility with the epoxy resin. Examples of the diisocyanate are: an aliphatic isocyanate such as hexamethylene diisocyanate and trimethylhexamethylene diisocyanate; an aromatic isocyanate such as xylylene diisocyanate, 2,4-tolylene diisocyanate, and 2,6-tolylene diisocyanate; and an alicyclic isocyanate such as isophorone diisocyanate and norbornane diisocyanate methyl. These compounds may be applied mixing two or more of them.

An example of synthesis of the modified epoxy resin (A) is the following. To a glycidil group in an epoxy resin, the active hydrogen in a multifunctional amine is mixed at ratios of 1.1 to 1.8 equivalent. The mixture is reacted at temperatures of from 70 to 150° C. for 4 to 10 hours. Further monoisocyanate is added to the reacting mixture at equivalents of from 0.7 to 2.0 to the active hydrogen in the residual amine, to continue the reaction at temperatures of from 30 to 100° C.

The block urethane according to the present invention is prepared by protecting a highly active isocyanate group in the isocyanate compound using an adequate compound, and the block urethane dissociates the block-forming agent under heating, thus readily regenerates the activity of the isocyanate group. That is, the block urethane plays a role of a curing agent of the modified epoxy resin.

Examples of polyol are: a secondary alcohol such as ethylene glycol, propylene glycol, 1,6-hexane diol, diethylene glycol, and triethylene glycol; a tertiary alcohol such as glycerin and trimethylol propane; a low molecular weight polyol such as pentaerythritol; a polyester polyol prepared from caprolactone or low molecular weight polyol and dicarboxylic acid; and a high molecular weight polyol such as polyethylene glycol, polypropylene glycol, and polytetramethylene glycol, which have 400 or higher molecular weight. Two or more of these polyols may be used together. Use of a high molecular weight polyol as the polyol gives the organic coating adequate hydrophilicity, which improves the compatibility with a cationic electrodeposition coating to give a smooth coating surface, thus providing superior image sharpness after intermediate and top coating and superior uniformity of electrodeposition coating at polished portions.

Applicable polyisocyanates include all the above-described diisocyanates, their mixtures, and their polynuclei bodies. Examples of block-forming agent are: a phenol-base compound such as phenol; a lactam-base compound such as ϵ-caprolactam; an oxime-base compound such as methylethylketone; and an imine-base compound such as ethyleneimine. Two or more of these compounds may be used together. The block urethane (B) may be prepared by mixing and reacting a polyisocyanate with a polyol at a ratio that the isocyanate group in the polyisocyanate is in excess amount to the amount of hydroxyl group of the polyol to synthesize a prepolymer, then by protecting the residual isocyanate groups in the prepolymer using a block-forming agent. The reaction temperature is preferably in a range of from 30 to 100° C.

The block urethane-modified epoxy resin may be prepared by mixing the above-described modified epoxy resin (A) and the block urethane (B). The mixing ratio (A/B) is in a range of from 95/5 to 50/50 as weight ratio of nonvolatile matter. If the ratio of the modified epoxy resin (A) exceeds 95/5, the image sharpness after intermediate and top coating and the uniformity of electrodeposition coating at polished portions become poor. If the ratio of the modified epoxy resin (A) is less than 50/50, the corrosion resistance degrades. To attain further superior image sharpness, uniformity of electrodeposition coating at polished portions, and corrosion resistance, the value of (A/B) is preferably in a range of from 90/10 to 60/40.

According to the present invention, the organic coating may further contain, at need, a rust-preventive additive or a solid lubricant, or both of them, to attain further superior performance.

According to the present invention, further superior corrosion resistance and coatability are attained by adjusting the content of the rust-preventive additive in the organic coating on the weight basis of nonvolatile matter to a range of preferably from 1 to 10 parts by weight to 100 parts by weight of the above-described block urethane-modified epoxy resin.

If the content of the rust-preventive additive is less than 1 part by weight to 100 parts by weight of the block urethane-modified epoxy resin, the improvement effect of corrosion resistance is not sufficient. If the content thereof exceeds 100 parts by weight, peeling of coating likely occurs under sliding conditions, thus degrading the anti-powdering performance and the lubrication. In view of attaining further superior corrosion resistance, lubrication, anti-powdering performance, and coating adhesiveness, a preferable range of mixing is from 10 to 80 parts by weight, more preferably from 20 to 70 parts by weight.

Examples of preferred rust-preventive additive according to the present invention are a silica, a phosphate, a molybdate, a phosphomolybdate (for example, aluminum phosphomolybdate), an organic phosphoric acid and its salt (for example, phytic acid, phosphonic acid, and their metallic salt, alkali metal salt, alkali earth metallic salt); an organic inhibitor (for example, hydrazine derivative, thiol compound). These rust-preventive additives may be used separately or mixing two or more of them. Among these rust-preventive additives, silica and phosphate are more preferable.

Examples of applicable silica according to the present invention are: a dry silica (for example, AEROSIL 130, AEROSIL 200, AEROSIL 300, AEROSIL 380, AEROSIL 972, AEROSILR 811, AEROSIL R805, produced by JAPAN AEROSIL CO., LTD.); an organosilica sol (for example, MA-CT, IPA-ST, NBA-ST, IBA-ST, EG-ST, XBA-ST, ETC-ST, DMAC-ST, produced by Nissan Chemical Industries, Ltd.); a wet silica prepared by sedimentation method (for example, T-32(S), K-41, F-80, produced by Tokuyama Corp.); a wet silica prepared by gel method (for example, SILOID 244, SILOID 150, SILOID 72, SILOID 65, SHIELDEX, produced by FUJI DAVIDSON CHEMICAL. Two or more of these silicas may be used together.

When the surface of silica is hydrophobicized through the substitution of

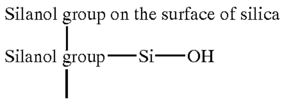

by methyl group or the like, then thus prepared hydrophobic silica is added to the epoxy resin, the organic coating gives poor compatibility with a cationic electrodeposition coating which is a water-base coating, which fails to obtain smooth electrodeposition coating surface to result in poor image sharpness after intermediate and top coating and poor smoothness on the surface of electrodeposition coating at polished portions. Accordingly, to attain superior image sharpness and uniformity in electrodeposition coating at polished portions, a silica which is not hydrophobicized on the surface thereof (or a hydrophilic silica) is preferred. As a method to attain further improvement of the corrosion resistance of silica according to the present invention, a silica which is ion-exchanged using a cation (for example, ion of calcium, zinc, cobalt, lead, strontium, lithium, barium, and manganese) having a function to prevent rust-generation from silica may be used. These kinds of cations presumably exchange ions from protons in a corrosive environment, then are released from the silica to form stable corrosion products on the surface of metal, which products suppress the corrosion.

A preferred applicable silica according to the present invention has specific surface areas of from 20 to 1000 $m^2/g$ (determined by the BET method). If the specific surface area is less than 20 $m^2/g$, the improvement effect of corrosion resistance is not sufficient, the smoothness of the surface of electrodeposition coating degrades, and the uniformity of electrodeposition coating at polished portions degrades. If the specific surface area exceeds 1000 $m^2/g$, the thixotropic property of coating composition containing silica increases, which degrades the workability of coating using a roll coater and the like.

According to the present invention, further superior lubrication and anti-powdering performance are attained by introducing 1 to 80 parts by weight of the solid lubricant as nonvolatile matter into the organic coating to 100 parts by weight of the block urethane-modified epoxy resin.

If the content of the solid lubricant is less than 1 part by weight to 100 parts by weight of the block urethane-modified epoxy resin, the improvement in lubrication and anti-powdering performance is not expected. If the content exceeds 80 parts by weight, the coating adhesiveness, the corrosion resistance, and the coatability degrade. In view of the coating adhesiveness, the lubrication, the corrosion resistance, and the coatability, particularly preferred content is in a range of from 5 to 50 parts by weight, most preferably from 15 to 35 parts by weight.

Examples of the solid lubricant preferred in the present invention are the following.

(1) Polyolefin wax, paraffin wax: for example, polyethylene wax, synthesized paraffin, micro wax, chlorinated hydrocarbon.

(2) Fluororesin-base wax: for example, polyfluoroethylene resin (polytetrafluoroethylene resin), polyfluorovynil resin, polyfluorovinylidene resin.

(3) Fatty acid amid-base compounds: for example, stearic acid amide, palmitic acid amide, methylene bis-stearoamide, ethylene bis-stearoamide, oleic acid amide, ethyl acid amide, alkylene bis-fatty acid amide.

(4) Metallic soaps: for example, calcium stearate, zinc stearate, calcium laurate, calcium palmitate.

(5) Metallic sulfides: for example, molybdenum disulfide, tungsten disulfide.

(6) Other: for example, graphite, graphite fluoride, boron nitride.

When particularly superior lubrication is required, it is preferable to use at least one compound selected from the group consisting of polyethylene wax, polytetrafluoroethylene resin, and boron nitride. Use of polyethylene wax and polytetrafluoroethylene resin together provides further superior lubrication performance.

According to the present invention, the average particle size of the solid lubricant is preferably in a range of from 0.05 to 25 $\mu$m. If the particle size is less than 0.05 $\mu$m, the surface concentration of the lubricant is enriched to widen the occupied area of lubricant on the uppermost surface layer of the organic coating, which degrades the coating adhesiveness. On the other hand, if the particle size exceeds 25 $\mu$m, the image sharpness degrades owing to fine irregularity on the coating surface, further the lubricant separates from the organic coating, which degrades lubrication and corrosion resistance. To obtain particularly superior image sharpness, corrosion resistance, lubrication, and anti-powdering performance, the average particle size is preferably in a range of from 1 to 15 $\mu$m, and most preferably from 3 to 10 $\mu$m.

By regulating the softening point of polyethylene wax to a range of from 100 to 135° C., more preferably from 110 to 130° C., the lubrication and the anti-powdering performance are further improved.

The organic coating according to the present invention consists mainly of the above-described organic resin, the rust-preventive additive, and the solid lubricant. Adding to those components, other components may further be added to the organic coating unless they do not give bad influence to the quality and performance of the organic coating. Examples of other applicable components are: an organic resin (for example; acrylic resin, urethane resin, alkyd-base resin, fluororesin, acrylic-silicone resin, silicone resin, phenol resin, melamine-base resin, amino-base resin); fine oxide particles such as those of alumina and zirconia; a conductive pigment; a color pigment (for example, condensed polycyclic organic pigment, phthalocyanine-base pigment); a color dye (for example, azo-base dye, azo-base metallic complex salt dye); a film-forming assistant; a dispersion-improving agent; and a defoaming agent. These other components may be added separately or two or more thereof together.

A preferable range of coating weight of the organic coating is from 0.05 to 1.5 g/m$^2$. If the coating weight is less than 0.05 g/m$^2$, the corrosion resistance and the lubrication degrade. If the coating weight exceeds 1.5 g/m$^2$, the weldability, the uniformity of electrodeposition coating at polished portions, and the image sharpness degrade. Thus, a preferable range of the coating weight is from 0.2 to 1.0 g/m$^2$, and most preferably from 0.3 to 0.7 g/m$^2$, in view of lubrication, corrosion resistance, weldability, uniformity of electrodeposition coating at polished portions, and image sharpness.

An example of the method for forming the organic coating according to the present invention is to apply a coating composition which is prepared by dissolving or dispersing the above-described individual components in an organic solvent onto at least one side of the steel plate covered with the above-described zinc phosphate coating, followed by drying to form the coating.

Uniform thin coating is available by adding an organic solvent at concentrations of from 70 to 95 mass % to the coating composition to be applied. If the solvent content in the coating composition is less than 70 mass %, the viscosity of the coating becomes high and the thixotropic property is strong, which results in difficulty in forming a uniform and thin coating, and a problem of the coating workability arises. If the solvent content exceeds 95 mass %, the solid concentration becomes unnecessarily low level, which fails in attaining a specified coating weight on applying the coating composition using a roll coater or the like. A preferable organic solvent according to the present invention is the one containing diacetone alcohol and/or diethylene glycol monobutylether.

The reason of the selection of that kind of organic solvent is described below. According to the present invention, most preferable means to attain superior image sharpness is to add a silica which is not treated by hydrophobicizing the surface thereof, (or a hydrophilic silica) as the rust-preventive additive to the above-described specific block urethane-modified resin. However, if excessive amount of silica which is not treated by hydrophobicizing the surface thereof is added to the coating composition, the viscosity of the coating becomes extremely high, which induces a problem of easy-formation of irregularity in thin-film coating using a roll coater and the like. For reducing the viscosity of coating, normally a solvent having strong hydrogen-bonding property is used, for example, water and alcohol-base solvent. That type of solvent has, however, excessively strong polarity to the block urethane-modified epoxy resins according to the present invention, so they have no solubility, and are not able to be applied. In addition, even when a ketone-base organic solvent is used together with water and alcohol-base solvent aiming to provide solubility against the block urethane-modified epoxy resin, the use amount of water and alcohol-base solvent within a range to maintain the solubility is limited, so that the amount is not sufficient to reduce the viscosity, and the system cannot be applied to the coating composition of the present invention.

The inventors of the present invention investigated these kinds of solvent, and found that diacetone alcohol and/or diethylene glycol monobutylether has solubility to the block urethane-modified epoxy resin according to the present invention, and prevents the viscosity increase in the coating. That is, the use of the solvents allows to form uniform thin film by roll coater or the like without increasing the viscosity of the coating even when large amount of silica which is not treated by hydrophobicization of the surface thereof is added to the coating composition. The presumable reason is that that kind of solvent contains carbonyl group or ether group in the molecule so that the solvent has solubility to the block urethane-modified epoxy resin according to the present invention, also the primary hydroxyl group therein establishes hydrogen bonding with the silanol group on the surface of silica, and that these solvent molecules act as steric hindrance, thus to suppress the formation of three-dimensional network structure caused from coagulation of silica.

A preferable range of the content of diacetone alcohol and/or diethylene glycol monobutylether is 50 mass % or more in the organic solvent of the coating composition. If the content is less than 50 mass %, the effect of suppressing the increase in viscosity of the sample becomes insufficient, and irregularity on thin coating by a roll coater and the like is likely induced. In view of economy, other inexpensive organic solvent such as xylene, cyclohexane, and isopropyl glycol may be used in parallel within a range of less than 50 mass %.

Before applying the coating composition, it is possible to arbitrarily give preliminary treatment such as washing with water, drying, and the like to the steel plate on which a zinc phosphate coating is formed.

Any type of method for applying the coating composition onto the steel plate may be adopted. Normally, the application is done by roll-coater method. However, it is possible to, after applying by immersion method and spray method, adjust the coating weight by air-knife method or roll-squeezing method.

The drying after applied the coating composition may be done by a drier, a hot-air furnace, a high frequency induction heating furnace, or an infrared furnace.

A preferred drying temperature is in a range of from 50 to 250° C. as the ultimate plate temperature. If the drying temperature is lower than 50° C., the coating is insufficiently dried to induce stickiness on the coating, and the coating is damaged on touching to rolls after drying, which degrades the coating adhesiveness, the corrosion resistance, and the lubrication performance. If the ultimate plate temperature exceeds 250° C., the coatability degrades, and the production cost becomes unfavorable. In this respect, a preferable range of baking temperature is from 80 to 200° C., most preferably from 100 to 140° C.

The present invention deals with a steel plate having the above-described coating structure on both sides or on one side thereof. Consequently, examples of the mode for carrying out the present invention are the following.

(1) One side: Steel plate surface+Zinc phosphate composite coating+Organic coating The other side: Steel plate surface+Zinc phosphate composite coating (2) One side: Steel plate surface+Zinc phosphate composite coating+Organic coating The other side: Steel plate surface (3) Both sides: Steel plate surface+Zinc phosphate composite coating+Organic coating According to the present invention, the organic coating may further be covered with a rust-preventive oil layer. The rust-preventive oil consists mainly of a rust-preventive additive (for example, oil-soluble surfactant), a petroleum-base base material (for example, mineral oil, solvent), an oil film adjuster (for example, mineral oil, crystallizing material, a viscous material), an antioxidizing agent (for example, phenol-base antioxidant), a lubricant (for example, extreme-pressure additive). Examples of the rust-preventive oil are a normal rust-preventive oil, a cleaning rust-preventive oil, a lubrication rust-preventive oil. Examples of the normal rust-preventive oil are a finger print removal type rust-preventative oil which is prepared by dissolving and decomposing a base material in a petroleum-base solvent, a solvent cutback type rust-preventive oil, a lubricant oil type rust-preventive oil using petrolactam and wax as the base materials, and a volatile rust-preventive oil.

A preferable coating weight of the rust-preventive oil film is in a range of from 0.01 to 10 g/m$^2$. If the coating weight is less than 0.01 g/m$^2$, the effect of rust-preventive oil application cannot be attained. If the coating weight exceeds 10 g/m$^2$, the degreasing ends insufficiently, which results in poor coating adhesiveness. For attaining further superior corrosion resistance and coating adhesiveness, the coating weight is preferably in a range of from 0.5 to 3 g/m$^2$.

The surface-treated steel plates according to the present invention are applicable not only to automobiles and household electric appliances, but also to building materials.

Embodiments

Cold-rolled steel plates each having a plate thickness of 0.7 mm and a surface roughness (Ra) of 1.0 $\mu$m were used to prepare plated steel plates by applying plating of zinc-base coating.

Thus prepared plated steel plates were subjected to alkali degreasing, washing with water, and surface preparation treatment, then were brought into contact with a zinc phosphate treatment solution, followed by washing with water and drying, thus obtaining the zinc phosphate-treated steel plates. Onto the zinc phosphate-treated steel plates, respective coating compositions were applied using the roll coater method, which were then dried without washing with water. Then, a rust-preventive oil or a cleaning oil was applied to the dried steel plates. The obtained surface-treated steel plates were tested to determine lubrication performance, anti-powdering performance, corrosion resistance (non-coating corrosion resistance, after coating corrosion resistance), coatability (coating adhesiveness, uniformity of electrodeposition coating at polished portions, and image sharpness), and weldability. Individual conditions are described below.

(1) Plated Steel Plates

Table 13 shows the kinds of plating and the coating weights applied onto the zinc-base plated steel plates used in the example.

(2) Zinc Phosphate Composite Treatment

Each of the plated steel plates was treated by degreasing and washing with water to clean the surface. The composition, the treatment temperature, and the treatment time for the surface-preparation solution and the zinc phosphate treatment solution were adjusted. The zinc phosphate composite-treated steel plates listed in Table 14 were prepared, each of which gives different coating weight and coating composition. The following is an example of the method for preparing the zinc phosphate-treated steel plates.

[Zinc Phosphate Composite Coating Steel Plate 1]

A plated steel plate (A in Table 13) was treated by degreasing (FCL 4480, produced by Nihon Parkerizing Co., Ltd., 18 g/litter (hereinafter denote to "g/l"), 45° C., 120 seconds spraying), then by washing with water (20 seconds spraying). Thus treated steel plate was immersed in a zinc phosphate treatment solution 1 given in Table 12, heated to 50° C., for 10 second, followed by washing with water and drying, to obtain the zinc phosphate composite coating steel plate 1.

[Zinc Phosphate Composite Coating Steel Plate 2]

A plated steel plate (B in Table 13) was treated by degreasing (FCL 4480, produced by Nihon Parkerizing Co., Ltd., 18 g/l, 45° C., 120 seconds spraying), then by washing with water (20 seconds spraying). The steel plate was further treated by surface preparation treatment (PREPAREN Z, produced by Nihon Parkerizing Co., Ltd., 1.5 g/l, room temperature, 2 seconds spraying). Thus treated steel plate was immersed in a zinc phosphate treatment solution 2 given in Table 12, heated to 45° C. for 1 second, followed by washing with water and drying, to obtain the zinc phosphate composite coating steel plate 2.

[Zinc Phosphate Composite Coating Steel Plate 3]

The same treatment as in the zinc phosphate composite coating steel plate 2 was applied except that the plated steel plate of above-described zinc phosphate composite coating steel plate 2 was C in Table 13 instead of B in Table 13.

[Zinc Phosphate Composite Coating Steel Plate 5]

A plated steel plate (B in Table 2) was treated by degreasing (FCL 4480, produced by Nihon Parkerizing Co., Ltd., 18 g/l, 45° C., 120 seconds spraying), then by washing with water (20 seconds spraying). The steel plate was further treated by surface preparation treatment (PREPAREN ZN, produced by Nihon Parkerizing Co., Ltd., 1.5 g/l, room temperature, 2 seconds spraying). Thus treated steel plate was subjected to 4 seconds of spraying a zinc phosphate treatment solution 3 given in Table 12, heated to 60° C., followed by washing with water and drying, to obtain the zinc phosphate composite coating steel plate 5.

TABLE 12

| | Composition of zinc phosphate treatment solution (g/l) | | | | | | | | | Acid ratio |
|---|---|---|---|---|---|---|---|---|---|---|
| | Zn | Ni | Mn | Mg | Ca | $PO_4$ | $NO_3$ | F | $NO_2$ | (Total acid/Free acid) |
| Phosphate treatment solution 1 | 0.8 | 3 | 0.5 | — | 0.5 | 10 | 7 | 2 | 0.5 | 17 |
| Phosphate treatment solution 2 | 1.3 | 0.5 | 0.5 | — | — | 20 | 3 | 1.5 | 0.3 | 21 |
| Phosphate treatment solution 3 | 1.4 | 3.2 | — | 0.7 | — | 12.5 | 13 | 0.5 | — | 10 |

(3) Coating Composition (3-1) Organic Resin

Table 15 shows the organic resins used in the organic coatings in the example. The block urethane-modified resins listed in the table were prepared by the method given below.

(a) Modified Epoxy Resin (A)

To a reactor provided with a condenser, an agitator, and a thermometer, each of 500 parts by weight of Bisphenol A type epoxy resin (having an epoxy equivalent of 1500), 385 parts by weight of xylene, and 385 parts by weight of cyclohexanone was put thereinto, then the mixture was heated to dissolve under agitation. Further, 20 parts by weight of isopropanolamine was added to the mixture, which mixture was then reacted at 100° C. for 5 hours. Furthermore, 65 parts by weight of monoisocyanate of an adduct of 2,4-tolylene diisocyanate (containing 13% of isocyanate (NCO %)) and of octyl alcohol was added to the mixture to react them at 60° C. for 5 hours, thus obtaining a modified epoxy resin A containing 40% resin.

(b) Block Urethane (B)

To a reactor provided with a condenser, an agitator, and a thermometer, each of 440 parts by weight of polyethylene glycol having a molecular weight of about 1000, and 125 parts by weight of xylene was put thereinto, then the mixture was heated to 60° C. under agitation. Further, 153 parts by weight of 2,6-tolylene diisocyanate was added to the mixture. The obtained intermediate product showed 4.8% of NCO%. Furthermore, 106 parts by weight of ϵ-caprolactam was added to the mixture to continue the reaction. After confirmed the NCO% of zero, 175 parts by weight of butanol was added to the mixture, thus obtained the block urethane B1 having a resin content of 70%. Using the similar apparatus and conditions, and from 500 parts by weight of polypropylene glycol having a molecular weight of 4000, 300 parts by weight of xylene, and 42 parts by weight of hexamethylene diisocyanate, an intermediate product having an NCO% of 1.2% was obtained. Furthermore, 23 parts by weight of methylethyleketoxime was added to the mixture to let the reaction continue. After confirmed the zero NCO%, 77 parts by weight of butanol was added to the mixture, and the block urethane B2 having a resin content of 60% was obtained.

(3-2) Rust-preventive Additive

Table 16 shows the solid lubricants used in the coating compositions.

(3-3) Lubricant

Table 17 shows the lubricants used in the coating compositions.

(3-4) Coating Composition

Table 18 shows the coating compositions used in the example. In Table 18, the coating workability of the coating compositions was evaluated as follows.

[Evaluation of Coating Workability]

When the coating has strong thixotropic property, the coating once applied by a roll coater is difficult to flow, so that the trace of roll travel is likely left behind, and smooth coating is difficult to attain. To this point, the degree of thixotropy of the coating was determined to evaluate the coating workability through the measurement of TI values (Thixotropy index: 6 rpm, viscosity rate at 6 rpm) which is given on the non-Newtonian evaluation using a rotational viscometer, a reference test defined by JIS K5400, 4.5.3 (1990).

◎: not less than 0.9 and less than 1.3

○: not less than 1.3 and less than 1.6

Δ: not less than 1.6 and less than 3.6

X: not less than 3.6

(4) Rust-preventive Oil

Table 19 shows the rust-preventive oils used in the example.

TABLE 13

| | |
|---|---|
| A | Alloyed hot dip galvanized steel plate (coating weight: 60 g/m$^2$) |
| B | Electrolytically galvanized steel plate (coating weight: 30 g/m$^2$) |
| C | Electrolytically Zn-11% Ni alloy plated steel plate (coating weight: 20 g/m$^2$) |
| D | Hot dip galvanized steel plate (coating weight: 90 g/m$^2$) |
| E | Electrolytically Zn-1% Co alloy plated steel plate (coating weight: 30 g/m$^2$) |
| F | Two-layer alloyed hot dip galvanized steel plate (coating weight: 5 g/m$^2$ for upper layer; 60 g/m$^2$ for lower layer) |
| G | Hot dip Zn-5% Al-0.5% Mo alloy plated steel plate (coating weight: 90 g/m$^2$) |
| H | Hot dip Zn-55% Al-1.6% Si alloy plated steel plate (coating weight: 75 g/m$^2$) |
| I | Hot dip Zn-0.5% Mn alloy plated steel plate (coating weight: 150 g/m$^2$) |

TABLE 14

| No. | Plated steel plate*1 | Coating weight (g/m$^2$) | Ni content (mass %) | Mn content (mass %) | Mg content (mass %) |
|---|---|---|---|---|---|
| 1 | A | 1.1 | 2.6 | 2.8 | — |
| 2 | B | 0.7 | 1.0 | 2.8 | — |
| 3 | C | 0.6 | 0.2 | 1.8 | — |
| 4 | D | 1.0 | 2.0 | 3.0 | — |
| 5 | B | 0.9 | 5.6 | — | 0.3 |
| 6 | B | 1.0 | 5.5 | — | 0.5 |
| 7 | E | 1.0 | 1.0 | 2.5 | — |
| 8 | F | 1.0 | 2.7 | 3.0 | — |
| 9 | G | 1.0 | 2.8 | 3.2 | — |
| 10 | H | 1.0 | 2.8 | 3.2 | — |
| 11 | I | 1.0 | 2.1 | 3.2 | — |
| 12 | B | 1.0 | 3.0 | — | — |
| 13 | B | 1.0 | — | 3.5 | — |
| 14 | B | 0.7 | 0.1 | 0.5 | — |
| 15 | B | 1.0 | 2.0 | 0.5 | — |
| 16 | B | 1.1 | 3.0 | 4.0 | — |
| 17 | B | 1.1 | 0.5 | 5.5 | — |
| 18 | B | 1.0 | 4.5 | 4.0 | — |
| 19 | B | 1.1 | 5.5 | 4.0 | — |
| 20 | B | 1.0 | — | — | — |
| 21 | B | — | — | — | — |
| 22 | B | 0.2 | 1 | 2.4 | — |
| 23 | B | 0.5 | 1 | 2.7 | — |
| 24 | B | 1.5 | 2.8 | 3.1 | — |
| 25 | B | 2.0 | 2.8 | 3.1 | — |
| 26 | B | 2.5 | 2.8 | 3.1 | — |
| 27 | B | 3.0 | 2.8 | 3.1 | — |

TABLE 15

| No. | Modified epoxy resin (A) | Block urethane (B) | A/B* |
|---|---|---|---|
| 1 | Modified epoxy resin A | Block urethane B1 | 95/5 |
| 2 | Modified epoxy resin A | Block urethane B1 | 90/10 |
| 3 | Modified epoxy resin A | Block urethane B1 | 70/30 |
| 4 | Modified epoxy resin A | Block urethane B1 | 60/40 |
| 5 | Modified epoxy resin A | Block urethane B1 | 50/50 |
| 6 | Modified epoxy resin A | Block urethane B2 | 95/5 |
| 7 | Modified epoxy resin A | Block urethane B2 | 90/10 |
| 8 | Modified epoxy resin A | Block urethane B2 | 70/30 |
| 9 | Modified epoxy resin A | Block urethane B2 | 60/40 |
| 10 | Modified epoxy resin A | Block urethane B2 | 50/50 |
| 11 | Modified epoxy resin A | Block urethane B1 | 97/3 |
| 12 | Modified epoxy resin A | Block urethane B1 | 45/55 |
| 13 | Modified epoxy resin A | Block urethane B2 | 97/3 |
| 14 | Modified epoxy resin A | Block urethane B2 | 45/55 |
| 15 | Amine-modified epoxy resin (No. 2 of Table 3 in JP-A-8033(1989)) | | |

*Weight ratio of non-volatile matter

TABLE 16

| No. | Name |
|---|---|
| 1 | AEROSIL R811 (dry silica, hydrophobic), produced by JAPAN AEROSIL CO., LTD. |
| 2 | AEROSIL R974 (dry silica, hydrophobic), produced by JAPAN AEROSIL CO., LTD. |
| 3 | AEROSIL R805 (dry silica, hydrophobic), produced by JAPAN AEROSIL CO., LTD. |
| 4 | AEROSIL 202 (dry silica, hydrophilic), produced by JAPAN AEROSIL CO., LTD. |
| 5 | AEROSIL 200 (dry silica, hydrophilic), produced by JAPAN AEROSIL CO., LTD. |
| 6 | AEROSIL 380 (dry silica, hydrophilic), produced by JAPAN AEROSIL CO., LTD. |
| 7 | ETC-ST (organosilica sol, hydrophilic), produced by Nissan Chemical Industries Co., Ltd. |
| 8 | FINESEAL T-32(S) (wet silica prepared by sedimentation method, hydrophilic), produced by Tokuyama Corp. |
| 9 | SILOID 244 (wet silica prepared by gel method, hydrophilic), produced by FUJI DAVIDSON CHEMICAL |
| 10 | SHIELDEX (calcium-exchanged silica, hydrophilic), produced by FUJI DAVIDSON CHEMICAL |

TABLE 17

| No. | Lubricant | Average particle size (μm) | Softening point (° C.) |
|---|---|---|---|
| 1 | Tungsten disulfide | 3 | — |
| 2 | Molybdenum disulfide | 3 | — |
| 3 | Graphite | 3 | — |
| 4 | Boron nitride | 3 | — |
| 5 | Polyethylene | 0.05 | 110 |
| 6 | Polyethylene | 1 | 110 |
| 7 | Polyethylene | 3 | 115 |
| 8 | Polyethylene | 7 | 110 |
| 9 | Polyethylene | 7 | 130 |
| 10 | Polyethylene | 9 | 130 |
| 11 | Polyethylene | 10 | 130 |
| 12 | Polyethylene | 15 | 125 |
| 13 | Polyethylene | 25 | 125 |
| 14 | Tetrafluoroethylene resin | 3 | — |
| 15 | Polyethylene | 7 | 97 |
| 16 | Polyethylene | 7 | 100 |
| 17 | Polyethylene | 7 | 135 |
| 18 | Polyethylene | 7 | 137 |

TABLE 18-1

| | | | | | | | Organic solvent | | | | Workability |
|---|---|---|---|---|---|---|---|---|---|---|---|
| No. | Resin*[1] | Content*[3] | Rust-preventive additive*[2] | Content*[3] | Lubricant*[4] | Content*[3] | Diacetone glycol*[5] | Diethylene glycol monobutylether*[5] | 2-Butoxy ethanol*[5] | Content*[6] | for coating Coating stability |
| 1 | 1 | 100 | 5 | 65 | 8 | 30 | 60 | 0 | 0 | 80 | ◎ |
| 2 | 2 | 100 | 5 | 65 | 8 | 30 | 60 | 0 | 0 | 80 | ◎ |
| 3 | 3 | 100 | 5 | 65 | 8 | 30 | 60 | 0 | 0 | 80 | ◎ |
| 4 | 4 | 100 | 5 | 65 | 8 | 30 | 60 | 0 | 0 | 80 | ◎ |
| 5 | 5 | 100 | 5 | 65 | 8 | 30 | 60 | 0 | 0 | 80 | ◎ |
| 6 | 6 | 100 | 5 | 65 | 8 | 30 | 60 | 0 | 0 | 80 | ◎ |
| 7 | 7 | 100 | 5 | 65 | 8 | 30 | 60 | 0 | 0 | 80 | ◎ |
| 8 | 8 | 100 | 5 | 65 | 8 | 30 | 60 | 0 | 0 | 80 | ◎ |
| 9 | 9 | 100 | 5 | 65 | 8 | 30 | 60 | 0 | 0 | 80 | ◎ |
| 10 | 10 | 100 | 5 | 65 | 8 | 30 | 60 | 0 | 0 | 80 | ◎ |
| 11 | 11 | 100 | 5 | 65 | 8 | 30 | 60 | 0 | 0 | 80 | ◎ |
| 12 | 12 | 100 | 5 | 65 | 8 | 30 | 60 | 0 | 0 | 80 | ◎ |
| 13 | 13 | 100 | 5 | 65 | 8 | 30 | 60 | 0 | 0 | 80 | ◎ |
| 14 | 14 | 100 | 5 | 65 | 8 | 30 | 60 | 0 | 0 | 80 | ◎ |
| 15 | 15 | 100 | 5 | 65 | 8 | 30 | 60 | 0 | 0 | 80 | ◎ |

TABLE 18-2

| | | | | | | | Organic solvent | | | | Workability |
|---|---|---|---|---|---|---|---|---|---|---|---|
| No. | Resin*[1] | Content*[3] | Rust-preventive additive*[2] | Content*[3] | Lubricant*[4] | Content*[3] | Diacetone glycol*[5] | Diethylene glycol monobutylether*[5] | 2-Butoxy ethanol*[5] | Content*[6] | for coating Coating stability |
| 16 | 3 | 100 | 1 | 65 | 8 | 30 | 60 | 0 | 0 | 80 | ◎ |
| 17 | 3 | 100 | 2 | 65 | 8 | 30 | 60 | 0 | 0 | 80 | ◎ |
| 18 | 3 | 100 | 3 | 65 | 8 | 30 | 60 | 0 | 0 | 80 | ◎ |
| 19 | 3 | 100 | 4 | 65 | 8 | 30 | 60 | 0 | 0 | 80 | ◎ |
| 20 | 3 | 100 | 6 | 65 | 8 | 30 | 60 | 0 | 0 | 80 | ◎ |
| 21 | 3 | 100 | 7 | 65 | 8 | 30 | 60 | 0 | 0 | 80 | ◎ |
| 22 | 3 | 100 | 8 | 65 | 8 | 30 | 60 | 0 | 0 | 80 | ◎ |
| 23 | 3 | 100 | 9 | 65 | 8 | 30 | 60 | 0 | 0 | 80 | ◎ |
| 24 | 3 | 100 | 10 | 65 | 8 | 30 | 60 | 0 | 0 | 80 | ◎ |

TABLE 18-2-continued

| | | | | | | | Organic solvent | | | | |
|---|---|---|---|---|---|---|---|---|---|---|---|
| No. | Resin*1 | Content*3 | Rust-preventive additive*2 | Content*3 | Lubricant*4 | Content*3 | Diacetone glycol*5 | Diethylene glycol monobutylether*5 | 2-Butoxy ethanol*5 | Content*6 | Workability for coating Coating stability |
| 25 | 3 | 100 | 5 | 65 | 1 | 30 | 60 | 0 | 0 | 80 | ◎ |
| 26 | 3 | 100 | 5 | 65 | 2 | 30 | 60 | 0 | 0 | 80 | ◎ |
| 27 | 3 | 100 | 5 | 65 | 3 | 30 | 60 | 0 | 0 | 80 | ◎ |
| 28 | 3 | 100 | 5 | 65 | 4 | 30 | 60 | 0 | 0 | 80 | ◎ |
| 29 | 3 | 100 | 5 | 65 | 5 | 30 | 60 | 0 | 0 | 80 | ◎ |
| 30 | 3 | 100 | 5 | 65 | 6 | 30 | 60 | 0 | 0 | 80 | ◎ |

TABLE 18-3

| | | | | | | | Organic solvent | | | | |
|---|---|---|---|---|---|---|---|---|---|---|---|
| No. | Resin*1 | Content*3 | Rust-preventive additive*2 | Content*3 | Lubricant*4 | Content*3 | Diacetone glycol*5 | Diethylene glycol monobutylether*5 | 2-Butoxy ethanol*5 | Content*6 | Workability for coating Coating stability |
| 31 | 3 | 100 | 5 | 65 | 7 | 30 | 60 | 0 | 0 | 80 | ◎ |
| 32 | 3 | 100 | 5 | 65 | 9 | 30 | 60 | 0 | 0 | 80 | ◎ |
| 33 | 3 | 100 | 5 | 65 | 10 | 30 | 60 | 0 | 0 | 80 | ◎ |
| 34 | 3 | 100 | 5 | 65 | 11 | 30 | 60 | 0 | 0 | 80 | ◎ |
| 35 | 3 | 100 | 5 | 65 | 12 | 30 | 60 | 0 | 0 | 80 | ◎ |
| 36 | 3 | 100 | 5 | 65 | 13 | 30 | 60 | 0 | 0 | 80 | ◎ |
| 37 | 3 | 100 | 5 | 65 | 14 | 30 | 60 | 0 | 0 | 80 | ◎ |
| 38 | 3 | 100 | 5 | 65 | 15 | 30 | 60 | 0 | 0 | 80 | ◎ |
| 39 | 3 | 100 | 5 | 65 | 16 | 30 | 60 | 0 | 0 | 80 | ◎ |
| 40 | 3 | 100 | 5 | 65 | 17 | 30 | 60 | 0 | 0 | 80 | ◎ |
| 41 | 3 | 100 | 5 | 65 | 18 | 30 | 60 | 0 | 0 | 80 | ◎ |
| 42 | 3 | 100 | — | — | 8 | 30 | 60 | 0 | 0 | 80 | ◎ |
| 43 | 3 | 100 | 5 | 1 | 8 | 30 | 60 | 0 | 0 | 80 | ◎ |
| 44 | 3 | 100 | 5 | 10 | 8 | 30 | 60 | 0 | 0 | 80 | ◎ |
| 45 | 3 | 100 | 5 | 20 | 8 | 30 | 60 | 0 | 0 | 80 | ◎ |

TABLE 18-4

| | | | | | | | Organic solvent | | | | |
|---|---|---|---|---|---|---|---|---|---|---|---|
| No. | Resin *1 | Content *3 | Rust-preventive additive *2 | Content *3 | Lubricant *4 | Content *3 | Diacetone glycol *5 | Diethylene glycol monobutylether *5 | 2-Butoxy ethanol *5 | Content *6 | Workability for coating Coating stability |
| 46 | 3 | 100 | 5 | 70 | 8 | 30 | 60 | 0 | 0 | 80 | ◎ |
| 47 | 3 | 100 | 5 | 80 | 8 | 30 | 60 | 0 | 0 | 80 | ◎ |
| 48 | 3 | 100 | 5 | 100 | 8 | 30 | 60 | 0 | 0 | 80 | ◎ |
| 49 | 3 | 100 | 5 | 120 | 8 | 30 | 60 | 0 | 0 | 80 | ◎ |
| 50 | 3 | 100 | 5 | 65 | 8 | — | 60 | 0 | 0 | 80 | ◎ |
| 51 | 3 | 100 | 5 | 65 | 8 | 1 | 60 | 0 | 0 | 80 | ◎ |
| 52 | 3 | 100 | 5 | 65 | 8 | 5 | 60 | 0 | 0 | 80 | ◎ |
| 53 | 3 | 100 | 5 | 65 | 8 | 15 | 60 | 0 | 0 | 80 | ◎ |
| 54 | 3 | 100 | 5 | 65 | 8 | 35 | 60 | 0 | 0 | 80 | ◎ |
| 55 | 3 | 100 | 5 | 65 | 8 | 50 | 60 | 0 | 0 | 80 | ◎ |
| 56 | 3 | 100 | 5 | 65 | 8 | 80 | 60 | 0 | 0 | 80 | ◎ |
| 57 | 3 | 100 | 5 | 65 | 8 | 100 | 60 | 0 | 0 | 80 | ◎ |
| 58 | 3 | 100 | — | — | — | — | 60 | 0 | 0 | 80 | ◎ |
| 59 | 3 | 100 | 5 | 65 | 8 | 30 | 50 | 0 | 10 | 80 | ◎ |
| 60 | 3 | 100 | 5 | 65 | 8 | 30 | 40 | 0 | 20 | 80 | Δ |

TABLE 18-5

| | | | | | | | Organic solvent | | | | |
|---|---|---|---|---|---|---|---|---|---|---|---|
| No. | Resin *1 | Content *3 | Rust-preventive additive *2 | Content *3 | Lubricant *4 | Content *3 | Diacetone glycol *5 | Diethylene glycol monobutylether *5 | 2-Butoxy ethanol *5 | Content *6 | Workability for coating Coating stability |
| 61 | 3 | 100 | 5 | 65 | 8 | 30 | 90 | 0 | 0 | 80 | ◎ |
| 62 | 3 | 100 | 5 | 65 | 8 | 30 | 30 | 30 | 0 | 80 | ◎ |
| 63 | 3 | 100 | 5 | 65 | 8 | 30 | 25 | 25 | 10 | 80 | ◎ |

TABLE 18-5-continued

| No. | Resin *1 | Content *3 | Rust-preventive additive *2 | Content *3 | Lubricant *4 | Content *3 | Organic solvent: Diacetone glycol *5 | Organic solvent: Diethylene glycol monobutylether *5 | Organic solvent: 2-Butoxy ethanol *5 | Organic solvent: Content *6 | Workability for coating Coating stability |
|---|---|---|---|---|---|---|---|---|---|---|---|
| 64 | 3 | 100 | 5 | 65 | 8 | 30 | 20 | 20 | 20 | 80 | Δ |
| 65 | 3 | 100 | 5 | 65 | 8 | 30 | 45 | 45 | 0 | 80 | ◎ |
| 66 | 3 | 100 | 5 | 65 | 8 | 30 | 0 | 60 | 0 | 80 | ○ |
| 67 | 3 | 100 | 5 | 65 | 8 | 30 | 60 | 0 | 0 | 70 | ○ |
| 68 | 3 | 100 | 5 | 65 | 8 | 30 | 60 | 0 | 0 | 95 | ◎ |
| 69 | 3 | 100 | 5 | 65 | 8 | 30 | 60 | 0 | 0 | 98 | ◎ |

*1 Organic resin given in Table 15.
*2 Rust-preventive oil given in Table 16.
*3 Parts by weight of nonvolatile matter.
*4 Lubricant given in Table 17.
*5 Mass % in organic solvent.
*6 Mass % in coating composition.

TABLE 19

| No. | Name |
|---|---|
| 1 | Rust-preventive oil "NOX-RUST 530F", produced by PERKER KOUSAN |
| 2 | Rust-preventive oil "DAPHNIS OIL COAT SK", produced by Nippon Oil Co., Ltd. |
| 3 | Cleaning rust-preventive oil "PRETON R303P", produced by SUGIMURA CHEMICAL |
| 4 | Cleaning rust-preventive oil "PRETON R352L", produced by SUGIMURA CHEMICAL |
| 5 | Cleaning rust-preventive oil "RUSTCLEAN K", produced by Nippon Oil Co., Ltd. |
| 6 | Cleaning rust-preventive oil "P-1600B", produced by Nippon Oil Co., Ltd. |
| 7 | Lubrication rust-preventive oil "NOX-RUST 550HN", produced by PERKER KOUSAN |
| 8 | Lubrication rust-preventive oil "NOX-RUST Mu-10", produced by PERKER KOUSAN |

Table 20 shows the kinds of thus prepared surface-treated steel plates and their tested performance of lubrication, anti-powdering performance, corrosion resistance (non-coating corrosion resistance and after coating corrosion resistance), coatability (coating adhesiveness, uniformity of electrodeposition coating at polished portions, and image sharpness), and weldability.

The method for evaluating each characteristic is described below.

Lubrication

A pull-out force was determined under the sliding condition given below, to give evaluation using the formula of:

Friction factor=(Pull-out force)/(Applied force)

The evaluation criteria are the following.

(Sliding Condition)

Tool contact area: 50×10 mm

Tool material: SKD 11

Applied pressure: 400 kgf

Sliding speed: 0.2 m/min (Evaluation Criteria)

◎: not more than 0.15

○: more than 0.15 and not more than 0.17

Δ: more than 0.15 and not more than 0.20

X: more than 0.20

Anti-powdering Performance

A specimen was sheared to 30 mm in width, then was tested by draw-bead test under the conditions of a tip radius of bead of 0.5 mm, a bead height of 4 mm, a pressing force of 500 kgf, a pull-out speed of 200 mm/min. After that, the portion of the bead subjected to sliding was tested by adhesive-tape peeling, thus determining the peeled amount of coating per unit area before and after the test. The evaluation criteria are the following.

◎: less than 2 $g/m^2$

○+: more less than 2 $g/m^2$ and less than 3 $g/M^2$

○: not less than 3 $g/m^2$ and less than 4 $g/m^2$

Δ: not less than 4 $g/m^2$ and less than 6 $g/m^2$

X: not less than 6 $g/m^2$

Corrosion Resistance

1) Non-coating Corrosion Resistance

A specimen was treated by degreasing (FCL 4460, produced by Nihon Parkerizing Co., Ltd., 45° C., immersion for 120 seconds). Edges and rear face of the specimen were sealed by adhesive tape. Then the accelerated corrosion test with cycles of combined corrosion test described below was applied to the specimen. The evaluation was given by the degree of rust generation after 6 cycles using the evaluation criteria given below.

| (Combined corrosion test cycle) | |
|---|---|
| Salt spray | : 35° C., 2 hours |
| → Drying | : 60° C., 4 hours |
| → 95% RH humidification | : 50° C., 2 hours |

(Evaluation Criteria)

◎: no generation of rust

○+: rust area less than 25%

○: rust area not less than 25% and less than 50%

Δ: rust area not less than 50% and less than 75%

X: rust area not less than 75%

2) Corrosion Resistance After Coating

A specimen was applied by 3 coat coating described below. Then cross-cut was given on the specimen using a cutter knife. After sealed on both edges and rear face of the specimen with adhesive tape, the accelerated corrosion test with cycles of combined corrosion test described below was applied to the specimen. The evaluation was given by the single-side maximum bulging width at the cross-cut section after 300 cycles using the evaluation criteria given below.

| Coating (3 coat) | |
|---|---|
| Zinc phosphate treatment | : SD 6500 MZ (standard condition) |
| Electrodeposition coating | : V20, film thickness 20 μm |
| Intermediate coating | : OT0870 (white color sealer), film thickness 35 μm |
| Top coating | : OT0647PT (SHUST WHITE), film thickness 35 μm |
| (Combined corrosion test cycle) | |
| Salt spray 10 minutes → Drying 155 minutes → Humidifying 75 minutes → Drying 160 minutes → Humidifying 80 minutes | |

(Evaluation Criteria)

◎: less than 3 mm

○+: not less than 3 mm and less than 4 mm

○: not less than 4 mm and less than 5 mm

Δ: not less than 5 mm and less than 6 mm

X: not less than 6 mm

Coatability (1-1) Coating Adhesiveness 1

A specimen was treated by degreasing, then was coated with a commercial coating DELICON 700 at a thickness of 30 μm. The specimen was immersed in boiling water for 120 minutes, then 100 grid cuts were given to the coating at 1 mm of spacing. The Erichsen extrusion to 5 mm was applied to the specimen. Adhesive tapes were attached to the grids, and were peeled off from the grids to determine the residual coating rate. The evaluation criteria are the following.

(Evaluation Criteria)

◎: no peeling occurred

○: peeling rate less than 3%

Δ: peeling rate not less than 3% and less than 10%

X: peeling rate not less than 10%

(1-2) Coating Adhesiveness 2

A specimen was applied by 3 coat coating described below, and was allowed to stand for 24 hours or more. Then, the specimen was immersed in an ion-exchanged water at 50° C. for 240 hours. Within 30 minutes after the specimen was taken out from the water, 100 grid cuts were given to the coating at 1 mm of spacing. Adhesive tapes were attached to the grids, and were peeled off from the grids to determine the residual coating rate. The evaluation criteria are the following.

| Coating (3 coat) | |
|---|---|
| Zinc phosphate treatment | : SD 6500 MZ (standard condition) |
| Electrodeposition coating | : V20, film thickness 20 μm |
| Intermediate coating | : OT0870 (white color sealer), film thickness 35 μm |
| Top coating | : OT0647PT (SHUST WHITE), film thickness 35 μm |

(Evaluation Criteria)

◎: no peeling occurred

○: peeling rate less than 3%

Δ: Peeling rate not less than 3% and less than 10%

X: peeling rate not less than 10%

(2) Uniformity of Electrodeposition Coating at Polished Portions

Half area of a specimen was polished by an emery paper to completely remove the prephos and the sealing film to make the primary plated steel plate fully exposed. Then the specimen was subjected to chemical conversion (SD6500 MZ) and electrodeposition coating (V-20). Thus treated sample was tested to determine the coating thickness at polished portion and non-polished portion. The evaluation was given by the difference in electrodeposition coating thickness [(the thickness of electrodeposition coating at non-polished portion)−(the thickness of electrodeposition coating at polished portion)]. The evaluation criteria are the following.

(Evaluation Criteria)

◎: less than 0.5 μm

○: not less than 0.5 μm and less than 1 μm

Δ: not less than 1 μm and less than 3 μm

X: not less than 3 μm (3) Image Sharpness

A specimen was subjected to 3 coat coating given below. Then the evaluation on the image sharpness using an image performance tester (ICM-2DP) produced by SUGA MACHINE applying a slit of 0.5 mm in width. The evaluation criteria are the following.

| Coating (3 coat) | |
|---|---|
| Zinc phosphate treatment | : PB-L3020 (standard condition) |
| Electrodeposition coating | : U-600, film thickness 20 μm |
| Intermediate coating | : KPX-36, film thickness 35 μm |
| Top coating | : RUGABERG B531 film thickness 35 μm |

(Evaluation Criteria)

◎: not less than 80

○: not less than 75 and less than 80

Δ: not less than 70 and less than 75

X: less than 70

Weldability

A specimen and a mild steel plate were tested by successive spot welding under mixed spot welding of 25 points for each of them. The test conditions were: a CF type electrode having a tip diameter of 4.5 mm; a pressing force of 250 kgf; a squeeze time of 36 cycles/60 Hz; a current applying time of 14 cycles/60 Hz; and a welding current of the current immediately before the generation of expulsion and surface flash. The evaluation criteria are the following.

◎: not less than 1500 spots

○: not less than 1000 and less than 1500

Δ: not less than 500 and less than 1000

X: less than 500

TABLE 20-1

| Classification | No. | Zinc phosphate composite coating steel plate *1 | Coating composition *2 | Coating weight of organic coating (g/m²) | Drying temperature (° C.) | Rust-preventive oil *3 | Coating weight of rust-preventive oil (g/m²) | Lubrication | Anti-powdering performance |
|---|---|---|---|---|---|---|---|---|---|
| E | 1 | 1 | 3 | 0.5 | 120 | 2 | 1 | ◎ | ◎ |
| E | 2 | 2 | 3 | 0.5 | 120 | 2 | 1 | ◎ | ◎ |
| E | 3 | 3 | 3 | 0.5 | 120 | 2 | 1 | ◎ | ◎ |
| E | 4 | 4 | 3 | 0.5 | 120 | 2 | 1 | ◎ | ○ |
| E | 5 | 5 | 3 | 0.5 | 120 | 2 | 1 | ◎ | ◎ |
| E | 6 | 6 | 3 | 0.5 | 120 | 2 | 1 | ◎ | ◎ |
| E | 7 | 7 | 3 | 0.5 | 120 | 2 | 1 | ◎ | ◎ |
| E | 8 | 6 | 3 | 0.5 | 120 | 2 | 1 | ◎ | ◎ |
| E | 9 | 9 | 3 | 0.5 | 120 | 2 | 1 | ◎ | ○ |
| E | 10 | 10 | 3 | 0.5 | 120 | 2 | 1 | ◎ | ○ |
| E | 11 | 11 | 3 | 0.5 | 120 | 2 | 1 | ◎ | ○ |
| C | 12 | 12 | 3 | 0.5 | 120 | 2 | 1 | ◎ | ◎ |
| C | 13 | 13 | 3 | 0.5 | 120 | 2 | 1 | ◎ | ◎ |
| E | 14 | 14 | 3 | 0.5 | 120 | 2 | 1 | ◎ | ◎ |
| E | 15 | 15 | 3 | 0.5 | 120 | 2 | 1 | ◎ | ◎ |
| E | 16 | 16 | 3 | 0.5 | 120 | 2 | 1 | ◎ | ◎ |
| E | 17 | 17 | 3 | 0.5 | 120 | 2 | 1 | ◎ | ◎ |
| E | 18 | 18 | 3 | 0.5 | 120 | 2 | 1 | ◎ | ◎ |
| E | 19 | 19 | 3 | 0.5 | 120 | 2 | 1 | ◎ | ◎ |
| C | 20 | 20 | 3 | 0.5 | 120 | 2 | 1 | ○ | ○ |

| Classification | No. | Corrosion resistance | | Coatability | | | | |
|---|---|---|---|---|---|---|---|---|
| | | Without coating | After coating | Uniformity of electrodeposition coating at polished section | Image sharpness | Coating adhesiveness 1 | Coating adhesiveness 2 | Weldability |
| E | 1 | ◎ | ◎ | ◎ | ◎ | ◎ | ◎ | ◎ |
| E | 2 | ◎ | ◎ | ◎ | ◎ | ◎ | ◎ | ◎ |
| E | 3 | ○+ | ○ | ◎ | ◎ | ○ | ◎ | ◎ |
| E | 4 | ◎ | ◎ | ◎ | ◎ | ◎ | ◎ | Δ |
| E | 5 | ◎ | ○ | ◎ | ◎ | ◎ | ◎ | ◎ |
| E | 6 | ◎ | ○+ | ◎ | ◎ | ◎ | ◎ | ◎ |
| E | 7 | ◎ | ◎ | ◎ | ◎ | ◎ | ◎ | ◎ |
| E | 8 | ◎ | ◎ | ◎ | ◎ | ◎ | ◎ | ◎ |
| E | 9 | ◎ | ◎ | ◎ | ◎ | ◎ | ◎ | Δ |
| E | 10 | ◎ | ◎ | ◎ | ◎ | ◎ | ◎ | Δ |
| E | 11 | ◎ | ◎ | ◎ | ◎ | ◎ | ◎ | Δ |
| C | 12 | ◎ | ○+ | ◎ | ◎ | ◎ | ◎ | ◎ |
| C | 13 | ◎ | ○ | ◎ | ◎ | ○ | ◎ | ◎ |
| E | 14 | ◎ | ○ | ◎ | ◎ | ○ | ◎ | ◎ |
| E | 15 | ◎ | ◎ | ◎ | ◎ | ◎ | ◎ | ◎ |
| E | 16 | ◎ | ◎ | ◎ | ◎ | ◎ | ◎ | ◎ |
| E | 17 | ◎ | ○+ | ◎ | ◎ | ◎ | ◎ | ◎ |
| E | 18 | ◎ | ○ | ◎ | ◎ | ◎ | ◎ | ◎ |
| E | 19 | ○+ | ○ | ◎ | ◎ | ○ | ◎ | ◎ |
| C | 20 | ○+ | Δ | ◎ | ◎ | x | Δ | ◎ |

E: Example
C: Comparative Example

TABLE 20-2

| Classification | No. | Zinc phosphate composite coating steel plate *1 | Coating composition *2 | Coating weight of organic coating (g/m²) | Drying temperature (° C.) | Rust-preventive oil *3 | Coating weight of rust-preventive oil (g/m²) | Lubrication | Anti-powdering performance |
|---|---|---|---|---|---|---|---|---|---|
| C | 21 | 21 | 3 | 0.5 | 120 | 2 | 1 | Δ | ○ |
| E | 22 | 22 | 3 | 0.5 | 120 | 2 | 1 | ○ | ○ |
| E | 23 | 23 | 3 | 0.5 | 120 | 2 | 1 | ◎ | ◎ |
| E | 24 | 24 | 3 | 0.5 | 120 | 2 | 1 | ◎ | ◎ |
| E | 25 | 25 | 3 | 0.5 | 120 | 2 | 1 | ○+ | ○ |
| E | 26 | 26 | 3 | 0.5 | 120 | 2 | 1 | ○ | ○ |
| C | 27 | 27 | 3 | 0.5 | 120 | 2 | 1 | Δ | x |
| E | 28 | 2 | 1 | 0.5 | 120 | 2 | 1 | ◎ | ◎ |
| E | 29 | 2 | 2 | 0.5 | 120 | 2 | 1 | ◎ | ◎ |
| E | 30 | 2 | 4 | 0.5 | 120 | 2 | 1 | ◎ | ◎ |

TABLE 20-2-continued

| | | | | | | | | | |
|---|---|---|---|---|---|---|---|---|---|
| E | 31 | 2 | 5 | 0.5 | 120 | 2 | 1 | ⊚ | ⊚ |
| C | 32 | 2 | 6 | 0.5 | 120 | 2 | 1 | ⊚ | ⊚ |
| C | 33 | 2 | 7 | 0.5 | 120 | 2 | 1 | ⊚ | ⊚ |
| E | 34 | 2 | 8 | 0.5 | 120 | 2 | 1 | ⊚ | ⊚ |
| E | 35 | 2 | 9 | 0.5 | 120 | 2 | 1 | ⊚ | ⊚ |
| E | 36 | 2 | 10 | 0.5 | 120 | 2 | 1 | ⊚ | ⊚ |
| C | 37 | 2 | 11 | 0.5 | 120 | 2 | 1 | ⊚ | ⊚ |
| C | 38 | 2 | 12 | 0.5 | 120 | 2 | 1 | ⊚ | ⊚ |

| | | | | Coatability | | | | |
|---|---|---|---|---|---|---|---|---|
| | | Corrosion resistance | | Uniformity of electrodeposition | | | | |
| Classi-fication | No. | Without coating | After coating | coating at polished section | Image sharpness | Coating adhesiveness 1 | Coating adhesiveness 2 | Weldability |
| C | 21 | Δ | x | ⊚ | ⊚ | x | x | ⊚ |
| E | 22 | ○ | ○ | ⊚ | ⊚ | ○ | ○ | ⊚ |
| E | 23 | ○+ | ○+ | ⊚ | ⊚ | ⊚ | ⊚ | ⊚ |
| E | 24 | ⊚ | ⊚ | ⊚ | ⊚ | ⊚ | ⊚ | ⊚ |
| E | 25 | ⊚ | ⊚ | ○ | ⊚ | ⊚ | ⊚ | ○ |
| E | 26 | ⊚ | ⊚ | ○ | ○ | ⊚ | ⊚ | Δ |
| C | 27 | ⊚ | ⊚ | Δ | Δ | ⊚ | ⊚ | x |
| E | 28 | ⊚ | ⊚ | ○ | ○ | ⊚ | ⊚ | ⊚ |
| E | 29 | ⊚ | ⊚ | ○ | ⊚ | ⊚ | ⊚ | ⊚ |
| E | 30 | ⊚ | ⊚ | ⊚ | ⊚ | ⊚ | ⊚ | ⊚ |
| E | 31 | ⊚ | ○ | ⊚ | ⊚ | ⊚ | ⊚ | ⊚ |
| C | 32 | ⊚ | ⊚ | ○ | ○ | ⊚ | ⊚ | ⊚ |
| C | 33 | ⊚ | ⊚ | ○ | ⊚ | ⊚ | ⊚ | ⊚ |
| E | 34 | ⊚ | ⊚ | ⊚ | ⊚ | ⊚ | ⊚ | ⊚ |
| E | 35 | ⊚ | ⊚ | ⊚ | ⊚ | ⊚ | ⊚ | ⊚ |
| E | 36 | ⊚ | ○ | ⊚ | ⊚ | ⊚ | ⊚ | ⊚ |
| C | 37 | ⊚ | ⊚ | Δ | Δ | ⊚ | ⊚ | ⊚ |
| C | 38 | Δ | Δ | ⊚ | ⊚ | ⊚ | ⊚ | ⊚ |

E: Example
C: Comparative Example

TABLE 20-3

| Classi-fication | No. | Zinc phosphate composite coating steel plate *1 | Coating compo-sition *2 | Coating weight of organic coating ($g/m^2$) | Drying temp-erature (° C.) | Rust-preventive oil *3 | Coating weight of rust-preventive oil ($g/m^2$) | Lubrication | Anti-powdering performance |
|---|---|---|---|---|---|---|---|---|---|
| C | 39 | 2 | 13 | 0.5 | 120 | 2 | 1 | ⊚ | ⊚ |
| C | 40 | 2 | 14 | 0.5 | 120 | 2 | 1 | ⊚ | ⊚ |
| C | 41 | 2 | 15 | 0.5 | 120 | 2 | 1 | ⊚ | ⊚ |
| E | 42 | 2 | 16 | 0.5 | 120 | 2 | 1 | ⊚ | ⊚ |
| E | 43 | 2 | 17 | 0.5 | 120 | 2 | 1 | ⊚ | ⊚ |
| E | 44 | 2 | 18 | 0.5 | 120 | 2 | 1 | ⊚ | ⊚ |
| E | 45 | 2 | 19 | 0.5 | 120 | 2 | 1 | ⊚ | ⊚ |
| E | 46 | 2 | 20 | 0.5 | 120 | 2 | 1 | ⊚ | ⊚ |
| E | 47 | 2 | 21 | 0.5 | 120 | 2 | 1 | ⊚ | ⊚ |
| E | 48 | 2 | 22 | 0.5 | 120 | 2 | 1 | ⊚ | ⊚ |
| E | 49 | 2 | 23 | 0.5 | 120 | 2 | 1 | ⊚ | ⊚ |
| E | 50 | 2 | 24 | 0.5 | 120 | 2 | 1 | ⊚ | ⊚ |
| E | 51 | 2 | 25 | 0.5 | 120 | 2 | 1 | ○ | ○ |
| E | 52 | 2 | 26 | 0.5 | 120 | 2 | 1 | ○ | ○ |
| E | 53 | 2 | 27 | 0.5 | 120 | 2 | 1 | ○ | ○ |
| E | 54 | 2 | 28 | 0.5 | 120 | 2 | 1 | ○+ | ○ |
| E | 55 | 2 | 29 | 0.5 | 120 | 2 | 1 | ⊚ | ⊚ |
| E | 56 | 2 | 30 | 0.5 | 120 | 2 | 1 | ⊚ | ⊚ |

| | | | | Coatability | | | | |
|---|---|---|---|---|---|---|---|---|
| | | Corrosion resistance | | Uniformity of electrodeposition | | | | |
| Classi-fication | No. | Without coating | After coating | coating at polished section | Image sharpness | Coating adhesiveness 1 | Coating adhesiveness 2 | Weldability |
| C | 39 | ⊚ | ⊚ | Δ | Δ | ⊚ | ⊚ | ⊚ |
| C | 40 | Δ | Δ | ⊚ | ⊚ | ⊚ | ⊚ | ⊚ |
| C | 41 | ⊚ | ⊚ | Δ | x | ⊚ | ⊚ | ⊚ |

TABLE 20-3-continued

| | | | | | | | | |
|---|---|---|---|---|---|---|---|---|
| E | 42 | ⊚ | ⊚ | ○ | ○ | ⊚ | ⊚ | ⊚ |
| E | 43 | ⊚ | ⊚ | ○ | ○ | ⊚ | ⊚ | ⊚ |
| E | 44 | ⊚ | ⊚ | ○ | ○ | ⊚ | ⊚ | ⊚ |
| E | 45 | ⊚ | ⊚ | ○ | ○ | ⊚ | ⊚ | ⊚ |
| E | 46 | ⊚ | ⊚ | ⊚ | ⊚ | ⊚ | ⊚ | ⊚ |
| E | 47 | ⊚ | ⊚ | ⊚ | ⊚ | ⊚ | ⊚ | ⊚ |
| E | 48 | ⊚ | ⊚ | ⊚ | ⊚ | ⊚ | ⊚ | ⊚ |
| E | 49 | ⊚ | ⊚ | ⊚ | ⊚ | ⊚ | ⊚ | ⊚ |
| E | 50 | ⊚ | ⊚ | ⊚ | ⊚ | ⊚ | ⊚ | ⊚ |
| E | 51 | ○ | ○ | ⊚ | ⊚ | ⊚ | ⊚ | ⊚ |
| E | 52 | ○ | ○ | ⊚ | ⊚ | ⊚ | ⊚ | ⊚ |
| E | 53 | ○ | ○ | ⊚ | ⊚ | ⊚ | ⊚ | ⊚ |
| E | 54 | ⊚ | ⊚ | ⊚ | ⊚ | ⊚ | ⊚ | ⊚ |
| E | 55 | ⊚ | ○+ | ⊚ | ⊚ | ○ | ⊚ | ⊚ |
| E | 56 | ⊚ | ○+ | ⊚ | ⊚ | ⊚ | ⊚ | ⊚ |

E: Example
C: Comparative Example

TABLE 20-4

| Classi-fication | No. | Zinc phosphate composite coating steel plate *1 | Coating compo-sition *2 | Coating weight of organic coating (g/m²) | Drying temp-erature (° C.) | Rust-preventive oil *3 | Coating weight of rust-preventive oil (g/m²) | Lubrication | Anti-powdering performance |
|---|---|---|---|---|---|---|---|---|---|
| E | 57 | 2 | 31 | 0.5 | 120 | 2 | 1 | ⊚ | ⊚ |
| E | 58 | 2 | 32 | 0.5 | 120 | 2 | 1 | ⊚ | ⊚ |
| E | 59 | 2 | 33 | 0.5 | 120 | 2 | 1 | ⊚ | ⊚ |
| E | 60 | 2 | 34 | 0.5 | 120 | 2 | 1 | ⊚ | ⊚ |
| E | 61 | 2 | 35 | 0.5 | 120 | 2 | 1 | ⊚ | ○+ |
| E | 62 | 2 | 36 | 0.5 | 120 | 2 | 1 | ○ | ○ |
| E | 63 | 2 | 37 | 0.5 | 120 | 2 | 1 | ⊚ | ○ |
| E | 64 | 2 | 38 | 0.5 | 120 | 2 | 1 | ○+ | ○ |
| E | 65 | 2 | 39 | 0.5 | 120 | 2 | 1 | ○+ | ○+ |
| E | 66 | 2 | 40 | 0.5 | 120 | 2 | 1 | ○+ | ○+ |
| E | 67 | 2 | 41 | 0.5 | 120 | 2 | 1 | ○+ | ○ |
| E | 68 | 2 | 42 | 0.5 | 120 | 2 | 1 | ⊚ | ⊚ |
| E | 69 | 2 | 43 | 0.5 | 120 | 2 | 1 | ⊚ | ⊚ |
| E | 70 | 2 | 44 | 0.5 | 120 | 2 | 1 | ⊚ | ⊚ |
| E | 71 | 2 | 45 | 0.5 | 120 | 2 | 1 | ⊚ | ⊚ |
| E | 72 | 2 | 46 | 0.5 | 120 | 2 | 1 | ⊚ | ⊚ |
| E | 73 | 2 | 47 | 0.5 | 120 | 2 | 1 | ⊚ | ○+ |
| E | 74 | 2 | 48 | 0.5 | 120 | 2 | 1 | ○+ | ○+ |

| | | Corrosion resistance | | Coatability | | | | |
|---|---|---|---|---|---|---|---|---|
| | | | | Uniformity of electrodeposition | | | | |
| Classi-fication | No. | Without coating | After coating | coating at polished section | Image sharpness | Coating adhesiveness 1 | Coating adhesiveness 2 | Weldability |
| E | 57 | ⊚ | ⊚ | ⊚ | ⊚ | ⊚ | ⊚ | ⊚ |
| E | 58 | ⊚ | ⊚ | ⊚ | ⊚ | ⊚ | ⊚ | ⊚ |
| E | 59 | ⊚ | ⊚ | ⊚ | ⊚ | ⊚ | ⊚ | ⊚ |
| E | 60 | ⊚ | ⊚ | ⊚ | ⊚ | ⊚ | ⊚ | ⊚ |
| E | 61 | ⊚ | ○+ | ⊚ | ○ | ⊚ | ⊚ | ⊚ |
| E | 62 | ○+ | ○ | ⊚ | ○ | ⊚ | ⊚ | ⊚ |
| E | 63 | ⊚ | ⊚ | ⊚ | ⊚ | ○ | ⊚ | ⊚ |
| E | 64 | ⊚ | ⊚ | ⊚ | ⊚ | ⊚ | ⊚ | ⊚ |
| E | 65 | ⊚ | ⊚ | ⊚ | ⊚ | ⊚ | ⊚ | ⊚ |
| E | 66 | ⊚ | ⊚ | ⊚ | ⊚ | ⊚ | ⊚ | ⊚ |
| E | 67 | ⊚ | ⊚ | ⊚ | ⊚ | ⊚ | ⊚ | ⊚ |
| E | 68 | ○ | ○ | ○ | ○ | ⊚ | ⊚ | ⊚ |
| E | 69 | ○+ | ○ | ○ | ○ | ⊚ | ⊚ | ⊚ |
| E | 70 | ⊚ | ○+ | ○ | ⊚ | ⊚ | ⊚ | ⊚ |
| E | 71 | ⊚ | ⊚ | ⊚ | ⊚ | ⊚ | ⊚ | ⊚ |
| E | 72 | ⊚ | ⊚ | ⊚ | ⊚ | ⊚ | ⊚ | ⊚ |
| E | 73 | ⊚ | ⊚ | ⊚ | ⊚ | ⊚ | ⊚ | ⊚ |
| E | 74 | ○+ | ⊚ | ⊚ | ⊚ | ⊚ | ⊚ | ⊚ |

E: Example
C: Comparative Example

TABLE 20-5

| Classi-fication | No. | Zinc phosphate composite coating steel plate *1 | Coating compo-sition *2 | Coating weight of organic coating (g/m²) | Drying temp-erature (° C.) | Rust-preventive oil *3 | Coating weight of rust-preventive oil (g/m²) | Lubrication | Anti-powdering performance |
|---|---|---|---|---|---|---|---|---|---|
| E | 75 | 2 | 49 | 0.5 | 120 | 2 | 1 | ○+ | ○ |
| E | 76 | 2 | 50 | 0.5 | 120 | 2 | 1 | ○ | ○ |
| E | 77 | 2 | 51 | 0.5 | 120 | 2 | 1 | ○+ | ○ |
| E | 78 | 2 | 52 | 0.5 | 120 | 2 | 1 | ◎ | ○+ |
| E | 79 | 2 | 53 | 0.5 | 120 | 2 | 1 | ◎ | ◎ |
| E | 80 | 2 | 54 | 0.5 | 120 | 2 | 1 | ◎ | ◎ |
| E | 81 | 2 | 55 | 0.5 | 120 | 2 | 1 | ◎ | ○+ |
| E | 82 | 2 | 56 | 0.5 | 120 | 2 | 1 | ○+ | ○+ |
| E | 83 | 2 | 57 | 0.5 | 120 | 2 | 1 | ○ | ○ |
| E | 84 | 2 | 58 | 0.5 | 120 | 2 | 1 | ○ | ○ |
| E | 85 | 2 | 59 | 0.5 | 120 | 2 | 1 | ◎ | ◎ |
| E | 86 | 2 | 60 | 0.5 | 120 | 2 | 1 | ◎ | ◎ |
| E | 87 | 2 | 61 | 0.5 | 120 | 2 | 1 | ◎ | ◎ |
| E | 88 | 2 | 62 | 0.5 | 120 | 2 | 1 | ◎ | ◎ |
| E | 89 | 2 | 63 | 0.5 | 120 | 2 | 1 | ◎ | ◎ |
| E | 90 | 2 | 64 | 0.5 | 120 | 2 | 1 | ◎ | ◎ |
| E | 91 | 2 | 65 | 0.5 | 120 | 2 | 1 | ◎ | ◎ |
| E | 92 | 2 | 66 | 0.5 | 120 | 2 | 1 | ◎ | ◎ |

| Classi-fication | No. | Corrosion resistance: Without coating | Corrosion resistance: After coating | Coatability: Uniformity of electrodeposition coating at polished section | Coatability: Image sharpness | Coatability: Coating adhesiveness 1 | Coatability: Coating adhesiveness 2 | Weldability |
|---|---|---|---|---|---|---|---|---|
| E | 75 | ○ | ○ | ○ | ○ | ○ | ◎ | ◎ |
| E | 76 | ◎ | ◎ | ◎ | ◎ | ◎ | ◎ | ◎ |
| E | 77 | ◎ | ◎ | ◎ | ◎ | ◎ | ◎ | ◎ |
| E | 78 | ◎ | ◎ | ◎ | ◎ | ◎ | ◎ | ◎ |
| E | 79 | ◎ | ◎ | ◎ | ◎ | ◎ | ◎ | ◎ |
| E | 80 | ◎ | ◎ | ◎ | ◎ | ◎ | ◎ | ◎ |
| E | 81 | ◎ | ◎ | ◎ | ◎ | ◎ | ◎ | ◎ |
| E | 82 | ◎ | ◎ | ◎ | ◎ | ◎ | ◎ | ◎ |
| E | 83 | ◎ | ○+ | ◎ | ◎ | ○ | ○ | ◎ |
| E | 84 | ○ | ○ | ○ | ○ | ◎ | ◎ | ◎ |
| E | 85 | ◎ | ◎ | ◎ | ◎ | ◎ | ◎ | ◎ |
| E | 86 | ◎ | ◎ | ◎ | Δ | ◎ | ◎ | ◎ |
| E | 87 | ◎ | ◎ | ◎ | ◎ | ◎ | ◎ | ◎ |
| E | 88 | ◎ | ◎ | ◎ | ◎ | ◎ | ◎ | ◎ |
| E | 89 | ◎ | ◎ | ◎ | ◎ | ◎ | ◎ | ◎ |
| E | 90 | ◎ | ◎ | ◎ | Δ | ◎ | ◎ | ◎ |
| E | 91 | ◎ | ◎ | ◎ | ◎ | ◎ | ◎ | ◎ |
| E | 92 | ◎ | ◎ | ◎ | ○ | ◎ | ◎ | ◎ |

E: Example
C: Comparative Example

TABLE 20-6

| Classi-fication | No. | Zinc phosphate composite coating steel plate *1 | Coating compo-sition *2 | Coating weight of organic coating (g/m²) | Drying temp-erature (° C.) | Rust-preventive oil *3 | Coating weight of rust-preventive oil (g/m²) | Lubrication | Anti-powdering performance |
|---|---|---|---|---|---|---|---|---|---|
| E | 93 | 2 | 67 | 0.5 | 120 | 2 | 1 | ◎ | ◎ |
| E | 94 | 2 | 68 | 0.5 | 120 | 2 | 1 | ◎ | ◎ |
| E | 95 | 2 | 69 | 0.05 | 120 | 2 | 1 | ○ | ○ |
| C | 96 | 2 | 3 | 0 | 120 | 2 | 1 | Δ | Δ |
| E | 97 | 2 | 3 | 0.05 | 120 | 2 | 1 | ○ | ○ |
| E | 98 | 2 | 3 | 0.1 | 120 | 2 | 1 | ◎ | ○+ |
| E | 99 | 2 | 3 | 0.2 | 120 | 2 | 1 | ◎ | ◎ |
| E | 100 | 2 | 3 | 0.3 | 120 | 2 | 1 | ◎ | ◎ |
| E | 101 | 2 | 3 | 0.7 | 120 | 2 | 1 | ◎ | ◎ |
| E | 102 | 2 | 3 | 1 | 120 | 2 | 1 | ◎ | ◎ |
| E | 103 | 2 | 3 | 1.5 | 120 | 2 | 1 | ◎ | ◎ |
| E | 104 | 2 | 3 | 2 | 120 | 2 | 1 | ◎ | ◎ |
| E | 105 | 2 | 3 | 0.5 | 40 | 2 | 1 | ○ | ○ |
| E | 106 | 2 | 3 | 0.5 | 50 | 2 | 1 | ◎ | ○+ |

TABLE 20-6-continued

| | | | | | | | | | |
|---|---|---|---|---|---|---|---|---|---|
| E | 107 | 2 | 3 | 0.5 | 80 | 2 | 1 | ⊚ | ⊚ |
| E | 108 | 2 | 3 | 0.5 | 100 | 2 | 1 | ⊚ | ⊚ |
| E | 109 | 2 | 3 | 0.5 | 140 | 2 | 1 | ⊚ | ⊚ |

| | | Corrosion resistance | | Coatability | | | | |
|---|---|---|---|---|---|---|---|---|
| | | | | Uniformity of electrodeposition | | | | |
| Classification | No. | Without coating | After coating | coating at polished section | Image sharpness | Coating adhesiveness 1 | Coating adhesiveness 2 | Weldability |
| E | 93 | ⊚ | ⊚ | ⊚ | ○ | ⊚ | ⊚ | ⊚ |
| E | 94 | ⊚ | ⊚ | ⊚ | ⊚ | ⊚ | ⊚ | ⊚ |
| E | 95 | ○ | ○ | ⊚ | ⊚ | ○ | ⊚ | ⊚ |
| C | 96 | x | x | ⊚ | ⊚ | ○ | ⊚ | ⊚ |
| E | 97 | ○ | ○ | ⊚ | ⊚ | ○ | ○ | ⊚ |
| E | 98 | ○ | ○ | ⊚ | ⊚ | ⊚ | ⊚ | ⊚ |
| E | 99 | ○+ | ○+ | ⊚ | ⊚ | ⊚ | ⊚ | ⊚ |
| E | 100 | ⊚ | ⊚ | ⊚ | ⊚ | ⊚ | ⊚ | ⊚ |
| E | 101 | ⊚ | ⊚ | ⊚ | ⊚ | ⊚ | ⊚ | ⊚ |
| E | 102 | ⊚ | ⊚ | ○ | ⊚ | ⊚ | ⊚ | ○ |
| E | 103 | ⊚ | ⊚ | ○ | ○ | ⊚ | ⊚ | Δ |
| E | 104 | ⊚ | ⊚ | Δ | ○ | ⊚ | ⊚ | Δ |
| E | 105 | Δ | Δ | ⊚ | ⊚ | Δ | Δ | ⊚ |
| E | 106 | ○ | ○ | ⊚ | ⊚ | ⊚ | ○ | ⊚ |
| E | 107 | ○+ | ○+ | ⊚ | ⊚ | ⊚ | ⊚ | ⊚ |
| E | 108 | ⊚ | ⊚ | ⊚ | ⊚ | ⊚ | ⊚ | ⊚ |
| E | 109 | ⊚ | ⊚ | ⊚ | ⊚ | ⊚ | ⊚ | ⊚ |

E: Example
C: Comparative Example

TABLE 20-7

| Classification | No. | Zinc phosphate composite coating steel plate *1 | Coating composition *2 | Coating weight of organic coating ($g/m^2$) | Drying temperature (° C.) | Rust-preventive oil *3 | Coating weight of rust-preventive oil ($g/m^2$) | Lubrication | Anti-powdering performance |
|---|---|---|---|---|---|---|---|---|---|
| E | 110 | 2 | 3 | 0.5 | 200 | 2 | 1 | ⊚ | ⊚ |
| E | 111 | 2 | 3 | 0.5 | 300 | 2 | 1 | ⊚ | ⊚ |
| E | 112 | 2 | 3 | 0.5 | 120 | 1 | 1 | ⊚ | ⊚ |
| E | 113 | 2 | 3 | 0.5 | 120 | 3 | 1 | ⊚ | ⊚ |
| E | 114 | 2 | 3 | 0.5 | 120 | 4 | 1 | ⊚ | ⊚ |
| E | 115 | 2 | 3 | 0.5 | 120 | 5 | 1 | ⊚ | ⊚ |
| E | 116 | 2 | 3 | 0.5 | 120 | 6 | 1 | ⊚ | ⊚ |
| E | 117 | 2 | 3 | 0.5 | 120 | 7 | 1 | ⊚ | ⊚ |
| E | 118 | 2 | 3 | 0.5 | 120 | 8 | 1 | ⊚ | ⊚ |
| E | 119 | 2 | 3 | 0.5 | 120 | — | — | ⊚ | ○ |
| E | 120 | 2 | 3 | 0.5 | 120 | 2 | 0.1 | ⊚ | ○+ |
| E | 121 | 2 | 3 | 0.5 | 120 | 2 | 0.5 | ⊚ | ⊚ |
| E | 122 | 2 | 3 | 0.5 | 120 | 2 | 2 | ⊚ | ⊚ |
| E | 123 | 2 | 3 | 0.5 | 120 | 2 | 10 | ⊚ | ⊚ |
| E | 124 | 2 | 3 | 0.5 | 120 | 2 | 15 | ⊚ | ⊚ |
| E | 125 | 2 | 3 | 0.5 | 250 | 2 | 1 | ⊚ | ⊚ |

| | | Corrosion resistance | | Coatability | | | | |
|---|---|---|---|---|---|---|---|---|
| | | | | Uniformity of electrodeposition | | | | |
| Classification | No. | Without coating | After coating | coating at polished section | Image sharpness | Coating adhesiveness 1 | Coating adhesiveness 2 | Weldability |
| E | 110 | ⊚ | ⊚ | ○ | ○ | ⊚ | ⊚ | ⊚ |
| E | 111 | ⊚ | ⊚ | Δ | Δ | ⊚ | ⊚ | ⊚ |
| E | 112 | ⊚ | ⊚ | ⊚ | ⊚ | ⊚ | ⊚ | ⊚ |
| E | 113 | ⊚ | ⊚ | ⊚ | ⊚ | ⊚ | ⊚ | ⊚ |
| E | 114 | ⊚ | ⊚ | ⊚ | ⊚ | ⊚ | ⊚ | ⊚ |
| E | 115 | ⊚ | ⊚ | ⊚ | ⊚ | ⊚ | ⊚ | ⊚ |
| E | 116 | ⊚ | ⊚ | ⊚ | ⊚ | ⊚ | ⊚ | ⊚ |
| E | 117 | ⊚ | ⊚ | ⊚ | ⊚ | ⊚ | ⊚ | ⊚ |
| E | 118 | ⊚ | ⊚ | ⊚ | ⊚ | ⊚ | ⊚ | ⊚ |
| E | 119 | ⊚ | ⊚ | ⊚ | ⊚ | ⊚ | ⊚ | ⊚ |
| E | 120 | ⊚ | ⊚ | ⊚ | ⊚ | ⊚ | ⊚ | ⊚ |

TABLE 20-7-continued

| | | | | | | | | |
|---|---|---|---|---|---|---|---|---|
| E | 121 | ⊚ | ⊚ | ⊚ | ⊚ | ⊚ | ⊚ | ⊚ |
| E | 122 | ⊚ | ⊚ | ⊚ | ⊚ | ⊚ | ⊚ | ⊚ |
| E | 123 | ⊚ | ○ | ○ | ○ | ○ | ○ | ○ |
| E | 124 | ⊚ | Δ | ○ | ○ | Δ | Δ | Δ |
| E | 125 | ⊚ | ⊚ | ○ | Δ | ⊚ | ⊚ | ⊚ |

E: Example
C: Comparative Example

Preferred Embodiment 3

The inventors of the present invention investigated the zinc phosphate composite treated steel plates focusing on the relation of coating in terms of structure, corrosion resistance, lubrication, coating adhesiveness, and weldability. Thus, the inventors derived the following-described findings.

(1) As for the improvement in corrosion resistance, coating adhesiveness, and lubrication, it is effective to form a dual-layer structure, or to form a specified zinc phosphate coating as the first layer on the surface of a zinc-base plated steel plate, and further to form an organic coating consisting mainly of a compound of a specified epoxy resin and a specified polyisocyanate compound onto the zinc phosphate coating. The corrosion resistance is further improved by increasing the number of isocyanate groups in the multifunctional polyisocyanate.

(2) The corrosion resistance is further improved by adding a specified rust-preventive additive at a specified amount to the organic coating, without degrading the lubrication, the coating adhesiveness, and the weldability.

(3) The lubrication is further improved by adding a specified lubricant at a specified amount to the organic coating, without degrading the corrosion resistance, the coating adhesiveness, and the weldability.

(4) The lubrication, the corrosion resistance, the coating adhesiveness, the weldability, and the anti-powdering performance are improved by optimizing the coating weight of the zinc phosphate composite coating layer as the first layer and of the organic coating layer as the second layer.

The present invention was established on the basis of above-described findings, and the present invention is characterized in the constitution described in the following.

That is, the present invention provides a zinc phosphate composite treated steel plate having excellent corrosion resistance, anti-powdering performance, lubrication, and coating adhesiveness, which steel plate comprises: a zinc-base plated steel plate; a first layer of zinc phosphate composite coating layer having coating weights of from 0.2 to 2.5 g/m$^2$, containing at least one substance selected from the group consisting of nickel, manganese, and magnesium, formed on the surface of the zinc-base plated steel plate; and a second layer of an organic coating consisting mainly of organic resins described in (1) in the following.

(1) An epoxy-base resin prepared by mixing 100 parts by weight of a substrate resin (as solid content) in which at least one basic nitrogen atom and at least two primary hydroxyl groups are added to a terminal of molecular chain of the epoxy resin and 5 to 80 parts by weight of a polyisocyanate compound (as solid content) having at least two isocyanate groups in a single molecule.

According to the present invention, the content of at least one substance selected from the group consisting of nickel, manganese, and magnesium, in the zinc phosphate coating is preferably in a range of from 0.5 to 8.5 mass % as the total thereof.

The organic coating preferably contains a rust-preventive additive and/or a solid lubricant.

The rust-preventive additive is preferably at least one substance selected from the group consisting of a silica and a phosphate. The silica preferably contains dry silica or Ca-exchanged silica. The silica preferably has specific surface areas of from 20 to 1000m$^2$ /g. The phosphate is preferably at least one substance selected from the group consisting of a phosphate of calcium, aluminum, and zinc.

The solid lubricant is preferably at least one substance selected from the group consisting of polyethylene wax (preferably having softening points of from 100 to 135° C.), tetrafluoroethylene resin, and boron nitride. The average particle size of the solid lubricant is preferably in a range of from 0.05 to 25 $\mu$m.

According to the present invention, the polyisocyanate compound contained in the organic resin (1) is a multifunctional polyisocyanate compound having three or more isocyanate groups in a single molecule thereof, more preferably four or more of them, and most preferably six or more of them, and the compound may be a multifunctional body of hexamethylene diisocyanate having six or more isocyanate groups in a single molecule thereof.

According to the present invention, the content of the rust-preventive additive in the organic coating is preferably in a range of from 1 to 100 parts by weight as solid content to 100 parts of weight as solid content of the organic resin (1), and the content of the solid lubricant is preferably in a range of from 1 to 80 parts by weight as solid content to 100 parts by weight as solid content of the organic resin (1).

The coating weight of the organic coating is preferably in a range of from 0.05 to 1.5 g/m$^2$.

The uppermost layer preferably has a rust-preventive film layer at coating weights of from 0.01 to 10 g/m$^2$.

The detail of the present invention is described in the following giving the reasons to limit the specification.

The steel plates which become the substrate of the zinc-base plated steel plates according to the present invention include: all kinds of cold-rolled steel plates for soft-working, such as cold-rolled steel plates for general working (CQ), cold-rolled steel plates for deep drawing (DQ), cold-rolled steel plates for very deep drawing (DDQ), and cold-rolled steel plates for ultra deep drawing (EDDQ); all kinds of high tension steel plates ranging from high tension steel plates of relatively low strength level having baking-hardening property to general high tension steel plates having more than 390 MPa of tensions; and de-scaled hot-rolled steel plates.

Examples of the plating layers of the zinc-base plated steel plates are Zn plating, Zn—Ni alloy plating (9 to 15 mass % of Ni content), Zn—Fe ally plating (5 to 25 mass % or 60 to 90 mass % of Fe content), Zn—Mn alloy plating (30 to 80 mass % of Mn content), Zn—Co alloy plating (0.5 to 15 mass % of Co), Zn—Cr ally plating (5 to 30 mass % of Cr), Zn—Al alloy plating (3 to 60 mass % of Al content).

Each of the above-given plating compositions may further include alloying element such as Co, Fe, Ni, and Cr, and oxide or salt of silica, alumina, slightly soluble chromate, or the like, and polymer. Among the above-described plating layers, two or more layers of the same kind or different kind may be applied to form a composite layer.

The plated steel plate may be the one prepared by applying plating of Ni or the like at a small coating weight onto the steel plate, followed by applying various kinds of plating thereon.

The plating described above may be formed by either one of electrolytic method, fusion method, and vapor phase method.

A preferred coating weight of plating is not less than 10 g/m$^2$. Less than 10 g/m$^2$ of coating weight induces problems because of poor corrosion resistance. In the case of Zn—Ni alloy plating, Zn—Fe alloy plating, Zn—Mn alloy plating, Zn—Co alloy plating, and Zn—Cr alloy plating, the anti-powdering performance degrades when the coating weight exceeds 60 g/m$^2$, so the coating weight is preferably in a range of from 10 to 60 g/m$^2$. For further improved corrosion resistance and anti-powdering performance, the coating weight is preferably in a range of from 15 to 60 g/m$^2$.

To prevent generation of film defects and irregularity on the surface of the zinc phosphate composite coating on the plating film, which processing is described later, it is possible to apply treatment of alkaline degreasing, solvent degreasing, and surface preparation treatment on the plating film, in advance. These pre-treatments include (1) the treatment using an acidic or alkaline aqueous solution containing at least one metallic ion selected from the group consisting of Ni ion, Co ion, Fe ion, and Zn ion, (2) the treatment contacting with a titanium colloid aqueous solution, and (3) the treatment to etch the top layer of the metallic oxide formed on the surface of the plated steel plate using an inorganic acid, an organic acid, or a cheleting compound such as EDTA and NTA. The effect of the present invention is available with any of these kinds of steel plates as the substrate.

As for the zinc phosphate composite-treated steel plate, according to the present invention, a zinc phosphate coating is formed as the first layer on the above-described zinc-base plated steel plates, and an organic coating is formed as the second layer on the first layer. The zinc-phosphate coating of the first layer improves the coating adhesiveness owing to the anchor effect, and contributes to the improvement of lubrication by preventing the direct contact between the steel plate and the tools during sliding actions.

According to the present invention, a zinc phosphate coating containing at least one substance selected from the group consisting of nickel, manganese, and magnesium is applied. The coating exists presumably in a form that a portion of zinc in the zinc phosphate coating is substituted by the above-described metal contained in the coating. That form of coating induces the interaction with the organic coating as the top layer, thus providing excellent corrosion resistance, anti-powdering performance, lubrication, and coating adhesiveness.

The content of at least one substance selected from the group consisting of nickel, manganese, and magnesium, in the zinc phosphate coating is preferably in a range of from 0.5 to 8.5 mass % as the total. By specifying the total content of these metals in the coating to that range, the corrosion resistance, the lubrication, and the coating adhesiveness are further improved. When particularly superior corrosion resistance and coating adhesiveness are required, it is more preferable to specify the total content of nickel, manganese, and magnesium to a range of from 2.5 to 7 mass %. The corrosion resistance and the coating adhesiveness are drastically improved by the existence of nickel as the essential component in a range of from 1 to 5.5 mass %, and manganese and/or magnesium in a range of from 0.5 to 4 mass % as the total.

The coating weight of the zinc phosphate composite coating as the first layer is preferably in a range of from 0.2 to 2.5 g/m$^2$. If the coating weight thereof is less than 0.2 g/m$^2$, the coating adhesiveness and the corrosion resistance degrade. If the coating weight thereof exceeds 2.5 g/m$^2$, powdering increases under sliding conditions, thus degrading the lubrication and resulting in poor spot weldability. In view of lubrication, coating adhesiveness, corrosion resistance, and weldability, more preferable range of coating weight is from 0.5 to 2.0 g/m$^2$, and most preferably from 0.7 to 1.5 g/m$^2$.

The method of zinc phosphate treatment for forming the zinc phosphate coating layer may be either one of reaction type treatment, coating type treatment, and electrolytic type treatment.

An example of the reaction type treatment is that a plated steel plate is subjected to degreasing, washing with water, and surface preparation treatment, followed by contacting with a treatment solution of an aqueous solution consisting mainly of: phosphoric acid ion, nitric acid ion, and zinc ion, and at least one substance selected from the group consisting of nickel ion, manganese ion, and magnesium ion; further containing, at need, (1) and (2) given below, then washing with water and drying.

(1) At least one substance selected from the group consisting of iron ion, cobalt ion, and calcium ion.

(2) At least one substance selected from the group consisting of peroxide, fluoride ion, fluorine complex ion, and nitrous acid ion.

Regarding the coating type treatment, at least one side of the plated steel plate is coated with a zinc phosphate treatment solution consisting mainly of phosphoric acid ion, nitric acid ion, and zinc ion, and at least one substance selected from the group consisting of nickel ion, manganese ion, and magnesium ion. Any kind of coating method is applicable. That is, coating by roll-coater method, coating by immersion method or spray method followed by applying air-knife method or roll-squeezing method to adjust the coating weight may be used. After coating a zinc phosphate treatment solution onto the surface of the plated steel plate, drying may be given using a drier, a hot air furnace, a high frequency induction heating furnace, or an infrared furnace to form the zinc phosphate coating.

Drying temperature of the coating in the case that the coating is formed by the coating method is preferably in a range of from 70 to 400° C. as the ultimate plate temperature. If the drying temperature is less than 70° C., the drying of coating becomes insufficient, which induces stickiness of the coating and degradation in coating adhesiveness, and induces irregular coating on forming the organic coating of the second layer. If the ultimate plate temperature exceeds 400° C., the effect saturates, which not only is uneconomical but also degrades corrosion resistance owing to the tendency of defect occurrence in coating. Accordingly, more preferable baking temperature is in a range of from 100 to 300° C., and most preferable one is from 120 to 170° C.

The following is the description on the organic coating formed on the zinc phosphate coating. According to the present invention, the organic coating formed on the above-described zinc phosphate coating consists mainly of an epoxy-base resin prepared by mixing a substrate resin, in which at least one basic nitrogen atom and at least two primary hydroxyl groups are added to a terminal of molecule of an epoxy resin, with a multifunctional polyisocyanate compound having at least two isocyanate groups in a single molecule thereof, at a specific mixing ratio. With the use of the epoxy-base resin, preferable coating adhesiveness and corrosion resistance are attained.

The epoxy resin applied to the organic coating preferably consists mainly of a condensate prepared by condensation of Bisphenol A and epichlorohydrin. Examples of the epoxy resin are the one made by solely aliphatic structure or alicyclic structure, such as epoxydated oil and epoxy-polybutadiene. To attain superior corrosion resistance, however, it is preferred to use an epoxy resin consisting mainly of the above-described condensate. Examples of the epoxy resin are Epicoat 828, 1001, 1004, 1007, 1009, and 1010 (produced by Shell Chemicals, Inc.) When particularly hardening at low temperatures is required, the epoxy resin preferably has number average molecular weights of 1500 or more. The above-described Epicoats may be used separately or mixing with other kinds of epoxy resins.

For introducing a basic nitrogen atom and a primary hydroxyl group to the epoxy resin to form a substrate resin, an example of applicable method is to add alkanol amine and/or alkyl alkanol amine to an oxirane group in the epoxy resin. Examples of the amine are monoethanolamine, diethanolamine, dimethylamino ethanol, monopropanolamine, dipropanolamine, and dibutanolamine. These amines may be used separately or mixing two or more of them together.

The aim of using the above-described substrate resins is the following. That is, by using an epoxy resin prepared by condensation of Bisphenol A and epichlorohydrin, as the base resin, superior adhesiveness with cationic electrodeposition coating generally used as rust-preventive agent on automobile body is expected. In addition, by introducing at least one basic nitrogen atom and at least two primary hydroxyl groups to a terminal of molecule of the epoxy resin, as the resin structure, (1) the coating damage by alkali generated during the cationic electrodeposition is prevented, thus stabilizing the adhesiveness between the primary coating of zinc phosphate and the cationic electrodeposition coating, (2) a primary hydroxyl group and a selected organic solvent composition (described later) enhance the low temperature reactivity with a cross-linking agent (isocyanate), (3) the introduction of two moles or more of hydroxyl groups to a single molecule of the epoxy resin provides a coating having satisfactorily dense cross-linked structure. Below two moles of the introduced hydroxyl groups cannot provide satisfactory cross linking.

Alternatively, the epoxy resin may be partly modified by other compound. In that case, however, it is necessary that a single molecule of the epoxy resin contains two moles or more of primary hydroxyl groups as average. Examples of the methods of partial modification of epoxy resin are the following.

(1) Esterification by monocarboxylic acid. (Examples of monocarboxylic acid are: an unsaturated fatty acid such as palm oil fatty acid, soya bean oil fatty acid, and caster oil fatty acid; a low molecular weight monocarboxylic acid such as acetic acid, propionic acid, and lactic acid; and an aromatic monocarboxylic acid such as benzoic acid.)

(2) Modification by aliphatic or aromatic amine. (Examples of aliphatic or aromatic amine are: an aliphatic amine such as monomethylamine, dimethylamine, monoethylamine, diethylamine, and isopropylamine; and an aromatic amine such as aniline.)

(3) Modification by oxyacid group. (Examples of oxyacid are lactic acid and γ-oxypropionic acid.)

A modification method using a dicarboxylic acid (for example, adipic acid and sebatic acid) may be applied. The method is, however, not an adequate one to prepare the coating according to the present invention because the epoxy resin becomes excessively high molecular weight, because the reaction control to keep the molecular weight distribution to a constant level is difficult, and because the improvement in corrosion resistance cannot be expected.

A preferred method for curing the organic coating according to the present invention is to conduct urethanation reaction between hydroxyl group in the substrate resin and isocyanate group in the polyisocyanate as the curing agent. For storing the coating composition before forming a film in a stable state, it is necessary to protect the isocyanate before curing. A method for protecting the isocyanate may be a protection method in which the protect group is released during heating treatment, thus regenerating the isocyanate group.

Examples of isocyanate compound according to the present invention, in view of improvement in corrosion resistance, are: an aliphatic, alicyclic (including heterocyclic), or aromatic isocyanate compound having at least two isocyanate groups in a single molecule thereof; a compound prepared from partial reaction of above-listed compound with polyalcohol; and a compound of the above-listed compounds in burette type adduct or in isocyanuric ring type adduct. That is:

(a) m- or p-Phenylene diisocyanate, 2,4- or 2,6-tolylene diisocyanate, or p-xylylene diisocyanate, hexamethylene diisocyanate, dimer acid diisocyanate, isophorone diisocyanate.

(b) A polyisocyanate compound having three or more of isocyanate groups, such as triphenylmethane-4,4',4"-triisocyanate, 1,3,5-triisocyanate benzene, 2,4,6-triisocyanate toluene, 4,4'-dimethyldiphenylmethane-2,2',5,5'-tetraisocyanate.

(c) A compound having at least two residual isocyanate groups in a single molecule of a product of reaction between a single or mixture of above-described compounds (a) with a polyhydric alcohol (such as dihydric alcohol including ethylene glycol and propylene glycol; trihydric alcohol including glycerin and trimethylol propane; tetrahydric alcohol including pentaerythritol; and hexahydric alcohol including sorbitol and dipentaerythritol).

(d) A burette type adduct and an isocyanuric ring type adduct, such as hexamethylene diisocyanate, isophorone diisocyanate, tolylene diisocyanate, xylene diisocyanate, 4,4'-diphenylmethane diisocyanate, 4,4'-methylene bis(cyclohexyl isocyanate).

That is, a monoisocyanate compound having a single isocyanate group in a single molecule thereof cannot provide satisfactory corrosion resistance. In particular, under a severe corrosive environment where iron rust coexists therein, or in a state of low coating weight domains giving not more than 0.6 g/$m^2$ of organic coating weight, the barrier performance of resin in the organic coating gives significant contribution to the suppression of corrosion. In that case, superior corrosion resistance is attained by using a multifunctional polyisocyanate compound having preferably three or more of isocyanate groups, more preferably four or more of them, and most preferably six or more of them.

Examples of the multifunctional polyisocyanate compound having at least three isocyanate groups in a single molecule thereof are: a compound having at least three isocyanate groups in a single molecule thereof, a compound prepared by reacting a compound having at least two isocyanate groups in a single molecule thereof, with a polyhydric alcohol; or their burette type adduct, or their isocyanuric ring type adduct. Examples of these multifunctional polyisocyanate compound are: a polyisocyanate compound having three or more of isocyanate group, including triphenylmethane-4,4',4'-triisocyanate, 1,3,5-truisocyanate benzene, 2,4,6-triisocyanate toluene, 4,4'-dimethylphenylmethane-2,2',5,5'-tetraisocyanate; an adduct prepared by reaction between a polyisocyanate compound and a polyol, at an excess amount of isocyanate groups in the polyisocyanate compound compared with the amount of hydroxyl groups in the polyol, examples of the polyol being ethylene glycol, propylene glycol, 1,4-butylene glycol, polyalkylene glycol, trimethylol propane, and hexane triol; a burette type adduct and an isocyanuric ring type adduct, such as hexamethylene diisocyanate, isophorone diisocyanate, tolylene diisocyanate, xylylene diisocyanate, 4,4'-diphenylmethane diisocyanate, 4,4'-methylene bis (cyclohexylisocyanate).

In the above-described adduct prepared by reacting the polyol hydroxyl groups with the polyisocynanate compound having excess amount of isocyanate groups against the amount of polyol hydroxyl groups, examples of the polyisocyanate compound are: an aliphatic diisocyanate compound such as above-described polyisocyanate compound having three or more of isocyanate groups, hexamethylene diisocyanate, 1,4-tetramethylene diisocyanate, dimer acid diisocyanate, and lysine diisocyanate; an alicyclic diisocyanate compound such as isophorone diisocyanate, 4,4'-methylene bis(cyclohexyl isocyanate), methylcyclohexane-2,4-(or -2,6-)diisocyanate, 1,3- (or 1,4-)di (isocyanatemethyl)cyclohexane; and an aromatic diisocyanate such as xylylene diisocyanate, diphenylmethane diisocyanate, bis(4-isocyanatephenyl)sulfone.

Among multifunctional polyisocyanate compounds having at least six isocyanate groups in a single molecule thereof, (hexa-functional polyisocyanate compounds), particularly a multifunctional body of hexamethylene diisocyanate shows most effective performance to increase in corrosion resistance. The multifunctional polyisocyanate compounds according to the present invention may be a mixture of the same group compounds having different number of isocyanate groups in a single molecular thereeach. Two or more of the above-described multifunctional polyiisocyanate compounds may be used together.

As described before, a method for protecting the isocyanate in the curing agent for stably storing the formed film may be a protection method in which the protective group (block-forming agent) is released during heating and curing period, thus regenerating the isocyanate group. Examples of the protective agent (block-forming agent) are the following. By reacting one or more of the protective agents with the above-described polyisocyanate compound, an isocyanate compound which is stably protected at least at normal temperature is attained.

(1) Aliphatic monoalcohols such as methanol, ethanol, propanol, butanol, octylalcohol.

(2) Monoethers such as ethylene glycol and/or diethylene glycol, for example, monoethers of methyl, ethyl, propyl (n-, iso-), butyl (n-, iso-, sec-).

(3) Phenols such as phenol and cresol.

(4) Oximes such as acetoxime and methylethylketone oxime.

The polyisocyanate compound as the curing agent is mixed in a range of from 5 to 80 parts by weight (as solid content) to 100 parts by weight (as solid content) of the substrate resin, preferably from 10 to 40 parts by weight (as solid content). If the mixing rate of the curing agent is less than 5 parts by weight, the cross-linking density of thus formed coating becomes insufficient, and the improvement effect of corrosion resistance is less. If the mixing rate thereof exceeds 80 parts by weight, the unreacted residual isocyanate absorbs water, which degrades the corrosion resistance and the coating adhesiveness.

Furthermore, as the cross-linking agent, an alkyletherified amino resin may be used along with an isocyanate compound, which alkyletherified amino resin is prepared by reacting a part or total of a methylol compound derived from the reaction of at least one compound selected from the group consisting of melamine, urea, and benzoguanamine with formaldehyde, with a monohydric alcohol having 1 to 5 carbon atoms. The resin is fully cross-linked by the above-described cross-linking agent. For further improvement of low temperature cross-linking property, it is preferred to use a known cross-link enhancing catalyst. Examples of the cross-link enhancing catalyst are N-ethylmorpholine, dibutyltin dilaurate, cobalt naphthenate, tin(IV) chloride, zinc naphthenate, and bismuth sulfate. Aiming at slight increase of the physical characteristics, the above-described resin composition may be used along with a known acrylic, alkyd, and polyester resins.

The coating composition according to the present invention may be used by neutralizing the base of epoxy resin as the substrate resin using a low molecular weight acid, and by dispersing it in water or by forming a water-soluble composition. When, however, low temperature drying at plate temperatures of 250° C. or below, particularly very low temperature drying at 170° C. or below, is requested as the coating material for BH steel plate, the above-described neutralization is not given, and it is preferable to use the composition as a composition of dissolved in an organic solvent. That is, a water-soluble composition or an aqueous composition shows rather poor corrosion resistance and coating adhesiveness because the acidic compound necessary for making the composition soluble in water forms a salt in the coating, which induces ready absorption of water into coating and under the coating in a humid environment, and also the low temperature drying conditions cannot give sufficiently rigid coating.

That type of organic solvents may be a single organic solvent used in normal coating industry or may be two or more of these organic solvents mixed together. To do this, it is preferable to avoid the use of high boiling point alcohol-base solvents. That kinds of high boiling point alcohol-base solvents include ethylene glycol, diethylene glycol, monoalkylether, and alcohol including primary hydroxyl group of C5 or more. That kind of solvents inhibits the curing reaction of coating. Preferable solvents are hydrocarbon, ketone, ester, ether solvents. Also low molecular weight alcohols of C4 or less, or alcohols having secondary or tertiary hydroxyl group are preferable.

According to the present invention, addition of a rust-preventive additive or a solid lubricant to the organic coating, at need, may be applied. Both of them may be added together.

Addition of a rust-preventive additive is effective particularly when superior corrosion resistance is required.

Examples of preferred rust-preventive additive according to the present invention are a silica, a phosphate, a molybdate, a phosphomolybdate (for example, aluminum phosphomolybdate), an organic phosphoric acid and its salt (for example, phytic acid, phosphonic acid, and their metallic salt, alkali metal salt, alkali earth metallic salt); an organic inhibitor (for example, hydrazine derivative, thiol compound). These rust-preventive additives may be used separately or mixing two or more of them.

Among these rust-preventive additives, silica and/or phosphate are more preferable.

Examples of applicable silica according to the present invention are: a dry silica (for example, AEROSIL 130, AEROSIL 200, AEROSIL 300, AEROSIL 380, AEROSIL 972, AEROSIL R811, AEROSIL R805, produced by JAPAN AEROSIL CO., LTD.); an organosilica sol (for example, MA-CT, IPA-ST, NBA-ST, IBA-ST, EG-ST, XBA-ST, ETC-ST, DMAC-ST, produced by Nissan Chemical Industries, Ltd.); a wet silica prepared by sedimentation method (for example, T-32(S), K-41, F-80, produced by Tokuyama Corp.); a wet silica prepared by gel method (for example, SILOID 244, SILOID 150, SILOID 72, SILOID 65, SHIELDEX, produced by FUJIDAVIDSON CHEMICAL. Among them, dry silica is preferred in view of corrosion resistance.

According to the present invention, to attain further superior corrosion resistance of silica, a silica which is ion-exchanged using a cation (for example, ion of calcium, zinc, cobalt, lead, strontium, lithium, barium, and manganese) having a function to prevent corrosion may be used. These kinds of cations presumably exchange ions from protons in a corrosive environment, then are released from the silica to form stable corrosion products on the surface of metal, which products suppress the corrosion. Among them, most preferable silica is calcium-exchanged silica in view of corrosion resistance.

A preferred applicable silica according to the present invention has specific surface areas of from 20 to 1000 $m^2/g$ (determined by the BET method). If the specific surface area is less than 20 $m^2/g$, the improvement effect of corrosion resistance is not sufficient. If the specific surface area exceeds 1000 $m^2/g$, the thixotropic property of coating composition containing silica increases, which degrades the workability of coating using a roll coater and the like.

The phosphate according to the present invention is not limited by the skeleton and the degree of condensation of the phosphoric acid ions, and it may be either one of normal salt, dihydrogen salt, monohydrogen salt, and phosphite. The normal salt includes orthophosphate, all kinds of condensed phosphate such as polyphosphate (for example, zinc phosphate, calcium phosphate, aluminum dihydrogen phosphate, zinc phosphate). Among them, more preferable ones are at least one phosphate selected from the group consisting of phosphate of zinc, of calcium, and of aluminum. Use of above-given silica and phosphate together provides particularly superior corrosion resistance.

According to the present invention, mixing a solid lubricant in the organic coating provides further superior lubrication performance.

Examples of the solid lubricant preferred in the present invention are the following.

(1) Polyolefin wax, paraffin wax: for example, polyethylene wax, synthesized paraffin, micro wax, chlorinated hydrocarbon.

(2) Fluororesin-base wax: for example, polyfluoroethylene resin (polytetrafluoroethylene resin), polyfluorovynil resin, polyfluorovinylidene resin.

(3) Fatty acid amid-base compounds: for example, stearic acid amide, palmitic acid amide, methylene bis-stearoamide, ethylene bis-stearoamide, oleic acid amide, ethyl acid amide, alkylene bis-fatty acid amide.

(4) Metallic soaps: for example, calcium stearate, zinc stearate, calcium laurate, calcium palmitate.

(5) Metallic sulfides: for example, molybdenum disulfide, tungsten disulfide.

(6) Other: for example, graphite, graphite fluoride, boron nitride.

When particularly superior lubrication is required, it is preferable to use at least one compound selected from the group consisting of polyethylene wax, polytetrafluoroethylene resin, and boron nitride. Use of polyethylene wax and polytetrafluoroethylene resin together provides further superior lubrication performance.

The average particle size of the solid lubricant according to the present invention is preferably in a range of from 0.05 to 25 μm. If the particle size is less than 0.05 μm, the surface concentration of the lubricant is enriched to widen the occupied area of lubricant on the uppermost surface layer of the organic coating, which degrades the coating adhesiveness. On the other hand, if the particle size exceeds 25 μm, the lubricant separates from the organic coating, which fails to attain the required lubrication, also results in poor corrosion resistance. To obtain excellent coating adhesiveness, corrosion resistance, lubrication, and anti-powdering performance, the average particle size is preferably in a range of from 1 to 15 μm, and most preferably from 3 to 10 μm.

By regulating the softening point of polyethylene wax to a range of from 100 to 135° C., more preferably from 110 to 130° C., the lubrication and the anti-powdering performance are further improved.

A preferable content of lubricant and/or rust-preventive additive in the organic coating is in a range of from 1 to 100 parts by weight of the rust-preventive additive as solid content to 100 parts by weight of the organic resin (1) as solid content, and in a range of from 1 to 80 parts by weight of the solid lubricant as solid content to 100 parts by weight of the organic resin (1) as solid content.

If the content of the rust-preventive additive is less than 1 part by weight to 100 parts by weight of the organic resin (1), the improvement in corrosion resistance becomes insufficient. If the content of the rust-preventive additive exceeds 100 parts by weight to 100 parts by weight of the organic resin, the coating adhesiveness and the lubrication degrade. Accordingly, a preferable range of the content is from 10 to 80 parts by weight, most preferably from 20 to 70 parts by weight, in view of coating adhesiveness, lubrication, and corrosion resistance.

On the other hand, if the content of the solid lubricant is less than 1 part by weight to 100 parts by weight of the organic resin (1), the improvement effect of the lubrication is not sufficient. If the content exceeds 80 parts by weight, the coating adhesiveness and the corrosion resistance degrade. Thus, a preferable range of the content is from 5 to 50 parts by weight, and most preferably from 15 to 35 parts by weight, in view of coating adhesiveness, lubrication, and corrosion resistance.

The organic coating according to the present invention consists mainly of the above-described organic resin and, at need, the rust-preventive additive and/or the solid lubricant. Adding to those components, other components may further be added to the organic coating unless they do not give bad influence to the quality and performance of the organic coating. Examples of other applicable components are: an organic resin (for example, acrylic resin, urethane resin, alkyd-base resin, fluorine-base resin; acrylic-silicone resin; silicone resin, phenol-base resin, melamine-base resin, amino-base resin); fine oxide particles such as those of alumina and zirconia; a conductive material; a color pigment (for example, condensed polycyclic organic pigment, phthalocyanine-base pigment); a color dye (for example, azo-base dye, azo-base metallic complex salt dye); a film-forming assistant; a dispersion-improving agent; and a defoaming agent. These other components may be added separately or two or more thereof together.

A preferable range of coating weight of the organic coating is from 0.05 to 1.5 g/m$^2$. If the coating weight is less than 0.05 g/m$^2$, the corrosion resistance and the lubrication degrade. If the coating weight exceeds 1.5 g/m$^2$, the weldability degrades. Thus, a preferable range of the coating weight is from 0.2 to 3' 1.0 μm and most preferably from 0.3 to 0.7 g/m$^2$, in view of lubrication, corrosion resistance, coating adhesiveness, and weldability.

According to the present invention, the method for forming the organic coating comprises the steps of: applying a coating composition consisting mainly of the above-described organic resin and, at need, the above-described rust-preventive additive and/or the lubricant on to at least one side of the surfaces of the steel plate coated with the above-described zinc phosphate coating; drying the coating composition to form the coating. Before applying the coating composition, it is possible to arbitrarily give a preliminary treatment such as washing with water and drying the steel plate on which the zinc phosphate coating was formed.

Any type of method for applying the coating composition onto the steel plate may be adopted. Normally, the application is done by roll-coater method. However, it is possible to, after applying by immersion method and spray method, adjust the coating weight by air-knife method or roll-squeezing method.

The drying after applied the coating composition may be done by a drier, a hot-air furnace, a high frequency induction heating furnace, or an infrared furnace.

A preferred drying temperature is in a range of from 50 to 250° C. as the ultimate plate temperature. If the drying temperature is lower than 50° C., the coating is insufficiently dried to induce stickiness on the coating, and the coating is damaged on touching to rolls after drying, which degrades the coating adhesiveness, the corrosion resistance, and the lubrication performance. If the ultimate plate temperature exceeds 250° C., further effect cannot be expected, and the production cost becomes unfavorable. In this respect, a preferable range of baking temperature is from 80 to 200° C., most preferably from 100 to 170° C.

The present invention deals with a steel plate having the above-described coating structure on both sides or on one side thereof. Consequently, examples of the mode for carrying out the present invention are the following.

| | |
|---|---|
| (1) One side | : Steel plate surface + Zinc phosphate composite coating + Organic coating |
| The other side | : Steel plate surface + Zinc phosphate composite coating |
| (2) One side | : Steel plate surface + Zinc phosphate composite coating + Organic coating |
| The other side | : Steel plate surface |
| (3) Both sides | : Steel plate surface + Zinc phosphate composite coating + organic coating |

According to the present invention, the organic coating may further be covered with a rust-preventive oil layer as the third layer. The rust-preventive oil consists mainly of a rust-preventive additive (for example, oil-soluble surfactant), a petroleum-base base material (for example, mineral oil, solvent), an oil film adjuster (for example, mineral oil, crystallizing material, a viscous material), an antioxidizing agent (for example, phenol-base antioxidant), a lubricant (for example, extreme-pressure additive). Examples of the rust-preventive oil are a normal rust-preventive oil, a cleaning rust-preventive oil, a lubrication rust-preventive oil. Examples of the normal rust-preventive oil are a finger print removal type rust-preventive oil which is prepared by dissolving and decomposing a base material in a petroleum-base solvent, a solvent cutback type rust-preventive oil, a lubricant oil type rust-preventive oil using petrolactam and wax as the base materials, and a volatile rust-preventive oil.

A preferable coating weight of the rust-preventive oil film is in a range of from 0.01 to 10 g/m$^2$. If the coating weight is less than 0.01 g/m$^2$, the effect of rust-preventive oil application cannot be attained. If the coating weight exceeds 10 g/m$^2$, the degreasing ends insufficiently, which results in poor coating adhesiveness. For attaining further superior corrosion resistance and coating adhesiveness, the coating weight is preferably in a range of from 0.5 to 3 g/m$^2$.

The surface-treated steel plates according to the present invention are applicable not only to automobiles and household electric appliances but also to building materials.

Embodiment

Cold-rolled steel plates each having a plate thickness of 0.7 mm and a surface roughness (Ra) of 1.0 μm were used to prepare plated steel plates by applying plating of zinc-base coating.

Thus prepared plated steel plates were subjected to alkali degreasing, washing with water, and surface preparation treatment, then were brought into contact with a zinc phosphate treatment solution, followed by washing with water and drying, thus to obtain the zinc phosphate-treated steel plates. Onto the zinc phosphate-treated steel plates, respective coating compositions were applied using the roll coater method, which were then dried without washing with water. Then, a rust-preventive oil or a cleaning oil was applied to the dried steel plates. The obtained surface-treated steel plates were tested to determine lubrication performance, anti-powdering performance, coating adhesiveness, and weldability. Individual conditions are described below.

(1) Plated Steel Plates

Table 22 shows the kinds of plating and the coating weights applied onto the zinc-base plated steel plates used in the embodiment.

(2) Zinc Phosphate Composite Treatment

Each of the plated steel plates was treated by degreasing and washing with water to clean the surface. The composition, the treatment temperature, and the treatment time for the surface-preparation solution and the zinc phosphate treatment solution were adjusted. The zinc phosphate composite-treated steel plates listed in Table 23 were prepared, each of which gives different coating weight and coating composition.

The following is an example of the method for preparing the zinc phosphate-treated steel plates.

[Zinc Phosphate Composite Coating Steel Plate 1]

A plated steel plate (A in Table 2) was treated by degreasing (FCL 4480, produced by Nihon Parkerizing Co., Ltd., 18 g/l, 45° C., 120 seconds spraying), then by washing with water (20 seconds spraying). Thus treated steel plate was immersed in a zinc phosphate treatment solution 1 given in Table 21, heated to 50° C., for 10 second, followed by washing with water and drying, to obtain the zinc phosphate composite coating steel plate 1.

[Zinc Phosphate Composite Coating Steel Plate 2]

A plated steel plate (B in Table 22) was treated by degreasing (FCL 4480, produced by Nihon Parkerizing Co., Ltd., 18 g/l, 45° C., 120 seconds spraying), then by washing with water (20 seconds spraying). The steel plate was further treated by surface preparation treatment (PREPAREN Z, produced by Nihon Parkerizing Co., Ltd., 1.5 g/l, room temperature, 2 seconds spraying). Thus treated steel plate was immersed in a zinc phosphate treatment solution 2 given in Table 1 (given later), heated to 45° C. for 1 second, followed by washing with water and drying, to obtain the zinc phosphate composite coating steel plate 2.

[Zinc Phosphate Composite Coating Steel Plate 3]

The same treatment as in the zinc phosphate composite coating steel plate 2 was applied except that the plated steel plate of above-described zinc phosphate composite coating steel plate 2 was C in Table 22 instead of B in Table 22.

[Zinc Phosphate Composite Coating Steel Plate 5]

A plated steel plate (B in Table 2) was treated by degreasing (FCL 4480, produced by Nihon Parkerizing Co., Ltd., 18 g/l, 45° C., 120 seconds spraying), then by washing with water (20 seconds spraying). The steel plate was further treated by surface preparation treatment (PREPAREN ZN, produced by Nihon Parkerizing Co., Ltd., 1.5 g/l, room temperature, 2 seconds spraying). Thus treated steel plate was subjected to 4 seconds of spraying a zinc phosphate treatment solution 3 given in Table 1 (given later), heated to 60° C., followed by washing with water and drying, to obtain the zinc phosphate composite coating steel plate 5.

TABLE 21

| | Composition of zinc phosphate treatment solution (g/l) | | | | | | | | | Acid ratio (Total acid/ |
|---|---|---|---|---|---|---|---|---|---|---|
| | Zn | Ni | Mn | Mg | Ca | $PO_4$ | $NO_3$ | F | $NO_2$ | Free acid) |
| Phosphate treatment solution 1 | 0.8 | 3 | 0.5 | — | 0.5 | 10 | 7 | 2 | 0.5 | 17 |
| Phosphate treatment solution 2 | 1.3 | 0.5 | 0.5 | — | — | 20 | 3 | 1.5 | 0.3 | 21 |
| Phosphate treatment solution 3 | 1.4 | 3.2 | — | 0.7 | — | 12.5 | 13 | 0.5 | — | 10 |

(3) Coating Composition (3-1) Organic Resin

Table 24 shows the organic resins (1) (substrate resin+curing agent) used in the organic coatings. The substrate resins A and B, and the curing agents a through e (polyisocyanate compounds) listed in the table were prepared by the method given below.

[Substrate Resin]

(I) To a reactor provided with a reflux condenser, an agitator, a thermometer, and a nitrogen gas injector, 1600 g of Epicoat 1004 (an epoxy resin having molecular weight of about 1600, produced by Shell Chemical, Inc.), 57 g of pelargonic acid (reagent), and 80 g of xylene were poured. The mixture was reacted at 170° C. Then, the xylene was removed under a reduced pressure to obtain an intermediate reactant [A].

(II) To a reactor provided with a reflux condenser, an agitator, a thermometer, and a liquid dropping unit, 1880 g (0.5 mole) of Epicoat 1009 (an epoxy resin having molecular weight of about 3750, produced by Shell Chemical, Inc.) and 1000 g of mixed solvent of methylisobutylketone/xylene=1/1 (weight ratio) were poured. The mixture was heated under agitation to uniformly dissolve the contents at the boiling point of the solvent. After that, the mixture was cooled to 70° C. A 70 g of di(n-propanol)amine which had been prepared in a liquid dropping unit was added dropwise to the mixture for 30 minutes. During the dropwise addition of the di(n-propanol)amine, the reaction temperature was kept to 70° C. After finished the dropwise addition, the mixture was kept to 120° C. for 2 hours to complete the reaction. The reaction product was named the resin A. The effective ingredients of the resin A was 66%.

(III) To the same reactor as used in (II), 1650 g of the intermediate reactant [A]obtained in (I) and 1000 g of xylene were poured. The mixture was heated to 100° C. A 65 g of diethanolamine and 30 g of monoethanolamine, which had been prepared in a liquid-dropping unit, were added dropwise to the mixture for 30 minutes. After that, the mixture was kept to 120° C. for 2 hours to finish the reaction. The reaction product was named as the resin B. The effective ingredients of the resin B was 63%.

[Curing Agent]

(a) Hexafunctional Isocyanate (Curing Agent a)

To a reactor provided with a thermometer, an agitator, and a ref lux condenser with dropping funnel, 222 parts by weight of isophorone diisocyanate and 34 parts by weight of methylisobutylketone were poured to let them fully dissolved. Then, 87 parts by weight of methylethylketone oxime was added dropwise from the dropping funnel to the isocyanate solution which was kept to 70° C. under agitation, for a period of 2 hours.

After that, 30.4 parts by weight of sorbitol was added to the mixture, which mixture was then heated to 120° C. to continue the reaction at that temperature. After the reaction, the reacted product was analyzed by IR measurement to confirm the absence of absorption of isocyanate group in a range of from 2250 to 2270 $cm^{-1}$. Then, 50.4 parts by weight of butyl cellosolve was added to the mixture to obtain the curing agent a. The effective ingredients of the curing agent a was 80%.

(b) Tetrafunctional Isocyanate (Curing Agent b)

To a reactor provided with a thermometer, an agitator, and a reflux condenser with dropping funnel, 222 parts by weight of isophorone diisocyanate and 34 parts by weight of methylisobutylketone were poured to let them fully dissolved. Then, 87 parts by weight of methylethylketone oxime was added dropwise from the dropping funnel to the isocyanate solution which was kept to 70° C. under agitation, for a period of 2 hours. After that, 34 parts by weight of pentaerythritol was added to the mixture, which mixture was heated to 120° C. to continue the reaction at that temperature. After the reaction, the reacted product was analyzed by IR measurement to confirm the absence of absorption of isocyanate group in a range of from 2250 to 2270 $cm^{-1}$. Then, 52 parts by weight of butyl cellosolve to obtain the curing agent b. The effective ingredients of the curing agent b was 80%.

(c) Trifunctional Isocyanate (Curing Agent c)

To a reactor provided with a thermometer, an agitator, and a ref lux condenser with dropping funnel, 550 parts by weight of Duranate TPA-100 (isocyanuric ring type of HMDI, produced by Asahi Chemical Industry Co., Ltd.) and 34 parts by weight of methylisobutylketone were poured to let them uniformly dissolve. Then, 270 parts by weight of methylethylketone oxime was added dropwise through the dropping funnel to the isocyanate solution which was kept to 70° C. under agitation for 2 hours. After the reaction, the reacted product was analyzed by IR measurement to confirm the absence of absorption of isocyanate group in a range of from 2250 to 2270 $cm^{-1}$. Then, 47 parts by weight of butyl cellosolve to obtain the curing agent c. The effective ingredients of the curing agent c was 90%.

(d) Difunctional Isocyanate (Curing Agent d)

Takenate B-870N (MEK oxime block body of IPDI, produced by Takeda Chemical Industries, Ltd.) was used as the curing agent d.

(e) Hexamethylene Diisocyanate-base Hexafunctional Isocyanate (Curing Agent e)

Duranate MF-B80M (an oxime block body of hexafunctional isocyanate of HMDI, produced by Asahi Chemical Industries, Ltd.) which is a hexafunctional isocyanate compound of hexamethylene diisocyanate-base was used as the curing agent e.

(3-2) Rust-preventive Additive

Table 25 shows the rust-preventive additives used in the coating compositions.

(3-3) Lubricant

Table 26 shows the solid lubricants used in the coating compositions.

(3-4) Coating Composition

Table 27 shows the coating compositions used in the example.

(4) Rust-preventive Oil

Table 28 shows the rust-preventive oils used in the example.

TABLE 22

| | |
|---|---|
| A | Alloyed hot dip galvanized steel plate (coating weight: 60 g/m$^2$) |
| B | Electrolytically galvanized steel plate (coating weight: 30 g/m$^2$) |
| C | Electrolytically Zn-11% Ni alloy plated steel plate (coating weight: 20 g/m$^2$) |
| D | Hot dip galvanized steel plate (coating weight: 90 g/m$^2$) |
| E | Electrolytically Zn-1% Co alloy plated steel plate (coating weight: 30 g/m$^2$) |
| F | Two-layer alloyed hot dip galvanized steel plate (coating weight: 5 g/m$^2$ for upper layer; 60 g/m$^2$ for lower layer) |
| G | Hot dip Zn-5% Al-0.5% Mo alloy plated steel plate (coating weight: 90 g/m$^2$) |

TABLE 22-continued

| | |
|---|---|
| H | Hot dip Zn-55% Al-1.6% Si alloy plated steel plate (coating weight: 75 g/m$^2$) |
| I | Hot dip Zn-0.5% Mn alloy plated steel plate (coating weight: 150 g/m$^2$) |

TABLE 23

| No. | Plated steel plate*1 | Coating weight (g/m$^2$) | Ni content (mass %) | Mn content (mass %) | Mg content (mass %) |
|---|---|---|---|---|---|
| 1 | A | 1.1 | 2.6 | 2.8 | — |
| 2 | B | 0.7 | 1.0 | 2.8 | — |
| 3 | C | 0.6 | 0.2 | 1.8 | — |
| 4 | D | 1.0 | 2.0 | 3.0 | — |
| 5 | B | 0.9 | 5.6 | — | 0.3 |
| 6 | B | 1.0 | 5.5 | — | 0.5 |
| 7 | E | 1.0 | 1.0 | 2.5 | — |
| 8 | F | 1.0 | 2.7 | 3.0 | — |
| 9 | G | 1.0 | 2.8 | 3.2 | — |
| 10 | H | 1.0 | 2.8 | 3.2 | — |
| 11 | I | 1.0 | 2.1 | 3.2 | — |
| 12 | B | 1.0 | 3.0 | — | — |
| 13 | B | 1.0 | — | 3.5 | — |
| 14 | B | 0.7 | 0.1 | 0.5 | — |
| 15 | B | 1.0 | 2.0 | 0.5 | — |
| 16 | B | 1.1 | 3.0 | 4.0 | — |
| 17 | B | 1.1 | 0.5 | 5.5 | — |
| 18 | B | 1.0 | 4.5 | 4.0 | — |
| 19 | B | 1.1 | 5.5 | 4.0 | — |
| 20 | B | 1.0 | — | — | — |
| 21 | B | — | — | — | — |
| 22 | B | 0.2 | 1 | 2.4 | — |
| 23 | B | 0.5 | 1 | 2.7 | — |
| 24 | B | 1.5 | 2.8 | 3.1 | — |
| 25 | B | 2.0 | 2.8 | 3.1 | — |
| 26 | B | 2.5 | 2.8 | 3.1 | — |
| 27 | B | 3.0 | 2.8 | 3.1 | — |

TABLE 24

| | Substrate resin | | Curing agent | | | |
|---|---|---|---|---|---|---|
| No. | Kind*1 | Content*3 | Kind*2 | Content*3 | Catalyst and content | Classification*4 |
| 1 | A | 100 parts | a | 5 parts | Dibutyltin-dilaurate 0.2 part | Example |
| 2 | A | 100 parts | a | 25 parts | Dibutyltin-dilaurate 1.0 part | Example |
| 3 | A | 100 parts | b | 25 parts | — | Example |
| 4 | A | 100 parts | b | 50 parts | Dibutyltin-dilaurate 2.0 part | Example |
| 5 | A | 100 parts | c | 50 parts | Dibutyltin-dilaurate 3.0 part | Example |
| 6 | A | 100 parts | c | 80 parts | Dibutyltin-dilaurate 4.0 part | Example |
| 7 | A | 100 parts | b | 25 parts | Cobalt naphthenate 1.0 part | Example |
| 8 | B | 100 parts | a | 10 parts | Cobalt naphthenate 2.0 part | Example |
| 9 | B | 100 parts | b | 50 parts | Tin(II)chloride 1.0 part | Example |
| 10 | B | 100 parts | c | 25 parts | N-Ethylmorpholine 2.0 parts | Example |
| 11 | B | 100 parts | — | — | — | Comparative Example |
| 12 | A | 100 parts | a | 100 parts | Dibutyltin-dilaurate 1.0 part | Comparative Example |
| 13 | A | 100 parts | d | 25 parts | Dibutyltin-dilaurate 1.0 part | Example |
| 14 | A | 100 parts | e | 5 parts | Dibutyltin-dilaurate 0.2 part | Example |
| 15 | A | 100 parts | e | 25 parts | Dibutyltin-dilaurate 1.0 part | Example |
| 16 | A | 100 parts | e | 10 parts | Cobalt naphthenate 2.0 parts | Example |
| 17 | A | 100 parts | e | 100 parts | Dibutyltin-dilaurate 1.0 part | Comparative Example |

*1Resin A and Resin B described in the specification.
*2Curing agents "a" through "e" described in the specification.
*3Content represents parts by weight of solid content.
*4Relating to organic resin.

TABLE 25

| No. | Name |
|---|---|
| 1 | AEROSIL R811 (dry silica, hydrophobic), produced by JAPAN AEROSIL CO., LTD. |
| 2 | AEROSIL R974 (dry silica, hydrophobic), produced by JAPAN AEROSIL CO., LTD. |
| 3 | AEROSIL R805 (dry silica, hydrophobic), produced by JAPAN AEROSIL CO., LTD. |
| 4 | AEROSIL R202 (dry silica, hydrophobic), produced by JAPAN AEROSIL CO., LTD. |
| 5 | AEROSIL 200 (dry silica, hydrophilic), produced by JAPAN AEROSIL CO., LTD. |
| 6 | AEROSIL 380 (dry silica, hydrophilic), produced by JAPAN AEROSIL CO., LTD. |
| 7 | ETC-ST (organosilica sol, hydrophilic), produced by Nissan Chemical Industries Co., Ltd. |
| 8 | FINESEAL T-32(S) (wet silica prepared by sedimentation method, hydrophilic), produced by Tokuyama Corp. |
| 9 | SILOID 244 (wet silica prepared by gel method, hydrophilic), produced by FUJIDAVIDSON CHEMICAL |
| 10 | SHIELDEX (calcium-exchanged silica, hydrophilic), produced by FUJI DAVIDSON CHEMICAL |
| 11 | Zinc phosphate |
| 12 | Calcium phosphate |
| 13 | SHIELDEX C303 (Ca concentration: 3 mass %), produced by W. R. Grace & Co. |
| 14 | Aluminum phosphomolybdate |
| 15 | Aluminum phosphate |

TABLE 26

| No. | Lubricant | Particle size (μm) | Softening point (° C.) |
|---|---|---|---|
| 1 | Tungsten disulfide | 3 | — |
| 2 | Molybdenum disulfide | 3 | — |
| 3 | Graphite | 3 | — |
| 4 | Boron nitride | 3 | — |
| 5 | Polyethylene | 0.05 | 110 |
| 6 | Polyethylene | 1 | 110 |
| 7 | Polyethylene | 3 | 115 |
| 8 | Polyethylene | 7 | 110 |
| 9 | Polyethylene | 7 | 130 |
| 10 | Polyethylene | 9 | 130 |
| 11 | Polyethylene | 10 | 130 |
| 12 | Polyethylene | 15 | 125 |
| 13 | Polyethylene | 25 | 125 |
| 14 | Tetrafluoroethylene resin | 3 | — |
| 15 | Polypropylene | 7 | 97 |
| 16 | Polyethylene | 7 | 100 |
| 17 | Polyethylene | 7 | 135 |
| 18 | Polyethylene | 7 | 137 |

TABLE 27-1

| No. | Kind of resin *1 | Content *3 | Kind of rust-preventive agent *2 | Content *3 | Kind of lubricant *4 | Content *3 |
|---|---|---|---|---|---|---|
| 1 | 1 | 100 | 5 | 65 | 8 | 30 |
| 2 | 2 | 100 | 5 | 65 | 8 | 30 |
| 3 | 3 | 100 | 5 | 65 | 8 | 30 |
| 4 | 4 | 100 | 5 | 65 | 8 | 30 |
| 5 | 5 | 100 | 5 | 65 | 8 | 30 |
| 6 | 6 | 100 | 5 | 65 | 8 | 30 |
| 7 | 7 | 100 | 5 | 65 | 8 | 30 |
| 8 | 8 | 100 | 5 | 65 | 8 | 30 |
| 9 | 9 | 100 | 5 | 65 | 8 | 30 |
| 10 | 10 | 100 | 5 | 65 | 8 | 30 |
| 11 | 11 | 100 | 5 | 65 | 8 | 30 |
| 12 | 12 | 100 | 5 | 65 | 8 | 30 |
| 13 | 13 | 100 | 5 | 65 | 8 | 30 |
| 14 | 14 | 100 | 5 | 65 | 8 | 30 |

TABLE 27-1-continued

| No. | Kind of resin *1 | Content *3 | Kind of rust-preventive agent *2 | Content *3 | Kind of lubricant *4 | Content *3 |
|---|---|---|---|---|---|---|
| 15 | 15 | 100 | 5 | 65 | 8 | 30 |
| 16 | 16 | 100 | 5 | 65 | 8 | 30 |
| 17 | 17 | 100 | 5 | 65 | 8 | 30 |
| 18 | 15 | 100 | 1 | 65 | 8 | 30 |
| 19 | 15 | 100 | 2 | 65 | 8 | 30 |
| 20 | 15 | 100 | 3 | 65 | 8 | 30 |
| 21 | 15 | 100 | 4 | 65 | 8 | 30 |
| 22 | 15 | 100 | 6 | 65 | 8 | 30 |
| 23 | 15 | 100 | 7 | 65 | 8 | 30 |
| 24 | 15 | 100 | 8 | 65 | 8 | 30 |
| 25 | 15 | 100 | 9 | 65 | 8 | 30 |
| 26 | 15 | 100 | 10 | 65 | 8 | 30 |
| 27 | 15 | 100 | 11 | 65 | 8 | 30 |
| 28 | 15 | 100 | 12 | 65 | 8 | 30 |
| 29 | 15 | 100 | 13 | 65 | 8 | 30 |
| 30 | 15 | 100 | 14 | 65 | 8 | 30 |
| 31 | 15 | 100 | 15 | 65 | 8 | 30 |
| 32 | 15 | 100 | 5 | 65 | 1 | 30 |
| 33 | 15 | 100 | 5 | 65 | 2 | 30 |
| 34 | 15 | 100 | 5 | 65 | 3 | 30 |

TABLE 27-2

| No. | Kind of resin | Content | Kind of rust-preventive agent | Content | Kind of lubricant | Content |
|---|---|---|---|---|---|---|
| 35 | 15 | 100 | 5 | 65 | 4 | 30 |
| 35 | 15 | 100 | 5 | 65 | 5 | 30 |
| 37 | 15 | 100 | 5 | 65 | 6 | 30 |
| 38 | 15 | 100 | 5 | 65 | 7 | 30 |
| 39 | 15 | 100 | 5 | 65 | 9 | 30 |
| 40 | 15 | 100 | 5 | 65 | 10 | 30 |
| 41 | 15 | 100 | 5 | 65 | 11 | 30 |
| 42 | 15 | 100 | 5 | 65 | 12 | 30 |
| 43 | 15 | 100 | 5 | 65 | 13 | 30 |
| 44 | 15 | 100 | 5 | 65 | 14 | 30 |
| 45 | 15 | 100 | 5 | 65 | 15 | 30 |
| 46 | 15 | 100 | 5 | 65 | 16 | 30 |
| 47 | 15 | 100 | 5 | 65 | 17 | 30 |
| 48 | 15 | 100 | 5 | 65 | 18 | 30 |
| 49 | 15 | 100 | — | — | 8 | 30 |
| 50 | 15 | 100 | 5 | 1 | 8 | 30 |
| 51 | 15 | 100 | 5 | 10 | 8 | 30 |
| 52 | 15 | 100 | 5 | 20 | 8 | 30 |
| 53 | 15 | 100 | 5 | 70 | 8 | 30 |
| 54 | 15 | 100 | 5 | 80 | 8 | 30 |
| 55 | 15 | 100 | 5 | 100 | 8 | 30 |
| 56 | 15 | 100 | 5 | 120 | 8 | 30 |
| 57 | 15 | 100 | 5 | 65 | — | — |
| 58 | 15 | 100 | 5 | 65 | 8 | 1 |
| 59 | 15 | 100 | 5 | 65 | 8 | 5 |
| 60 | 15 | 100 | 5 | 65 | 8 | 15 |
| 61 | 15 | 100 | 5 | 65 | 8 | 35 |
| 62 | 15 | 100 | 5 | 65 | 8 | 50 |
| 63 | 15 | 100 | 5 | 65 | 8 | 80 |
| 64 | 15 | 100 | 5 | 65 | 8 | 100 |
| 65 | 15 | 100 | — | — | — | — |

*1 Organic resin given in Table 24.
*2 Rust-preventive agent given in Table 25.
*3 Parts by weight (solid content)
*4 Kind of lubricant given in Table 26.

TABLE 28

| No. | Name |
|---|---|
| 1 | Rust-preventive oil "NOX-RUST 530F", produced by PERKER KOUSAN |

TABLE 28-continued

| No. | Name |
|---|---|
| 2 | Rust-preventive oil "DAPHNIS OIL COAT SK", produced by Nippon Oil Co., Ltd. |
| 3 | Cleaning rust-preventive oil "PRETON R303P", produced by SUGIMURA CHEMICAL |
| 4 | Cleaning rust-preventive oil "PRETON R352L", produced by SUGIMURA CHEMICAL |
| 5 | Cleaning rust-preventive oil "RUSTCLEAN K", produced by Nippon Oil Co., Ltd. |
| 6 | Cleaning rust-preventive oil "P-1600B", produced by Nippon Oil Co., Ltd. |
| 7 | Lubrication rust-preventive oil "NOX-RUST 550HN", produced by PERKER KOUSAN |
| 8 | Lubrication rust-preventive oil "NOX-RUST Mu-10", produced by PERKER KOUSAN |

Table 29 shows the kinds of thus prepared surface-treated steel plates and their tested performance of lubrication, anti-powdering performance, corrosion resistance, and coating adhesiveness.

The method for evaluating each characteristic is described below.

Lubrication

A pull-out force was determined under the sliding condition given below, to give evaluation using the formula of:

Friction factor=(Pull-out force)/(Applied force)

The evaluation criteria are the following.

(Sliding Condition)

Tool contact area: 50×10 mm

Tool material: SKD 11

Applied pressure: 400 kgf

Sliding speed: 0.2 m/min (Evaluation Criteria)

◎: not more than 0.15

○+: more than 0.15 and not more than 0.17

○: more than 0.15 and not more than 0.20

X: more than 0.20

Anti-powdering Performance

A specimen was sheared to 30 mm in width, then was tested by draw-bead test under the conditions of a tip radius of bead of 0.5 mm, a bead height of 4 mm, a pressing force of 500 kgf, a pull-out speed of 200 mm/min. After that, the portion of the bead subjected to sliding was tested by adhesive-tape peeling, thus determining the peeled amount of coating per unit area before and after the test. The evaluation criteria are the following.

◎: less than 2 $g/m^2$

○+: more less than 2 $g/m^2$ and less than 3 $g/m^2$

○: not less than 3 $g/m^2$ and less than 4 $g/m^2$

Δ: not less than 4 $g/m^2$ and less than 6 $g/m^2$

X: not less than 6 $g/m^2$

Corrosion Resistance

1) Non-coating Corrosion Resistance

A specimen was treated by degreasing (FCL 4460, produced by Nihon Parkerizing Co., Ltd., 45° C., immersion for 120 seconds). Edges and rear face of the specimen were sealed by adhesive tape. Then the accelerated corrosion test with cycles of combined corrosion test described below was applied to the specimen. The evaluation was given by the degree of rust generation after 6 cycles using the evaluation criteria given below.

| (Combined corrosion test cycle) | |
|---|---|
| Salt spray | 35° C., 4 hours |
| → Drying | 60° C., 2 hours |
| → 95% RH humidification | 50° C., 4 hours |

(Evaluation Criteria)

◎: no generation of rust

○+: rust area less than 25%

○: rust area not less than 25% and less than 50%

Δ: rust area not less than 50% and less than 75%

X: rust area not less than 75%

2) Corrosion Resistance After Coating

A specimen was applied by 3 coat coating described below. Then cross-cut was given on the specimen using a cutter knife. After sealed on both edges and rear face of the specimen with adhesive tape, the accelerated corrosion test with cycles of combined corrosion test described below was applied to the specimen. The evaluation was given by the single-side maximum bulging width at the cross-cut section after 300 cycles using the evaluation criteria given below.

| (Coating (3 coat)) | |
|---|---|
| Zinc phosphate treatment | SD 6500 MZ (standard condition) |
| Electrodeposition coating | V20, film thickness 20 μm |
| Intermediate coating | OT0870 (white color sealer), film thickness 35 μm |
| Top coating | OT0647PT (SHUST WHITE white), film thickness 35 μm |

(Combined Corrosion Test Cycle)

Salt spray 10 minutes→Drying 155 minutes→Humidifying 75 minutes→Drying 160 minutes→Humidifying 80 minutes (Evaluation Criteria)

◎: less than 3 mm

○+: not less than 3 mm and less than 4 mm

○: not less than 4 mm and less than 5 mm

Δ: not less than 5 mm and less than 6 mm

X: not less than 6 mm

Coatability

1) Coating Adhesiveness 1

A specimen was treated by degreasing, then was coated with a commercial coating DELICON 700 at a thickness of 30 μm. The specimen was immersed in boiling water for 120 minutes, then 100 grid cuts were given to the coating at 1 mm of spacing. The Erichsen extrusion to 5 mm was applied to the specimen. Adhesive tapes were attached to the grids, and were peeled off from the grids to determine the residual coating rate. The evaluation criteria are the following.

◎: no peeling occurred

○: peeling rate less than 3%

Δ: peeling rate not less than 3% and less than 10%

X: peeling rate not less than 10%

2) Coating Adhesiveness 2

A specimen was applied by 3 coat coating described below, and was allowed to stand for 24 hours or more. Then, the specimen was immersed in an ion-exchanged water at 50° C. for 240 hours. Within 30 minutes after the specimen was taken out from the water, 100 grid cuts were given to the coating at 1 mm of spacing. Adhesive tapes were attached to the grids, and were peeled off from the grids to determine the residual coating rate. The evaluation criteria are the following.

| Coating (3 coat) | |
|---|---|
| Zinc phosphate treatment | SD 6500 MZ (standard condition) |
| Electrodeposition coating | V20, film thickness 20 μm |
| Intermediate coating | OT0870 (white color sealer), film thickness 35 μm |
| Top coating | OT0647PT (SHUST WHITE), film thickness 35 μm |

(Evaluation Criteria)

◎: no peeling occurred

○: peeling rate less than 3%

Δ: Peeling rate not less than 3% and less than 10%

X: peeling rate not less than 10%

Weldability

A specimen and a mild steel plate were tested by successive spot welding under mixed spot welding of 25 points for each of them. The test conditions were: a CF type electrode having a tip diameter of 4.5 mm; a pressing force of 250 kgf; a squeeze time of 36 cycles/60 Hz; a current applying time of 14 cycles/60 Hz; and a welding current of the current immediately before the generation of expulsion and surface flash. The evaluation criteria are the following.

◎: not less than 1500 spots

○: not less than 1000 and less than 1500

Δ: not less than 500 and less than 1000

X: less than 500

TABLE 29-1

| Classi-fication | No. | Zinc phosphate composite coating steel plate *1 | Coating compo-sition *2 | Coating weight of organic coating ($g/m^2$) | Drying temp-erature (° C.) | Rust-preventive oil *3 | Coating weight of rust-preventive oil ($g/m^2$) | Lubrication | Anti-powdering performance |
|---|---|---|---|---|---|---|---|---|---|
| E | 1 | 1 | 15 | 0.5 | 120 | 2 | 1 | ◎ | ◎ |
| E | 2 | 2 | 15 | 0.5 | 120 | 2 | 1 | ◎ | ◎ |
| E | 3 | 3 | 15 | 0.5 | 120 | 2 | 1 | ◎ | ◎ |
| E | 4 | 4 | 15 | 0.5 | 120 | 2 | 1 | ◎ | ○ |
| E | 5 | 5 | 15 | 0.5 | 120 | 2 | 1 | ◎ | ◎ |
| E | 6 | 6 | 15 | 0.5 | 120 | 2 | 1 | ◎ | ◎ |
| E | 7 | 7 | 15 | 0.5 | 120 | 2 | 1 | ◎ | ◎ |
| E | 8 | 8 | 15 | 0.5 | 120 | 2 | 1 | ◎ | ◎ |
| E | 9 | 9 | 15 | 0.5 | 120 | 2 | 1 | ◎ | ○ |
| E | 10 | 10 | 15 | 0.5 | 120 | 2 | 1 | ◎ | ○ |
| E | 11 | 11 | 15 | 0.5 | 120 | 2 | 1 | ◎ | ○ |
| E | 12 | 12 | 15 | 0.5 | 120 | 2 | 1 | ◎ | ◎ |
| E | 13 | 13 | 15 | 0.5 | 120 | 2 | 1 | ◎ | ◎ |
| E | 14 | 14 | 15 | 0.5 | 120 | 2 | 1 | ◎ | ◎ |
| E | 15 | 15 | 15 | 0.5 | 120 | 2 | 1 | ◎ | ◎ |
| E | 16 | 16 | 15 | 0.5 | 120 | 2 | 1 | ◎ | ◎ |
| E | 17 | 17 | 15 | 0.5 | 120 | 2 | 1 | ◎ | ◎ |
| E | 18 | 18 | 15 | 0.5 | 120 | 2 | 1 | ◎ | ◎ |
| E | 19 | 19 | 15 | 0.5 | 120 | 2 | 1 | ◎ | ◎ |
| C | 20 | 20 | 15 | 0.5 | 120 | 2 | 1 | ○ | ○ |

| Classi-fication | No. | Corrosion resistance: Without coating | Corrosion resistance: After coating | Adhesiveness: Coating adhesiveness 1 | Adhesiveness: Coating adhesiveness 2 | Weldability |
|---|---|---|---|---|---|---|
| E | 1 | ◎ | ◎ | ◎ | ◎ | ◎ |
| E | 2 | ◎ | ◎ | ◎ | ◎ | ◎ |
| E | 3 | ○+ | ○ | ○ | ◎ | ◎ |
| E | 4 | ◎ | ◎ | ◎ | ◎ | Δ |
| E | 5 | ◎ | ○ | ◎ | ◎ | ◎ |
| E | 6 | ◎ | ○+ | ◎ | ◎ | ◎ |
| E | 7 | ◎ | ◎ | ◎ | ◎ | ◎ |
| E | 8 | ◎ | ◎ | ◎ | ◎ | ◎ |
| E | 9 | ◎ | ◎ | ◎ | ◎ | Δ |
| E | 10 | ◎ | ◎ | ◎ | ◎ | Δ |
| E | 11 | ◎ | ◎ | ◎ | ◎ | Δ |
| E | 12 | ◎ | ○+ | ◎ | ◎ | ◎ |
| E | 13 | ◎ | ○ | ○ | ◎ | ◎ |
| E | 14 | ◎ | ○ | ○ | ◎ | ◎ |
| E | 15 | ◎ | ◎ | ◎ | ◎ | ◎ |
| E | 16 | ◎ | ◎ | ◎ | ◎ | ◎ |
| E | 17 | ◎ | ○+ | ◎ | ◎ | ◎ |
| E | 18 | ◎ | ○ | ◎ | ◎ | ◎ |

TABLE 29-1-continued

| | | | | | | |
|---|---|---|---|---|---|---|
| E | 19 | ○+ | ○ | ○ | ⊚ | ⊚ |
| C | 20 | ○+ | Δ | x | Δ | ⊚ |

TABLE 29-2

| Classification | No. | Zinc phosphate composite coating steel plate *1 | Coating composition *2 | Coating weight of organic coating (g/m²) | Drying temperature (° C.) | Rust-preventive oil *3 | Coating weight of rust-preventive oil (g/m²) | Lubrication | Anti-powdering performance |
|---|---|---|---|---|---|---|---|---|---|
| C | 21 | 21 | 15 | 0.5 | 120 | 2 | 1 | Δ | ○ |
| E | 22 | 22 | 15 | 0.5 | 120 | 2 | 1 | ○ | ○ |
| E | 23 | 23 | 15 | 0.5 | 120 | 2 | 1 | ⊚ | ⊚ |
| E | 24 | 24 | 15 | 0.5 | 120 | 2 | 1 | ⊚ | ⊚ |
| E | 25 | 25 | 15 | 0.5 | 120 | 2 | 1 | ○+ | ○ |
| E | 26 | 26 | 15 | 0.5 | 120 | 2 | 1 | ○ | ○ |
| C | 27 | 27 | 15 | 0.5 | 120 | 2 | 1 | Δ | x |
| E | 28 | 2 | 1 | 0.8 | 120 | 2 | 1 | ⊚ | ⊚ |
| E | 29 | 2 | 2 | 0.8 | 120 | 2 | 1 | ⊚ | ⊚ |
| E | 30 | 2 | 3 | 0.8 | 120 | 2 | 1 | ⊚ | ⊚ |
| E | 31 | 2 | 4 | 0.8 | 120 | 2 | 1 | ⊚ | ⊚ |
| E | 32 | 2 | 5 | 0.8 | 120 | 2 | 1 | ⊚ | ⊚ |
| E | 33 | 2 | 6 | 0.8 | 120 | 2 | 1 | ⊚ | ⊚ |
| E | 34 | 2 | 7 | 0.8 | 120 | 2 | 1 | ⊚ | ⊚ |
| E | 35 | 2 | 8 | 0.8 | 120 | 2 | 1 | ⊚ | ⊚ |
| E | 36 | 2 | 9 | 0.8 | 120 | 2 | 1 | ⊚ | ⊚ |
| E | 37 | 2 | 10 | 0.8 | 120 | 2 | 1 | ⊚ | ⊚ |
| C | 38 | 2 | 11 | 0.8 | 120 | 2 | 1 | ⊚ | ⊚ |

| Classification | No. | Corrosion resistance | | Adhesiveness | | Weldability |
|---|---|---|---|---|---|---|
| | | Without coating | After coating | Coating adhesiveness 1 | Coating adhesiveness 2 | |
| C | 21 | Δ | x | x | x | ⊚ |
| E | 22 | ○ | ○ | ○ | ○ | ⊚ |
| E | 23 | ○+ | ○+ | ⊚ | ⊚ | ⊚ |
| E | 24 | ⊚ | ⊚ | ⊚ | ⊚ | ⊚ |
| E | 25 | ⊚ | ⊚ | ⊚ | ⊚ | ○ |
| E | 26 | ⊚ | ⊚ | ⊚ | ⊚ | Δ |
| C | 27 | ⊚ | ⊚ | ⊚ | ⊚ | x |
| E | 28 | ⊚ | ⊚ | ⊚ | ⊚ | ⊚ |
| E | 29 | ⊚ | ⊚ | ⊚ | ⊚ | ⊚ |
| E | 30 | ⊚ | ⊚ | ⊚ | ⊚ | ⊚ |
| E | 31 | ⊚ | ○+ | ⊚ | ⊚ | ⊚ |
| E | 32 | ○+ | ○ | ⊚ | ⊚ | ⊚ |
| E | 33 | ○+ | ○ | ○ | ⊚ | ⊚ |
| E | 34 | ⊚ | ⊚ | ⊚ | ⊚ | ⊚ |
| E | 35 | ⊚ | ⊚ | ⊚ | ⊚ | ⊚ |
| E | 36 | ⊚ | ○+ | ⊚ | ⊚ | ⊚ |
| E | 37 | ○+ | ○+ | ⊚ | ⊚ | ⊚ |
| C | 38 | x | x | x | ○ | ⊚ |

TABLE 29-3

| Classification | No. | Zinc phosphate composite coating steel plate *1 | Coating composition *2 | Coating weight of organic coating (g/m²) | Drying temperature (° C.) | Rust-preventive oil *3 | Coating weight of rust-preventive oil (g/m²) | Lubrication | Anti-powdering performance |
|---|---|---|---|---|---|---|---|---|---|
| C | 39 | 2 | 12 | 0.8 | 120 | 2 | 1 | ⊚ | ⊚ |
| E | 40 | 2 | 13 | 0.8 | 120 | 2 | 1 | ⊚ | ⊚ |
| E | 41 | 2 | 14 | 0.8 | 120 | 2 | 1 | ⊚ | ⊚ |
| E | 42 | 2 | 15 | 0.8 | 120 | 2 | 1 | ⊚ | ⊚ |
| E | 43 | 2 | 16 | 0.8 | 120 | 2 | 1 | ⊚ | ⊚ |
| C | 44 | 2 | 17 | 0.8 | 120 | 2 | 1 | ⊚ | ⊚ |
| E | 45 | 2 | 1 | 0.5 | 120 | 2 | 1 | ⊚ | ⊚ |
| E | 46 | 2 | 2 | 0.5 | 120 | 2 | 1 | ⊚ | ⊚ |
| E | 47 | 2 | 3 | 0.5 | 120 | 2 | 1 | ⊚ | ⊚ |
| E | 48 | 2 | 4 | 0.5 | 120 | 2 | 1 | ⊚ | ⊚ |

TABLE 29-3-continued

| | | | | | | | | | |
|---|---|---|---|---|---|---|---|---|---|
| E | 49 | 2 | 7 | 0.5 | 120 | 2 | 1 | ⊚ | ⊚ |
| E | 50 | 2 | 8 | 0.5 | 120 | 2 | 1 | ⊚ | ⊚ |
| E | 51 | 2 | 14 | 0.5 | 120 | 2 | 1 | ⊚ | ⊚ |
| E | 52 | 2 | 16 | 0.5 | 120 | 2 | 1 | ⊚ | ⊚ |
| E | 53 | 2 | 18 | 0.5 | 120 | 2 | 1 | ⊚ | ⊚ |
| E | 54 | 2 | 19 | 0.5 | 120 | 2 | 1 | ⊚ | ⊚ |
| E | 55 | 2 | 20 | 0.5 | 120 | 2 | 1 | ⊚ | ⊚ |
| E | 56 | 2 | 21 | 0.5 | 120 | 2 | 1 | ⊚ | ⊚ |

| | | Corrosion resistance | | Adhesiveness | | |
|---|---|---|---|---|---|---|
| Classification | No. | Without coating | After coating | Coating adhesiveness 1 | Coating adhesiveness 2 | Weldability |
| C | 39 | Δ | x | Δ | Δ | ⊚ |
| E | 40 | ○ | ○ | ⊚ | ⊚ | ⊚ |
| E | 41 | ⊚ | ⊚ | ⊚ | ⊚ | ⊚ |
| E | 42 | ⊚ | ⊚ | ⊚ | ⊚ | ⊚ |
| E | 43 | ⊚ | ⊚ | ⊚ | ⊚ | ⊚ |
| C | 44 | Δ | Δ | Δ | ○ | ⊚ |
| E | 45 | ○+ | ○ | ⊚ | ⊚ | ⊚ |
| E | 46 | ○+ | ○+ | ⊚ | ⊚ | ⊚ |
| E | 47 | ○ | ○ | ⊚ | ⊚ | ⊚ |
| E | 48 | ○ | Δ | ⊚ | ⊚ | ⊚ |
| E | 49 | ○+ | ○ | ⊚ | ⊚ | ⊚ |
| E | 50 | ○+ | ○+ | ⊚ | ⊚ | ⊚ |
| E | 51 | ⊚ | ○+ | ⊚ | ⊚ | ⊚ |
| E | 52 | ⊚ | ⊚ | ⊚ | ⊚ | ⊚ |
| E | 53 | ⊚ | ⊚ | ⊚ | ⊚ | ⊚ |
| E | 54 | ⊚ | ⊚ | ⊚ | ⊚ | ⊚ |
| E | 55 | ⊚ | ⊚ | ⊚ | ⊚ | ⊚ |
| E | 56 | ⊚ | ⊚ | ⊚ | ⊚ | ⊚ |

TABLE 29-4

| Classification | No. | Zinc phosphate composite coating steel plate *1 | Coating composition *2 | Coating weight of organic coating ($g/m^2$) | Drying temperature (° C.) | Rust-preventive oil *3 | Coating weight of rust-preventive oil ($g/m^2$) | Lubrication | Anti-powdering performance |
|---|---|---|---|---|---|---|---|---|---|
| E | 57 | 2 | 22 | 0.5 | 120 | 2 | 1 | ⊚ | ⊚ |
| E | 58 | 2 | 23 | 0.5 | 120 | 2 | 1 | ⊚ | ⊚ |
| E | 59 | 2 | 24 | 0.5 | 120 | 2 | 1 | ⊚ | ⊚ |
| E | 60 | 2 | 25 | 0.5 | 120 | 2 | 1 | ⊚ | ⊚ |
| E | 61 | 2 | 26 | 0.5 | 120 | 2 | 1 | ⊚ | ⊚ |
| E | 62 | 2 | 27 | 0.5 | 120 | 2 | 1 | ⊚ | ⊚ |
| E | 63 | 2 | 28 | 0.5 | 120 | 2 | 1 | ⊚ | ⊚ |
| E | 64 | 2 | 29 | 0.5 | 120 | 2 | 1 | ⊚ | ⊚ |
| E | 65 | 2 | 30 | 0.5 | 120 | 2 | 1 | ⊚ | ⊚ |
| E | 66 | 2 | 31 | 0.5 | 120 | 2 | 1 | ⊚ | ⊚ |
| E | 67 | 2 | 32 | 0.5 | 120 | 2 | 1 | ○ | ○ |
| E | 68 | 2 | 33 | 0.5 | 120 | 2 | 1 | ○ | ○ |
| E | 69 | 2 | 34 | 0.5 | 120 | 2 | 1 | ○ | ○ |
| E | 70 | 2 | 35 | 0.5 | 120 | 2 | 1 | ○+ | ○ |
| E | 71 | 2 | 36 | 0.5 | 120 | 2 | 1 | ⊚ | ⊚ |
| E | 72 | 2 | 37 | 0.5 | 120 | 2 | 1 | ⊚ | ⊚ |
| E | 73 | 2 | 38 | 0.5 | 120 | 2 | 1 | ⊚ | ⊚ |
| E | 74 | 2 | 39 | 0.5 | 120 | 2 | 1 | ⊚ | ⊚ |

| | | Corrosion resistance | | Adhesiveness | | |
|---|---|---|---|---|---|---|
| Classification | No. | Without coating | After coating | Coating adhesiveness 1 | Coating adhesiveness 2 | Weldability |
| E | 57 | ⊚ | ⊚ | ⊚ | ⊚ | ⊚ |
| E | 58 | ○+ | ○+ | ⊚ | ⊚ | ⊚ |
| E | 59 | ○+ | ○+ | ⊚ | ⊚ | ⊚ |
| E | 60 | ○+ | ○+ | ⊚ | ⊚ | ⊚ |
| E | 61 | ○+ | ○+ | ⊚ | ⊚ | ⊚ |
| E | 62 | ○+ | ○+ | ⊚ | ⊚ | ⊚ |
| E | 63 | ○+ | ○+ | ⊚ | ⊚ | ⊚ |

TABLE 29-4-continued

| | | | | | | |
|---|---|---|---|---|---|---|
| E | 64 | ◎ | ◎ | ◎ | ◎ | ◎ |
| E | 65 | ○ | ○ | ◎ | ◎ | ◎ |
| E | 66 | ○ | ○ | ◎ | ◎ | ◎ |
| E | 67 | ○ | ○ | ◎ | ◎ | ◎ |
| E | 68 | ○ | ○ | ◎ | ◎ | ◎ |
| E | 69 | ○ | ○ | ◎ | ◎ | ◎ |
| E | 70 | ◎ | ◎ | ◎ | ◎ | ◎ |
| E | 71 | ◎ | ○+ | ○ | ◎ | ◎ |
| E | 72 | ◎ | ○+ | ◎ | ◎ | ◎ |
| E | 73 | ◎ | ◎ | ◎ | ◎ | ◎ |
| E | 74 | ◎ | ◎ | ◎ | ◎ | ◎ |

TABLE 29-5

| Classification | No. | Zinc phosphate composite coating steel plate*1 | Coating composition*2 | Coating weight of organic coating (g/m$^2$) | Drying temperature (° C.) | Rust-preventive oil*3 | Coating weight of rust-preventive oil (g/m$^2$) | Lubrication |
|---|---|---|---|---|---|---|---|---|
| E | 75 | 2 | 40 | 0.5 | 120 | 2 | 1 | ◎ |
| E | 76 | 2 | 41 | 0.5 | 120 | 2 | 1 | ◎ |
| E | 77 | 2 | 42 | 0.5 | 120 | 2 | 1 | ◎ |
| E | 78 | 2 | 43 | 0.5 | 120 | 2 | 1 | ○ |
| E | 79 | 2 | 44 | 0.5 | 120 | 2 | 1 | ◎ |
| E | 80 | 2 | 45 | 0.5 | 120 | 2 | 1 | ○+ |
| E | 81 | 2 | 46 | 0.5 | 120 | 2 | 1 | ○+ |
| E | 82 | 2 | 47 | 0.5 | 120 | 2 | 1 | ○+ |
| E | 83 | 2 | 48 | 0.5 | 120 | 2 | 1 | ○+ |
| E | 84 | 2 | 49 | 0.5 | 120 | 2 | 1 | ◎ |
| E | 85 | 2 | 50 | 0.5 | 120 | 2 | 1 | ◎ |
| E | 86 | 2 | 51 | 0.5 | 120 | 2 | 1 | ◎ |
| E | 87 | 2 | 52 | 0.5 | 120 | 2 | 1 | ◎ |
| E | 88 | 2 | 53 | 0.5 | 120 | 2 | 1 | ◎ |
| E | 89 | 2 | 54 | 0.5 | 120 | 2 | 1 | ◎ |
| E | 90 | 2 | 55 | 0.5 | 120 | 2 | 1 | ○+ |
| E | 91 | 2 | 56 | 0.5 | 120 | 2 | 1 | ○+ |
| E | 92 | 2 | 57 | 0.5 | 120 | 2 | 1 | ○ |

| Classification | No. | Anti-powdering performance | Corrosion resistance | | Adhesiveness | | Weldability |
|---|---|---|---|---|---|---|---|
| | | | Without coating | After coating | Coating adhesiveness 1 | Coating adhesiveness 2 | |
| E | 75 | ◎ | ◎ | ◎ | ◎ | ◎ | ◎ |
| E | 76 | ◎ | ◎ | ◎ | ◎ | ◎ | ◎ |
| E | 77 | ○+ | ◎ | ○+ | ◎ | ◎ | ◎ |
| E | 78 | ○ | ○+ | ○ | ◎ | ◎ | ◎ |
| E | 79 | ○ | ◎ | ◎ | ○ | ◎ | ◎ |
| E | 80 | ○ | ◎ | ◎ | ◎ | ◎ | ◎ |
| E | 81 | ○+ | ◎ | ◎ | ◎ | ◎ | ◎ |
| E | 82 | ○+ | ◎ | ◎ | ◎ | ◎ | ◎ |
| E | 83 | ○ | ◎ | ◎ | ◎ | ◎ | ◎ |
| E | 84 | ◎ | ○ | ○ | ◎ | ◎ | ◎ |
| E | 85 | ◎ | ○+ | ○ | ◎ | ◎ | ◎ |
| E | 86 | ◎ | ◎ | ○+ | ◎ | ◎ | ◎ |
| E | 87 | ◎ | ◎ | ◎ | ◎ | ◎ | ◎ |
| E | 88 | ◎ | ◎ | ◎ | ◎ | ◎ | ◎ |
| E | 89 | ○+ | ◎ | ◎ | ◎ | ◎ | ◎ |
| E | 90 | ○+ | ○+ | ◎ | ◎ | ◎ | ◎ |
| E | 91 | ○ | ○ | ○ | ○ | ◎ | ◎ |
| E | 92 | ○ | ◎ | ◎ | ◎ | ◎ | ◎ |

TABLE 29-6

| Classification | No. | Zinc phosphate composite coating steel plate*1 | Coating composition*2 | Coating weight of organic coating (g/m$^2$) | Drying temperature (° C.) | Rust-preventive oil*3 | Coating weight of rust-preventive oil (g/m$^2$) | Lubrication |
|---|---|---|---|---|---|---|---|---|
| E | 93 | 2 | 58 | 0.5 | 120 | 2 | 1 | ○+ |
| E | 94 | 2 | 59 | 0.5 | 120 | 2 | 1 | ◎ |
| E | 95 | 2 | 60 | 0.5 | 120 | 2 | 1 | ◎ |
| E | 96 | 2 | 61 | 0.5 | 120 | 2 | 1 | ◎ |
| E | 97 | 2 | 62 | 0.5 | 120 | 2 | 1 | ◎ |
| E | 98 | 2 | 63 | 0.5 | 120 | 2 | 1 | ○+ |
| E | 99 | 2 | 64 | 0.5 | 120 | 2 | 1 | ○ |

TABLE 29-6-continued

| | | | | | | | | |
|---|---|---|---|---|---|---|---|---|
| E | 100 | 2 | 65 | 0.5 | 120 | 2 | 1 | ○ |
| C | 101 | 2 | 15 | 0 | 120 | 2 | 1 | Δ |
| E | 102 | 2 | 15 | 0.05 | 120 | 2 | 1 | ○ |
| E | 103 | 2 | 15 | 0.1 | 120 | 2 | 1 | ◎ |
| E | 104 | 2 | 15 | 0.2 | 120 | 2 | 1 | ◎ |
| E | 105 | 2 | 15 | 0.3 | 120 | 2 | 1 | ◎ |
| E | 106 | 2 | 15 | 0.7 | 120 | 2 | 1 | ◎ |
| E | 107 | 2 | 15 | 1 | 120 | 2 | 1 | ◎ |
| E | 108 | 2 | 15 | 1.5 | 120 | 2 | 1 | ◎ |
| E | 109 | 2 | 15 | 2 | 120 | 2 | 1 | ◎ |
| E | 110 | 2 | 15 | 0.5 | 40 | 2 | 1 | ○ |

| Classification | No. | Anti-powdering performance | Corrosion resistance | | Adhesiveness | | Weldability |
|---|---|---|---|---|---|---|---|
| | | | Without coating | After coating | Coating adhesiveness 1 | Coating adhesiveness 2 | |
| E | 93 | ◎ | ◎ | ◎ | ◎ | ◎ | ◎ |
| E | 94 | ○ | ◎ | ◎ | ◎ | ◎ | ◎ |
| E | 95 | ○+ | ◎ | ◎ | ◎ | ◎ | ◎ |
| E | 96 | ◎ | ◎ | ◎ | ◎ | ◎ | ◎ |
| E | 97 | ○+ | ◎ | ◎ | ◎ | ◎ | ◎ |
| E | 98 | ○+ | ◎ | ◎ | ◎ | ◎ | ◎ |
| E | 99 | ○ | ◎ | ○+ | ○ | ○ | ◎ |
| E | 100 | ○ | ○ | ○ | ◎ | ◎ | ◎ |
| C | 101 | Δ | x | x | ○ | ◎ | ◎ |
| E | 102 | ○ | ○ | ○ | ○ | ○ | ◎ |
| E | 103 | ○+ | ○ | ○ | ◎ | ◎ | ◎ |
| E | 104 | ◎ | ○+ | ○+ | ◎ | ◎ | ◎ |
| E | 105 | ◎ | ◎ | ◎ | ◎ | ◎ | ◎ |
| E | 106 | ◎ | ◎ | ◎ | ◎ | ◎ | ◎ |
| E | 107 | ◎ | ◎ | ◎ | ◎ | ◎ | ○ |
| E | 108 | ◎ | ◎ | ◎ | ◎ | ◎ | Δ |
| E | 109 | ◎ | ◎ | ◎ | ◎ | ◎ | Δ |
| E | 110 | ○ | Δ | Δ | Δ | Δ | ◎ |

TABLE 29-7

| Classification | No. | Zinc phosphate composite coating steel plate*1 | Coating composition*2 | Coating weight of organic coating (g/m$^2$) | Drying temperature (° C.) | Rust-preventive oil*3 | Coating weight of rust-preventive oil (g/m$^2$) | Lubrication |
|---|---|---|---|---|---|---|---|---|
| E | 111 | 2 | 15 | 0.5 | 50 | 2 | 1 | ◎ |
| E | 112 | 2 | 15 | 0.5 | 80 | 2 | 1 | ◎ |
| E | 113 | 2 | 15 | 0.5 | 100 | 2 | 1 | ◎ |
| E | 114 | 2 | 15 | 0.5 | 170 | 2 | 1 | ◎ |
| E | 115 | 2 | 15 | 0.5 | 200 | 2 | 1 | ◎ |
| E | 116 | 2 | 15 | 0.5 | 300 | 2 | 1 | ◎ |
| E | 117 | 2 | 15 | 0.5 | 120 | 1 | 1 | ◎ |
| E | 118 | 2 | 15 | 0.5 | 120 | 3 | 1 | ◎ |
| E | 119 | 2 | 15 | 0.5 | 120 | 4 | 1 | ◎ |
| E | 120 | 2 | 15 | 0.5 | 120 | 5 | 1 | ◎ |
| E | 121 | 2 | 15 | 0.5 | 120 | 6 | 1 | ◎ |
| E | 122 | 2 | 15 | 0.5 | 120 | 7 | 1 | ◎ |
| E | 123 | 2 | 15 | 0.5 | 120 | 8 | 1 | ◎ |
| E | 124 | 2 | 15 | 0.5 | 120 | — | — | ◎ |
| E | 125 | 2 | 15 | 0.5 | 120 | 2 | 0.01 | ◎ |
| E | 126 | 2 | 15 | 0.5 | 120 | 2 | 0.5 | ◎ |
| E | 127 | 2 | 15 | 0.5 | 120 | 2 | 3 | ◎ |
| E | 128 | 2 | 15 | 0.5 | 120 | 2 | 10 | ◎ |
| E | 129 | 2 | 15 | 0.5 | 120 | 2 | 15 | ◎ |

| Classification | No. | Anti-powdering performance | Corrosion resistance | | Adhesiveness | | Weldability |
|---|---|---|---|---|---|---|---|
| | | | Without coating | After coating | Coating adhesiveness 1 | Coating adhesiveness 2 | |
| E | 111 | ○+ | ○ | ○ | ◎ | ○ | ◎ |
| E | 112 | ◎ | ○+ | ○+ | ◎ | ◎ | ◎ |
| E | 113 | ◎ | ◎ | ◎ | ◎ | ◎ | ◎ |
| E | 114 | ◎ | ◎ | ◎ | ◎ | ◎ | ◎ |
| E | 115 | ◎ | ◎ | ◎ | ◎ | ◎ | ◎ |
| E | 116 | ◎ | ◎ | ◎ | ◎ | ◎ | ◎ |

TABLE 29-7-continued

| | | | | | | | |
|---|---|---|---|---|---|---|---|
| E | 117 | ◎ | ◎ | ◎ | ◎ | ◎ | ◎ |
| E | 118 | ◎ | ◎ | ◎ | ◎ | ◎ | ◎ |
| E | 119 | ◎ | ◎ | ◎ | ◎ | ◎ | ◎ |
| E | 120 | ◎ | ◎ | ◎ | ◎ | ◎ | ◎ |
| E | 121 | ◎ | ◎ | ◎ | ◎ | ◎ | ◎ |
| E | 122 | ◎ | ◎ | ◎ | ◎ | ◎ | ◎ |
| E | 123 | ◎ | ◎ | ◎ | ◎ | ◎ | ◎ |
| E | 124 | ○ | ◎ | ◎ | ◎ | ◎ | ◎ |
| E | 125 | ○+ | ◎ | ◎ | ◎ | ◎ | ◎ |
| E | 126 | ◎ | ◎ | ◎ | ◎ | ◎ | ◎ |
| E | 127 | ◎ | ◎ | ◎ | ◎ | ◎ | ◎ |
| E | 128 | ◎ | ◎ | ○ | ○ | ○ | ○ |
| E | 129 | ◎ | ◎ | Δ | Δ | Δ | Δ |

Preferred Embodiment 4

The inventors of the present invention investigated the zinc phosphate composite treated steel plates focusing on the relation of coating in terms of structure, corrosion resistance, lubrication, and coating adhesiveness. Thus, the inventors derived the following-described findings.

(1) As for the improvement in corrosion resistance and coating adhesiveness, it is effective to form a zinc phosphate coating on the surface of a steel plate, followed by forming a coating of a phosphate of a specified metal thereon. In particular, the corrosion resistance further improves when the phosphate coating contains a phosphate of Mg and/or Al at a specified molar ratio of Mg and/or Al to P.

(2) For improving the lubrication performance, the total coating weight including that of zinc phosphate coating and phosphate coating, which are formed on the surface of the steel plate, is important. By adjusting the total coating weight to a specified range, the lubrication performance is improved. In addition, by mixing a specified coating weight ratio of the zinc phosphate coating to the phosphate coating, the lubrication performance is further improved.

(3) By adding a silica to the phosphate coating at a specified mixing ratio, the coating adhesiveness and the corrosion resistance are further improved.

The present invention was established on the basis of above-described findings, and the present invention is characterized in the constitution described in the following.

That is, the present invention provides a phosphate composite coating steel plate having excellent corrosion resistance, lubrication, and coating adhesiveness, which steel plate comprises: a zinc-base plated steel plate; a zinc phosphate coating layer consisting mainly of zinc phosphate, formed on at least one side of the steel plate; and a phosphate coating layer consisting mainly of a phosphate of at least one metal selected from the group consisting of Mg, Al, Co, Mn, and Ca, formed on the zinc phosphate coating layer.

According to the present invention, the phosphate coating preferably contains a phosphate of Mg and/or Al metal as the main component, and further preferably contains a phosphate of Mg at molar ratios Mg/P of from 0.4/2 to 1/2, and/or a phosphate of Al at molar ratios of Mg/P of from 0.4/2 to 1/2.

Furthermore, the phosphate coating preferably contains a silica at molar ratios Si/P of from 0.01 to 1.

According to the present invention, the zinc phosphate coating preferably contains at least one metal selected from the group consisting of Ni, Ca, Mg, and Mn in a range of from 0.1 to 7 wt. %.

The total coating weight including that of above-described zinc phosphate and phosphate is preferably in a range of from 0.5 to 4 g/m$^2$. The rate of the coating weight of the zinc phosphate and the phosphate coatings, or (phosphate coating)/(zinc phosphate coating), is preferably in a range of from 1/100 to 100/100.

Furthermore, the present invention provides a phosphate composite coating steel plate having a rust-preventive oil layer at uppermost layer thereof at coating weights of from 0.01 to 10 g/m$^2$.

The detail of the present invention is described in the following giving the reasons to limit the specification.

The steel plates which become the substrate of the zinc-base plated steel plates according to the present invention include: all kinds of cold-rolled steel plates for soft-working, such as cold-rolled steel plates for general working (CQ), cold-rolled steel plates for deep drawing (DQ), cold-rolled steel plates for very deep drawing (DDQ), and cold-rolled steel plates for ultra deep drawing (EDDQ); all kinds of high tension steel plates ranging from high tension steel plates of relatively low strength level having baking-hardening property to general high tension steel plates having more than 390 MPa of tensions; and de-scaled hot-rolled steel plates.

Examples of the plating layers of the zinc-base plated steel plates are Zn plating, Zn—Ni alloy plating (9 to 15 wt. % of Ni content), Zn—Fe ally plating (5 to 25 wt. % or 60 to 90 wt. % of Fe content), Zn—Mn alloy plating (30 to 80 wt. % of Mn content), Zn—Co alloy plating (0.5 to 15 wt. % of Co), Zn—Cr ally plating (5 to 30 wt. % of Cr), Zn—Al alloy plating (3 to 60 wt. % of Al content). Each of the above-given plating compositions may further include alloying element such as Co, Fe, Ni, and Cr, and oxide or salt of silica, alumina, slightly soluble chromate, or the like, and polymer. Among the above-described plating layers, two or more layers of the same kind or different kind may be applied to form a composite layer. The plating described above may be formed by either one of electrolytic method, fusion method, and vapor phase method.

A preferred coating weight of plating is not less than 10 g/m$^2$. Less than 10 g/m$^2$ of coating weight induces problems because of poor corrosion resistance. In the case of Zn—Ni alloy plating, Zn—Fe alloy plating, Zn—Mn alloy plating, Zn—Co alloy plating, and Zn—Cr alloy plating, the anti-powdering performance degrades when the coating weight exceeds 70 g/m$^2$, so the coating weight is preferably in a range of from 10 to 70 g/m$^2$. For further improved corrosion resistance and anti-powdering performance, the coating weight is preferably in a range of from 15 to 60 g/m$^2$.

A phosphate composite coating steel plate provided by the present invention comprises: a zinc-base plated steel plate;.a zinc phosphate coating layer consisting mainly of zinc phosphate, formed on the steel plate; and a coating layer of a phosphate of a specified metal, formed on the zinc phosphate coating layer. When, however, the zinc phosphate coating as the lower layer is small in coating weight, the coating may fail to fully cover the surface of zinc-base plated steel plate, resulting in exposed plated portions. Even when the zinc phosphate coating has a coating weight to some extent, since the zinc phosphate coating itself has a porous coating structure, the exposed plated portions are left to a significant degree. Therefore, the upper layer of the zinc phosphate coating according to the present invention means not only the upper layer of the zinc phosphate coating itself but also containing the upper layer of the exposed plated portions which are not covered with the zinc phosphate coating.

The zinc-phosphate coating formed on the surface of the zinc-base steel plate improves the coating adhesiveness owing to the anchor effect, and contributes to the improvement of lubrication by preventing the direct contact between the steel plate and the tools during sliding actions.

The zinc phosphate coating according to the present invention is not specifically limited if only the coating contains zinc phosphate as a main component. Nevertheless, when further superior coating adhesiveness, corrosion resistance, and lubrication are required, it is preferable to contain at least one metal selected from the group consisting of Ni, Ca, Mg, and Mn, as a component other than Zn, to a range of from 0.1 to 7 wt. %. In particular, addition of Ni of from 1 to 4 wt. % and of Mn of from 1 to 4 wt. % significantly increases the corrosion resistance and the coating adhesiveness.

The method of zinc phosphate treatment for forming the zinc phosphate coating may be either one of reaction type treatment, coating type treatment, and electrolytic type treatment.

An example of the reaction type treatment is that a plated steel plate is subjected to degreasing, washing with water, and surface preparation treatment, followed by contacting with a treatment solution of an aqueous solution consisting mainly of: phosphoric acid ion, nitric acid ion, and zinc ion; further containing, at need, (1) and (2) given below, then washing with water and drying.

(1) At least one substance selected from the group consisting of iron ion, nickel ion, manganese ion, cobalt ion, calcium ion, and magnesium ion.

(2) At least one substance selected from the group consisting of peroxide, fluoride ion, fluorine complex ion, and nitrous acid ion.

By applying the phosphate coating consisting mainly of a specific metallic phosphate onto the upper layer of the above-described zinc phosphate layer, the corrosion resistance can be improved. Furthermore, by adding a silica to the phosphate coating, the corrosion resistance and the coating adhesiveness are further improved.

The phosphate coating is characterized in the phosphate coating consisting mainly of a phosphate of at least one metal selected from the group consisting of Mg, Al, Co, Mn, and Ca. By forming a phosphate coating of these metals, superior corrosion resistance can be obtained.

For further improving the corrosion resistance and the coating adhesiveness, the phosphate coating preferably contains a phosphate of Mg and/or Al as a main component, and particularly preferable to contain a phosphate of Mg and/or a phosphate of Al at molar ratio of Mg/P in a range of from 0.4/2 to 1/2, and at molar ratio of Al/P in a range of from 0.3/3 to 1/3. If the molar ratio Mg/P is less than 0.4/2 or the molar ratio Al/P is less than 0.3/3, the coating contains large amount of water-soluble precipitates, which degrades the corrosion resistance and the coating adhesiveness. If the molar ratio Mg/P exceeds 1/2 or the molar ratio A/P exceeds 1/3, the stability of the treatment solution to form the coating degrades. In view of non-coating corrosion resistance and coating adhesiveness, the phosphate coating further preferably contains the phosphate of Mg at a molar ratio Mg/P in a range of from 0.6/2 to 1/2, and most preferably from 0.8/2 to 1/2. In the similarview, phosphate coating further preferably contains the phosphate of Al at a molar ratio Al/P in a range of from 0.6/3 to 1/3, and most preferably from 0.6/3 to 1/3.

According to the present invention, the above-described phosphate coating further increases the non-coated corrosion resistance and the coating adhesiveness by adding a silica thereto. In view of corrosion resistance, coating adhesiveness, and lubrication, the content of silica as molar ratio Si/P is preferably in a range of from 0.01 to 1, further preferably from 0.1 to 0.6.

Applicable silica according to the present invention is not specifically limited if only the silica is dispersible in an aqueous solution of phosphate. Nevertheless, in view of stability of chemicals, colloidal silica is preferred. The average particle size of the applied silica is not specifically limited. However, in view of lubrication and anti-powdering performance, the size is preferably in a range of from 5 to 50 nm, and further preferably from 10 to 30 nm.

According to the present invention, the above-described silica becomes a main additive to the phosphate coating. Additives other than silica, however, may be mixed in the phosphate coating unless they give bad influence to the quality and the performance of the product. Examples of these additives are: a water-soluble or water-dispersible resin; an oxide colloid or powder of alumina, titania, and zirconia; an acid and/or its salt, including molybdic acid, tungstic acid, vanadic acid, boric acid, and the like; a fluoride such as zircofluoride, silicofluoride, titanfluoride; a conductive fine powder of iron phosphide, graphite, antimony-dope type tin oxide, antimony-dope type tin oxide coating titanium, antimony-dope type indium oxide, carbon black, metallic powder. These additives may be used separately or mixing two or more thereof together.

Formation of coating according to the present invention may be conducted by applying a chemical solution consisting mainly of the above-described phosphate onto at least one side of the surface of a steel plate, followed by drying. The total coating weight of the zinc phosphate coating and the phosphate coating is preferably in a range of from 0.5 to 4 $g/m^2$ per single side of the steel plate. If the total coating weight is less than 0.5 $g/m^2$, the corrosion resistance, the lubrication, and the coating adhesiveness degrade. If the total coating weight exceeds 4 $g/m^2$, the powdering increases and the lubrication degrades. In view of lubrication, corrosion resistance, and coating adhesiveness, a further preferable range of the total coating weight is from 0.8 to 2.5 $g/m^2$, and most preferable range is from 1.0 to 2.0 $g/m^2$.

According to the present invention, the ratio of coating weight of the zinc phosphate coating to the phosphate coating, or (phosphate coating)/(zinc phosphate coating), is preferably in a range of from 1/100 to 100/100. If the ratio is less than 1/100, the corrosion resistance degrades. If the ratio exceeds 100/100, the coating adhesiveness and the lubrication become poor. Further preferable range of the ratio is from 5/100 to 50/100.

The method for forming a phosphate coating is not specifically limited. An example of forming the phosphate coating is the following. Normally, the application of aqueous solution of phosphate onto the surface of a steel plate is done by roll-coater method. However, it is possible to, after applying by immersion method and spray method, adjust the coating weight by air-knife method or roll-squeezing method. The drying after applied the coating may be done by a drier, a hot-air furnace, a high frequency induction heating furnace, or an infrared furnace. A preferred drying temperature is in a range of from 40 to 300° C. as the ultimate plate temperature. If the drying temperature is lower than 40° C., the coating is insufficiently dried to induce stickiness on the coating, and the coating is damaged on touching to rolls after drying, which degrades the coating adhesiveness and the corrosion resistance. If the ultimate plate temperature exceeds 300° C., further effect cannot be expected, and the production cost becomes unfavorable. In this respect, a preferable range of baking temperature is from 50 to 200° C., most preferably from 100 to 150° C.

The present invention deals with a steel plate having the above-described coating structure on both sides or on one side thereof. Consequently, examples of the mode for carrying out the present invention are the following.

(1) One side: Steel plate surface+Zinc phosphate composite coating+Organic coating The other side: Steel plate surface+Zinc phosphate composite coating (2) One side: Steel plate surface+Zinc phosphate composite coating+Organic coating The other side: Steel plate surface (3) Both sides: Steel plate surface+Zinc phosphate composite coating+Organic coating According to the present invention, the phosphate coating layer may further be covered with a rust-preventive oil layer to further improve the corrosion resistance and the lubrication. Examples of the rust-preventive oil are a normal rust-preventive oil, a cleaning rust-preventive oil, a lubrication rust-preventive oil, which consist mainly of a rust-preventive additive (for example, oil-soluble surfactant), a petroleum-base base material (for example, mineral oil, solvent), an oil film adjuster (for example, mineral oil, crystallizing material, a viscous material), an antioxidizing agent (for example, phenol-base antioxidant), a lubricant (for example, extreme-pressure additive). Examples of the normal rust-preventive oil are a finger print removal type rust-preventive oil which is prepared by dissolving and decomposing a base material in a petroleum-base solvent, a solvent cutback type rust-preventive oil, a lubricant oil type rust-preventive oil using petrolactam and wax as the base materials, and a volatile rust-preventive oil. A preferable coating weight of the rust-preventive oil film is in a range of from 0.01 to 10 g/m$^2$. If the coating weight is less than 0.01 g/m$^2$, the effect of rust-preventive oil application cannot be attained. If the coating weight exceeds 10 g/m$^2$, the degreasing ends insufficiently, which results in poor coating adhesiveness. For attaining further superior corrosion resistance and coating adhesiveness, the coating weight is preferably in a range of from 0.5 to 3 g/m$^2$.

To the phosphate composite coating steel plate according to the present invention, further zinc phosphate treatment thereon may be applied to perform the effect of the present invention as an applicable constitution.

The effect of the present invention is described referring to embodiments in the following.

On a TI-B added IF steel plate having a plate thickness of 0.8 mm and a surface roughness (Ra) of 1.0 μm, zinc-base coating was applied to prepare a zinc-base plated steel plate having the performance of JIS SPCD equivalent. The zinc-base plated steel plate was treated by alkali degreasing and washing with water, then was subjected to surface preparation treatment (PREPAREN Z, produced by Nihon Parkerizing Co., Ltd.) Thus treated steel plate was brought into contact with a zinc phosphate treatment solution, followed by washing with water and drying to prepare the zinc phosphate-treated steel plate. A phosphate aqueous solution was applied onto the zinc phosphate-treated steel plate using a roll coater, which was then dried without washing with water. A rust-preventive oil or a cleaning oil was further applied. Thus obtained phosphate composite coating steel plate was tested to determine the lubrication, the anti-powdering performance, the corrosion resistance, and the coating adhesiveness.

Individual conditions are described below.

(1) Zinc-base Plated Steel Plates

Table 30 shows the kinds of plating and the coating weights applied onto the zinc-base plated steel plates used in the example.

(2) Zinc Phosphate Treatment

Each of the zinc-base plated steel plates was treated by spraying by and/or immersing in a zinc phosphate treatment solution having the following-given composition while adjusting the coating weight thereof by changing the treatment temperature and the treatment time. Thus, the zinc phosphate-treated steel plates shown in Table 31 were prepared.

In Table 31, *1 through *4 designate the following.

*1: Zinc plated steel plate listed in Table 30.

*2: Zinc phosphate treatment solution described in Example (2) Zinc phosphate treatment.

*3: The coating weight was determined by the method given below.

(1) Original weight of the specimen was weighed. (W1)

(2) The specimen was immersed in a de-ionized aqueous solution containing 20 g/l of ammonium bichromate and 490 g/l of 25% ammonia water, at normal temperature for 15 minutes, thus removing the zinc phosphate coating.

(3) The specimen was weighed (W2) after forming the zinc phosphate coating. The weight of the coating per unit area is calculated: (W1−W2)

*4: Fluorescent X-ray method was applied to determine the contents of the coating weight at respective stages.

Zinc Phosphate Treatment Solution 1

Phosphoric acid ion 20 g/l, nitric acid ion 3 g/l, fluorine ion 1.5 g/l, zinc ion 1.3 g/l, nickel ion 0.5 g/l, manganese ion 0.5 g/l, nitrous ion 0.3 g/l, acid ratio (total acid/free acid) 21.

Zinc Phosphate Treatment Solution 2

Phosphoric acid ion 20 g/l, nitric acid ion 3 g/l, fluorine ion 1.5 g/l, zinc ion 2.0 g/l, nickel ion 2.5 g/l, nitrous ion 0.3 g/l, acid ratio (total acid/free acid) 17.

Zinc Phosphate Treatment Solution 3

Phosphoric acid ion 30 g/l, nitric acid ion 8 g/l, fluorine ion 2.5 g/l, zinc ion 1.3 g/l, calcium ion 0.4 g/l, manganese ion 0.5 g/l, acid ratio (total acid/free acid) 9.

Zinc Phosphate Treatment Solution 4

Phosphoric acid ion 20 g/l, nitric acid ion 3 g/l, fluorine ion 1.5 g/l, zinc ion 1.3 g/l, nitrous ion 0.3 g/l, acid ratio (total acid/free acid) 21.

(3) Phosphate Treatment (3-1) Silica

Table 32 shows the silica used in the phosphate aqueous solution.

(3-2) Phosphate Treatment Aqueous Solution

Table 33 shows the compositions of the phosphate treatment aqueous solution.

(4) Rust-preventive Oil

Table 34 shows the rust-preventive oils used in the embodiment.

Table 35 shows the kinds of thus prepared phosphate composite coating steel plates and their tested performance of lubrication, anti-powdering performance, corrosion resistance, and coating adhesiveness.

The method for evaluating each characteristic is described below.

[Lubrication]

A pull-out force was determined under the sliding condition given below, to give evaluation using the formula of:

Friction factor=(Pull-out force)/(Applied force)

The evaluation criteria are the following.

(Sliding Condition)

Tool contact area: 50×10 mm

Tool material: SKD 11

Applied pressure: 400 kgf

Sliding speed: 0.2 mrmin (Evaluation Criteria)

◎: not more than 0.15

○: more than 0.15 and not more than 0.17

Δ: more than 0.15 and not more than 0.20

X: more than 0.20

[Anti-powdering Performance]

A specimen was sheared to 30 mm in width, then was tested by draw-bead test under the conditions of a tip radius of bead of 0.5 mm, a bead height of 0.4 mm, a pressing force of 500 kgf, a pull-out speed of 200 mm/min. After that, the portion of the bead subjected to sliding was tested by adhesive-tape peeling, thus determining the peeled amount of coating per unit area before and after the test. The evaluation criteria are the following.

(Evaluation Criteria)

◎: less than 2 $g/m^2$

○+: more less than 2 $g/m^2$ and less than 3 $g/m^2$

○: not less than 3 $g/m^2$ and less than 4 $g/m^2$

Δ: not less than 4 $g/m^2$ and less than 6 $g/m^2$

X: not less than 6 $g/m^2$

[Corrosion Resistance]

1) Degreasing Applied

A specimen was treated by degreasing (FCL 4460, produced by Nihon Parkerizing Co., Ltd., 45° C., immersion for 120 seconds). Edges and rear face of the specimen were sealed by adhesive tape. Then the accelerated corrosion test with cycles of combined corrosion test described below was applied to the specimen. The evaluation was given by the degree of rust generation after 10 cycles using the evaluation criteria given below.

2) Without Applying Degreasing

Edges and rear face of the specimen were sealed by adhesive tape. Then the accelerated corrosion test with cycles of combined corrosion test described below was applied to the specimen. The evaluation was given by the degree of rust generation after 10 cycles using the evaluation criteria given below.

(Combined corrosion test cycle)

| | |
|---|---|
| Salt spray | 35° C., 2 hours |
| → Drying | 60° C., 4 hours |
| → 95% RH humidification | 50° C., 2 hours |

(Evaluation Criteria)

◎: no generation of rust

○+: rust area less than 25%

○: rust area not less than 25% and less than 50%

Δ: rust area not less than 50% and less than 75%

X: rust area not less than 75%

[Coating Adhesiveness 1]

A specimen was applied by 3 coat coating described below, and was allowed to stand for 24 hours or more. Then, the specimen was immersed in an ion-exchanged water at 50° C. for 240 hours. Within 30 minutes after the specimen was taken out from the water, 100 grid cuts were given to the coating at 2 mm of spacing. Adhesive tapes were attached to the grids, and were peeled off from the grids to determine the residual coating rate. The evaluation criteria are the following.

(Coating (3 coat))

| | |
|---|---|
| Zinc phosphate treatment | SD 6500 MZ (standard condition) |
| Electrodeposition coating | V20, film thickness 20 μm |
| Intermediate coating | OT0870 (white color sealer), film thickness 35 μm |
| Top coating | OT0647PT (SHUST WHITE), film thickness 35 μm |

(Evaluation Criteria)

◎: no peeling occurred

○: peeling rate less than 3%

Δ: Peeling rate not less than 3% and less than 10%

X: peeling rate not less than 10%

[coating Adhesiveness 2]

A specimen was treated by degreasing, then was coated with a commercial coating DELICON 700 to a thickness of 30 μm. The specimen was immersed in boiling water for 120 minutes, then 100 grid cuts were given to the coating at 1 mm of spacing. The Erichsen extrusion to 5 mm was applied to the specimen. Adhesive tapes were attached to the grids, and were peeled off from the grids to determine the residual coating rate. The evaluation criteria are the following.

(Evaluation Criteria)

◎: no peeling occurred

○: peeling rate less than 3%

Δ: Peeling rate not less than 3% and less than 10%

X: peeling rate not less than 10%

Comparative Example

As a comparative example, the zinc phosphate coating steel plate same with that used in the Example was used. Specimens were prepared: one was coated with a phosphate coating layer formed by respective phosphate treatment solutions described in Nos. 17 through 21 of Table 33; another one had no coating layer; still another one is treated by the organic treatment solutions 1, 2 described below. The zinc phosphate coating steel plate which was treated by organic material was prepared by immersing the zinc phosphate-treated steel plate in the organic treatment solution 1 or 2 for 30 seconds, followed by drying in a 100° C. hot air furnace for 3 seconds.

(Organic Treatment Solution)

Organic treatment solution 1: Oxy-benzoic acid aqueous solution 1/100 mole/l.

Organic treatment solution 2: 3-methyl-5-pyrazone 1% aqueous solution 1/100 mole/l.

TABLE 30

| | Kind of plating | Coating weight |
|---|---|---|
| A | Alloyed hot dip galvanized steel plate | 60 |
| D | Electrolytically galvanized steel plate | 50 |
| C | Hot dip galvanized steel plate | 90 |
| D | Electrolytically Zn-11% Ni alloy plated steel plate | 20 |
| E | Electrolytically Zn-1% Co alloy plated steel plate | 30 |
| F | Two-layer alloyed hot dip galvanized steel plate | 5 g/m² for upper layer<br>60 g/m² for lower layer |
| G | Hot dip Zn-5% Al-0.5% Mo alloy plated steel plate | 90 |
| H | Hot dip Zn-55% Al-1.6% Si alloy plated steel plate | |

TABLE 31

| No. | Plated steel plate*1 | Zinc phosphate treatment solution*2 | Coating weight*3 (g/m²) | Ni content*4 (wt. %) | Co content*4 (wt. %) | Mg content*4 (wt. %) | Mn content*4 (wt. %) |
|---|---|---|---|---|---|---|---|
| 1 | A | 1 | 0.40 | 0.05 | — | — | 0.5 |
| 2 | B | 1 | 1.00 | 1.20 | — | — | 2.7 |
| 3 | B | 1 | 0.70 | 1.10 | — | — | 2.7 |
| 4 | C | 4 | 1.20 | — | — | — | — |
| 5 | D | 1 | 0.60 | 0.20 | — | — | 1.9 |
| 6 | E | 1 | 0.70 | 1.10 | — | — | 2.8 |
| 7 | F | 4 | 1.20 | — | — | — | — |
| 8 | G | 4 | 1.20 | — | — | — | — |
| 9 | H | 4 | 1.20 | — | — | — | — |
| 10 | B | 2 | 2.00 | 3.9 | — | — | — |
| 11 | B | 3 | 1.00 | — | 1.6 | — | 2.2 |
| 12 | B | 4 | 0.20 | — | — | — | — |
| 13 | B | 4 | 0.40 | — | — | — | — |
| 14 | B | 4 | 0.56 | — | — | — | — |
| 15 | B | 4 | 0.80 | — | — | — | — |
| 16 | B | 4 | 1.60 | — | — | — | — |
| 17 | B | 4 | 2.00 | — | — | — | — |
| 18 | B | 4 | 3.20 | — | — | — | — |
| 19 | B | 4 | 3.60 | — | — | — | — |

TABLE 32

| No. | Kind of silica | Average particle size (μm) |
|---|---|---|
| 1 | SNOWTEX OXS, produced by Nissan Chemical Industries Co., Ltd. | 6 to 8 |
| 2 | SNOWTEX OS, produced by Nissan Chemical Industries Co., Ltd. | 8 to 10 |
| 3 | SNOWTEX O, produced by Nissan Chemical Industries Co., Ltd. | 12 to 14 |
| 4 | SNOWTEX OL, produced by Nissan Chemical Industries Co., Ltd. | 40 to 50 |
| 5 | SNOWTEX OZL, produced by Nissan Chemical Industries Co., Ltd. | 70 to 90 |

TABLE 33

| | Kind of metal | Metal/P (mole ratio) | Kind of silica | Si/P (mole ratio) |
|---|---|---|---|---|
| 1 | Mg | 0.35/2 | 2 | 0.5 |
| 2 | Mg | 0.4/2 | 2 | 0.5 |
| 3 | Mg | 0.6/2 | 2 | 0.5 |
| 4 | Mg | 0.8/2 | 2 | 0.5 |
| 5 | Mg | 0.9/2 | 2 | 0.5 |
| 6 | Mg | 0.95/2 | 2 | 0.5 |
| 7 | Mg | 1.1/2 | 2 | 0.5 |
| 8 | Al | 0.27/3 | 2 | 0.5 |
| 9 | Al | 0.3/3 | 2 | 0.5 |
| 10 | Al | 0.6/3 | 2 | 0.5 |
| 11 | Al | 0.8/3 | 2 | 0.5 |

TABLE 33-continued

| | Kind of metal | Metal/P (mole ratio) | Kind of silica | Si/P (mole ratio) |
|---|---|---|---|---|
| 12 | Al | 0.96/3 | 2 | 0.5 |
| 13 | Al | 1.1/3 | 2 | 0.5 |
| 14 | Co | 1.8/2 | 2 | 0.5 |
| 15 | Mn | 0.68/2 | 2 | 0.5 |
| 16 | Ca | 0.14/2 | 2 | 0.5 |
| 17 | Ni | 1/2 | 2 | 0.5 |
| 18 | Cu | 0.96/2 | 2 | 0.5 |
| 19 | Fe | 0.8/2 | 2 | 0.5 |
| 20 | Zn | 0.7/2 | 2 | 0.5 |
| 21 | Sr | 0.74/2 | 2 | 0.5 |
| 22 | Mg | 0.9/2 | — | — |
| 23 | Mg | 0.9/2 | 2 | 0.01 |
| 24 | Mg | 0.9/2 | 2 | 0.1 |

TABLE 33-continued

| | Kind of metal | Metal/P (mole ratio) | Kind of silica | Si/P (mole ratio) |
|---|---|---|---|---|
| 25 | Mg | 0.9/2 | 2 | 0.6 |
| 26 | Mg | 0.9/2 | 2 | 1 |
| 27 | Mg | 0.9/2 | 2 | 1.2 |
| 28 | Mg | 0.9/2 | 1 | 0.5 |
| 29 | Mg | 0.9/2 | 3 | 0.5 |
| 30 | Mg | 0.9/2 | 4 | 0.5 |
| 31 | Mg | 0.9/2 | 5 | 0.5 |

TABLE 34

| No. | Name |
|---|---|
| 1 | Rust-preventive oil "NOX-RUST 530F", produced by PERKER KOUSAN |
| 2 | Rust-preventive oil "DAPHNIS OIL COAT SK", produced by Nippon Oil Co., Ltd. |
| 3 | Cleaning rust-preventive oil "PRETON R303P", produced by SUGIMURA CHEMICAL |
| 4 | Cleaning rust-preventive oil "PRETON R352L", produced by SUGIMURA CMEMICAL |

TABLE 34-continued

| No. | Name |
|---|---|
| 5 | Cleaning rust-preventive oil "RUSTCLEAN K", produced by Nippon Oil Co., Ltd. |
| 6 | Cleaning rust-preventive oil "P-1600B", produced by Nippon Oil Co., Ltd. |
| 7 | Lubrication rust-preventive oil "NOX-RUST 550HN", produced by PERKER KOUSAN |
| 8 | Lubrication rust-preventive oil "NOX-RUST Mu-10", produced by PERKER KOUSAN |

TABLE 35-1

| Classification*1 | No. | Zinc phosphate treated steel plate*2 | Phosphate treatment solution*3 | Coating weight of phosphate coating (mg/m²) | Total coating weight (g/m²) | Coating weight ratio*4 (—) | Drying temperature (° C.) | Kind of rust-preventive agent*5 |
|---|---|---|---|---|---|---|---|---|
| E | 1 | 1 | 5 | 200 | 0.6 | 50/100 | 140 | — |
| E | 2 | 2 | 5 | 500 | 1.5 | 50/100 | 140 | — |
| E | 3 | 3 | 5 | 500 | 1.2 | 41.7/100 | 140 | — |
| E | 4 | 4 | 5 | 500 | 1.7 | 29.4/100 | 140 | — |
| E | 5 | 5 | 5 | 500 | 1.1 | 45.5/100 | 140 | — |
| E | 6 | 6 | 5 | 500 | 1.2 | 41.7/100 | 140 | — |
| E | 7 | 7 | 5 | 500 | 1.7 | 29.4/100 | 140 | — |
| E | 8 | 8 | 5 | 500 | 1.7 | 29.4/100 | 140 | — |
| E | 9 | 9 | 5 | 500 | 1.7 | 29.4/100 | 140 | — |
| E | 10 | 10 | 5 | 500 | 2.5 | 20/100 | 140 | — |
| E | 11 | 11 | 5 | 500 | 1.5 | 33.3/100 | 140 | — |
| E | 12 | 2 | 1 | 300 | 1.3 | 30/100 | 140 | — |
| E | 13 | 2 | 2 | 300 | 1.3 | 30/100 | 140 | — |
| E | 14 | 2 | 3 | 300 | 1.3 | 30/100 | 140 | — |
| E | 15 | 2 | 4 | 300 | 1.3 | 30/100 | 140 | — |
| E | 16 | 2 | 6 | 300 | 1.3 | 30/100 | 140 | — |
| E | 17 | 2 | 7 | 300 | 1.3 | 30/100 | 140 | — |
| E | 18 | 2 | 8 | 300 | 1.3 | 30/100 | 140 | — |
| E | 19 | 2 | 9 | 300 | 1.3 | 30/100 | 140 | — |
| E | 20 | 2 | 10 | 300 | 1.3 | 30/100 | 140 | — |
| E | 21 | 2 | 11 | 300 | 1.3 | 30/100 | 140 | — |
| E | 22 | 2 | 12 | 300 | 1.3 | 30/100 | 140 | — |
| E | 23 | 2 | 13 | 300 | 1.3 | 30/100 | 140 | — |
| E | 24 | 2 | 14 | 300 | 1.3 | 30/100 | 140 | — |
| E | 25 | 2 | 15 | 300 | 1.3 | 30/100 | 140 | — |

| Classification*1 | No. | Coating weight (g/m²) | Lubrication | Powdering | Corrosion resistance With degreasing | Corrosion resistance Without degreasing | Coating adhesiveness 1 | Coating adhesiveness 2 |
|---|---|---|---|---|---|---|---|---|
| E | 1 | — | ○○ | ○ | ○ | ○ | ○○ | ○ |
| E | 2 | — | ○○ | ○○ | ○○ | ○○ | ○○ | ○○ |
| E | 3 | — | ○○ | ○○ | ○○ | ○○ | ○○ | ○○ |
| E | 4 | — | ○○ | ○ | ○ | ○+ | ○ | Δ |
| E | 5 | — | ○○ | ○○ | ○○ | ○○ | ○○ | ○ |
| E | 6 | — | ○○ | ○○ | ○○ | ○○ | ○○ | ○○ |
| E | 7 | — | ○○ | ○○ | ○ | ○+ | ○ | Δ |
| E | 8 | — | ○○ | ○ | ○ | ○+ | ○ | Δ |
| E | 9 | — | ○○ | ○ | ○ | ○+ | ○ | Δ |
| E | 10 | — | ○ | ○ | ○+ | ○○ | ○○ | ○ |
| E | 11 | — | ○○ | ○○ | ○+ | ○○ | ○○ | ○ |
| E | 12 | — | ○○ | ○○ | ○ | Δ | ○ | Δ |
| E | 13 | — | ○○ | ○○ | ○ | ○ | ○ | ○ |
| E | 14 | — | ○○ | ○○ | ○○ | ○ | ○ | ○ |
| E | 15 | — | ○○ | ○○ | ○○ | ○○ | ○○ | ○○ |
| E | 16 | — | ○○ | ○○ | ○○ | ○○ | ○○ | ○○ |
| E | 17 | — | Precipitate appears in the treatment solution, and difficult in forming uniform coating. | | | | | |
| E | 18 | — | ○○ | ○○ | Δ | ○ | ○ | Δ |
| E | 19 | — | ○○ | ○○ | ○ | ○ | ○ | Δ |

TABLE 35-1-continued

| | | | | | | | | |
|---|---|---|---|---|---|---|---|---|
| E | 20 | — | ○○ | ○○ | ○ | ○+ | ○○ | ○ |
| E | 21 | — | ○○ | ○○ | ○+ | ○○ | ○○ | ○○ |
| E | 22 | — | ○○ | ○○ | ○+ | ○○ | ○○ | ○○ |
| E | 23 | — | Precipitate appears in the treatment solution, and difficult in forming uniform coating. | | | | | |
| E | 24 | — | ○○ | ○○ | Δ | ○ | ○○ | ○○ |
| E | 25 | — | ○○ | ○○ | Δ | ○ | ○○ | ○○ |

*1E: Example according to the present invention.
C: Comparative Example to the present
*2Zinc phosphate treated steel plate described in Table 2.
*3Phosphate treatment solution described in Table 4.
*4Coating weight ratio = (Coating weight of phosphate invention. film)/(Coating weight of zinc phosphate coating)
*5Rust-preventive oil given in Table 5.

TABLE 35-2

| Classification*1 | No. | Zinc phosphate treated steel plate*2 | Phosphate treatment solution*3 | Coating weight of phosphate coating (mg/m²) | Total coating weight (g/m²) | Coating weight ratio*4 (—) | Drying temperature (° C.) | Kind of rust-preventive agent*5 |
|---|---|---|---|---|---|---|---|---|
| E | 26 | 2 | 16 | 300 | 1.3 | 30/100 | 140 | — |
| C | 27 | 2 | 17 | 300 | 1.3 | 30/100 | 140 | — |
| C | 28 | 2 | 18 | 300 | 1.3 | 30/100 | 140 | — |
| C | 29 | 2 | 19 | 300 | 1.3 | 30/100 | 140 | — |
| C | 30 | 2 | 20 | 300 | 1.3 | 30/100 | 140 | — |
| C | 31 | 2 | 21 | 300 | 1.3 | 30/100 | 140 | — |
| E | 32 | 2 | 22 | 300 | 1.3 | 30/100 | 140 | — |
| E | 33 | 2 | 23 | 300 | 1.3 | 30/100 | 140 | — |
| E | 34 | 2 | 24 | 300 | 1.3 | 30/100 | 140 | — |
| E | 35 | 2 | 25 | 300 | 1.3 | 30/100 | 140 | — |
| E | 36 | 2 | 26 | 300 | 1.3 | 30/100 | 140 | — |
| E | 37 | 2 | 27 | 300 | 1.3 | 30/100 | 140 | — |
| E | 38 | 2 | 28 | 300 | 1.3 | 30/100 | 140 | — |
| E | 39 | 2 | 29 | 300 | 1.3 | 30/100 | 140 | — |
| E | 40 | 2 | 30 | 300 | 1.3 | 30/100 | 140 | — |
| E | 41 | 2 | 31 | 300 | 1.3 | 30/100 | 140 | — |
| C | 42 | 2 | 5 | 0 | 1 | 0/100 | 140 | — |
| E | 43 | 2 | 5 | 7 | 1.007 | 1/100 | 140 | — |
| E | 44 | 2 | 5 | 35 | 1.035 | 5/100 | 140 | — |
| E | 45 | 2 | 5 | 350 | 1.35 | 50/100 | 140 | — |
| E | 46 | 3 | 5 | 560 | 1.26 | 80/100 | 140 | — |
| E | 47 | 3 | 5 | 700 | 1.4 | 100/100 | 140 | — |
| E | 48 | 3 | 5 | 840 | 1.54 | 120/100 | 140 | — |
| E | 49 | 12 | 5 | 200 | 0.4 | 100/100 | 140 | — |

| Classification*1 | No. | Coating weight (g/m²) | Lubrication | Powdering | Corrosion resistance With degreasing | Corrosion resistance Without degreasing | Coating adhesiveness 1 | Coating adhesiveness 2 |
|---|---|---|---|---|---|---|---|---|
| E | 26 | — | ○○ | ○○ | Δ | ○ | ○○ | ○○ |
| C | 27 | — | ○○ | ○○ | x | x | ○ | Δ |
| C | 28 | — | ○○ | ○○ | x | x | ○ | Δ |
| C | 29 | — | ○○ | ○○ | x | x | ○ | Δ |
| C | 30 | — | ○○ | ○○ | x | x | ○ | Δ |
| C | 31 | — | ○○ | ○○ | x | x | ○ | Δ |
| E | 32 | — | ○○ | ○○ | ○ | ○ | ○ | ○ |
| E | 33 | — | ○○ | ○○ | ○ | ○+ | ○○ | ○ |
| E | 34 | — | ○○ | ○○ | ○○ | ○○ | ○○ | ○○ |
| E | 35 | — | ○○ | ○○ | ○○ | ○○ | ○○ | ○○ |
| E | 36 | — | ○ | ○ | ○ | ○○ | ○○ | ○ |
| E | 37 | — | ○ | Δ | ○ | ○ | ○ | ○ |
| E | 38 | — | ○○ | ○○ | ○○ | ○○ | ○○ | ○○ |
| E | 39 | — | ○○ | ○○ | ○○ | ○○ | ○○ | ○○ |
| E | 40 | — | ○ | ○ | ○○ | ○○ | ○○ | ○○ |
| E | 41 | — | ○ | Δ | ○○ | ○○ | ○○ | ○○ |
| C | 42 | — | ○ | Δ | x | x | ○○ | ○○ |
| E | 43 | — | ○ | ○ | ○ | ○ | ○○ | ○○ |
| E | 44 | — | ○○ | ○○ | ○○ | ○○ | ○○ | ○○ |
| E | 45 | — | ○○ | ○○ | ○○ | ○○ | ○○ | ○○ |

TABLE 35-2-continued

| Classification*1 | No. | Coating weight (g/m²) | Lubrication | Powdering | Corrosion resistance With degreasing | Corrosion resistance Without degreasing | Coating adhesiveness 1 | Coating adhesiveness 2 |
|---|---|---|---|---|---|---|---|---|
| E | 46 | — | ○○ | ○ | ○○ | ○○ | ○○ | ○○ |
| E | 47 | — | ○ | Δ | ○○ | ○○ | ○ | ○ |
| E | 48 | — | ○ | Δ | ○○ | ○○ | ○ | Δ |
| E | 49 | — | Δ | ○ | Δ | ○ | ○ | Δ |

TABLE 35-3

| Classification*1 | No. | Zinc phosphate treated steel plate*2 | Phosphate treatment solution*3 | Coating weight of phosphate coating (mg/m²) | Total coating weight (g/m²) | Coating weight ratio*4 (—) | Drying temperature (° C.) | Kind of rust-preventive agent*5 |
|---|---|---|---|---|---|---|---|---|
| E | 50 | 13 | 5 | 100 | 0.5 | 25/100 | 140 | — |
| E | 51 | 14 | 5 | 140 | 0.7 | 25/100 | 140 | — |
| E | 52 | 15 | 5 | 200 | 1 | 25/100 | 140 | — |
| E | 53 | 16 | 5 | 400 | 2 | 25/100 | 140 | — |
| E | 54 | 17 | 5 | 500 | 2.5 | 25/100 | 140 | — |
| E | 55 | 18 | 5 | 800 | 4 | 25/100 | 140 | — |
| E | 56 | 19 | 5 | 900 | 4.5 | 25/100 | 140 | — |
| E | 57 | 1 | 5 | 200 | 0.6 | 50/100 | 140 | 1 |
| E | 58 | 1 | 5 | 200 | 0.6 | 50/100 | 140 | 2 |
| E | 59 | 1 | 5 | 200 | 0.6 | 50/100 | 140 | 3 |
| E | 60 | 1 | 5 | 200 | 0.6 | 50/100 | 140 | 4 |
| E | 61 | 1 | 5 | 200 | 0.6 | 50/100 | 140 | 5 |
| E | 62 | 1 | 5 | 200 | 0.6 | 50/100 | 140 | 6 |
| E | 63 | 1 | 5 | 200 | 0.6 | 50/100 | 140 | 7 |
| E | 64 | 1 | 5 | 200 | 0.6 | 50/100 | 140 | 8 |
| E | 65 | 1 | 5 | 200 | 0.6 | 50/100 | 140 | 2 |
| E | 66 | 1 | 5 | 200 | 0.6 | 50/100 | 140 | 2 |
| E | 67 | 1 | 5 | 200 | 0.6 | 50/100 | 140 | 2 |
| E | 68 | 1 | 5 | 200 | 0.6 | 50/100 | 140 | 2 |
| E | 69 | 1 | 5 | 200 | 0.6 | 50/100 | 140 | 2 |
| E | 70 | 2 | 5 | 300 | 1.3 | 30/100 | 30 | — |
| E | 71 | 2 | 5 | 300 | 1.3 | 30/100 | 40 | — |
| E | 72 | 2 | 5 | 300 | 1.3 | 30/100 | 50 | — |
| E | 73 | 2 | 5 | 300 | 1.3 | 30/100 | 100 | — |
| E | 74 | 2 | 5 | 300 | 1.3 | 30/100 | 150 | — |
| E | 75 | 2 | 5 | 300 | 1.3 | 30/100 | 200 | — |
| E | 76 | 2 | 5 | 300 | 1.3 | 30/100 | 300 | — |
| C | 77* | 2 | Organic treatment solution 1 | — | — | — | — | — |
| C | 78* | 2 | Organic treatment solution 2 | — | — | — | — | — |

| Classification*1 | No. | Coating weight (g/m²) | Lubrication | Powdering | Corrosion resistance With degreasing | Corrosion resistance Without degreasing | Coating adhesiveness 1 | Coating adhesiveness 2 |
|---|---|---|---|---|---|---|---|---|
| E | 50 | — | ○ | ○ | Δ | ○ | ○ | Δ |
| E | 51 | — | ○○ | ○○ | ○ | ○ | ○ | Δ |
| E | 52 | — | ○○ | ○○ | ○○ | ○+ | ○ | Δ |
| E | 53 | — | ○○ | ○○ | ○○ | ○+ | ○ | Δ |
| E | 54 | — | ○○ | ○ | ○○ | ○+ | ○ | Δ |
| E | 55 | — | ○ | Δ | ○○ | ○+ | ○ | Δ |
| E | 56 | — | Δ | Δ | ○○ | ○+ | Δ | Δ |
| E | 57 | 1 | ○○ | ○○ | ○ | ○○ | ○○ | ○ |
| E | 58 | 1 | ○○ | ○○ | ○ | ○○ | ○○ | ○ |
| E | 59 | 1 | ○○ | ○ | ○ | ○+ | ○○ | ○ |
| E | 60 | 1 | ○○ | ○○ | ○ | ○+ | ○○ | ○ |
| E | 61 | 1 | ○○ | ○ | ○ | ○+ | ○○ | ○ |
| E | 62 | 1 | ○○ | ○ | ○ | ○+ | ○○ | ○ |
| E | 63 | 1 | ○○ | ○○ | ○ | ○○ | ○○ | ○ |
| E | 64 | 1 | ○○ | ○○ | ○ | ○+ | ○○ | ○ |
| E | 65 | 0.01 | ○○ | ○ | ○ | ○ | ○○ | ○ |
| E | 66 | 0.5 | ○○ | ○○ | ○ | ○○ | ○○ | ○ |
| E | 67 | 3 | ○○ | ○○ | ○ | ○○ | ○○ | ○ |
| E | 68 | 10 | ○○ | ○○ | ○ | ○○ | ○ | ○ |
| E | 69 | 15 | ○○ | ○○ | ○+ | ○○ | Δ | Δ |
| E | 70 | — | ○ | Δ | Δ | Δ | ○○ | ○ |
| E | 71 | — | ○ | ○ | Δ | ○ | ○○ | ○ |
| E | 72 | — | ○○ | ○ | ○ | ○ | ○○ | ○ |
| E | 73 | — | ○○ | ○○ | ○○ | ○○ | ○○ | ○○ |

TABLE 35-3-continued

| | | | | | | | | |
|---|---|---|---|---|---|---|---|---|
| E | 74 | — | ○○ | ○○ | ○○ | ○○ | ○○ | ○○ |
| E | 75 | — | ○○ | ○○ | ○○ | ○○ | ○○ | ○○ |
| E | 76 | — | ○○ | ○○ | ○○ | ○○ | ○○ | ○○ |
| C | 77* | — | Δ | Δ | x | Δ | ○○ | ○○ |
| C | 78* | — | Δ | Δ | x | Δ | ○○ | ○○ |

*No. 77 and No. 78 were treated by immersing the sample in the organic treatment solution 1 and 2, respectively, for 30 seconds, followed by drying (in 100° C. hot air furnace for 3 seconds).

What is claimed is:

1. A phosphate-treated steel plate comprising:

a zinc-base plated steel plate;

a zinc phosphate coating layer having a coating weight of from 0.2 to 2.5 g/$m^2$, containing at least one metal selected from the group consisting of nickel, manganese and magnesium, formed on the surface of the zinc-base plated steel plate; and an organic coating comprising at least one organic resin selected from the group consisting of an ethylene-base resin, an epoxy-base resin, a urethane-base resin and an acrylic-base resin, formed on the zinc phosphate coating layer, the organic coating having a coating weight of 0.05 to 1.5 g/$m^2$.

2. The phosphate-treated steel plate of claim 1, wherein said at least one selected from the group consisting of nickel, manganese, and magnesium is contained in an amount of 0.5 to 8.5 mass % in the zinc phosphate coating layer.

3. The phosphate-treated steel plate of claim 1, wherein the organic coating contains a rust-preventive additive.

4. The phosphate-treated steel plate of claim 3, wherein the organic coating contains the rust-preventive additive at 1 to 100 parts by weight as solid content to 100 parts by weight of the organic resin.

5. The phosphate-treated steel plate of claim 3, wherein the rust-preventive additive is at least one substance selected from the group consisting of silica and phosphate.

6. The phosphate-treated steel plate of claim 5, wherein the silica is at least one substance selected from the group consisting of ion-exchanged silica, fumed silica, and colloidal silica.

7. The phosphate-treated steel plate of claim 6, wherein the ion-exchanged silica is Ca-exchanged silica.

8. The phosphate-treated steel plate of claim 5, wherein the phosphate is at least one substance selected from the group consisting of a phosphate of calcium, of aluminum, and of zinc.

9. The phosphate-treated steel plate of claim 1, wherein the organic coating contains a solid lubricant.

10. The phosphate-treated steel plate of claim 9, wherein the organic coating contains the solid lubricant at 1 to 80 parts by weight as solid content to 100 parts by weight of the organic resin.

11. The phosphate-treated steel plate of claim 9, wherein the solid lubricant is at least one selected from the group consisting of polyethylene wax, tetrafluoroethylene resin, and boron nitride.

12. The phosphate-treated steel plate of claim 11, wherein the polyethylene wax has a softening point of from 100 to 135° C.

13. The phosphate-treated steel plate of claim 9, wherein the solid lubricant has an average particle size of from 0.05 to 25 μm.

14. The phosphate-treated steel plate of claim 1 further comprising a rust-preventive oil film layer on the organic coating at coating weights of from 0.01 to 10 g/$m^2$.

15. The phosphate-treated steel plate of claim 1, wherein at least one of the organic resins is an ethylene-base resin.

16. The phosphate-treated steel plate of claim 1, wherein at least one of the organic resins is an urethane-base resin.

17. The phosphate-treated steel plate of claim 1, wherein at least one of the organic resins is an acrylic-base resin.

18. The phosphate-treated steel plate of claim 1, wherein at least one of the organic resins is an epoxy-base resin.

19. The phosphate-treated steel plate of claim 18, wherein the epoxy-base resin is a block urethane-modified resin prepared by mixing a modified epoxy resin (A) comprising an epoxy resin, a multifunctional amine, and a monoisocyanate, and a block urethane (B) comprising a polyol, a polyisocyanate, and a block agent, at mixing rates (A/B) of from 95/5 to 50/50 (weight ratio of nonvolatile matter).

20. The phosphate-treated steel plate of claim 19, wherein the epoxy-base resin is prepared by mixing 5 to 80 parts by weight (solid content) of a polyisocyanate compound having at least two isocyanate groups in a molecule thereof, and 100 parts by weight (solid content) of a substrate resin in at least one basic nitrogen atom and at least two primary hydroxide groups are added to a terminal of the molecular chain of the epoxy resin.

21. A phosphate-treated steel plate comprising:

a zinc-base plated steel plate;

a zinc phosphate coating layer having a coating weight of from 0.2 to 2.5 g/$m^2$, containing at least one metal selected from the group consisting of nickel, manganese, and magnesium, formed on the surface of the zinc-base plated steel plate; and an organic coating consisting (i) of a block polyurethane-modified epoxy resin prepared by mixing a modified epoxy resin (A) comprising an epoxy resin, a multifunctional amine, and a monoisocyanate and a block urethane (B) comprising a polyol, a polyisocyanate and a block agent, at a mixing ratio of (A)/(B) of from 95/5 to 50/50 in terms of a weight ratio of nonvolatile matter and (ii) optionally at least one of a rust-preventive additive and a solid lubricant, formed on the zinc phosphate coating layer, the organic coating having a coating weight of 0.05 to 1.5 g/$m^2$.

22. The phosphate-treated steel plate of claim 21, wherein the zinc phosphate coating contains 0.5 to 8.5 mass % of at least one substance selected from the group consisting of nickel, manganese, and magnesium.

23. The phosphate-treated steel plate of claim 21, wherein the organic coating contains a rust-preventive additive.

24. The phosphate-treated steel plate of claim 23, wherein the organic coating contains the rust-preventive additive at 1 to 100 parts by weight as solid content to 100 parts by weight of the block urethane-modified epoxy resin.

25. The phosphate-treated steel plate of claim 23, wherein the rust-preventive additive is a hydrophilic silica.

26. The phosphate-treated steel plate of claim 23, wherein the rust-preventive additive is a silica having specific surface areas of from 20 to 1000 $m^2$/g.

27. The phosphate-treated steel plate of claim 21, wherein the organic coating contains a solid lubricant.

28. The phosphate-treated steel plate of claim 27, wherein the organic coating contains the solid lubricant at 1 to 80 parts by weight as solid content to 100 parts by weight of the organic resin.

29. The phosphate-treated steel plate of claim 27, wherein the solid lubricant is at least one substance selected from the group consisting of polyethylene wax, tetrafluoroethylene resin, and boron nitride.

30. The phosphate-treated steel plate of claim 29, wherein the polyethylene wax has softening points of from 100 to 135° C.

31. The phosphate-treated steel plate of claim 27, wherein the solid lubricant has average particle sizes of from 0.05 to 25 μm.

32. The phosphate-treated steel plate of claim 21 further comprising a rust-preventive oil film layer on the organic coating at coating weights of from 0.01 to 10 $g/m^2$.

33. A phosphate-treated steel plate comprising:

a zinc-base plated steel plate;

a zinc phosphate coating layer having a coating weight of from 0.2 to 2.5 $g/m^2$, containing at least one metal selected from the group consisting of nickel, manganese and magnesium, formed on the surface of the zinc-base plated steel plate; and an organic coating consisting of (i) an epoxy-base resin prepared by mixing 100 parts by weight as solid content of a substrate resin in which at least one basic nitrogen atom and at least two primary hydroxyl groups are added to a terminal of the molecular chain thereof, and 5 to 80 parts by weight as solid content of a polyisocyanate compound having at least two isocyanate groups in a single molecule thereof and (ii) optionally at least one of a rust-preventive additive and a solid lubricant formed on the zinc phosphate coating layer, the organic coating having a coating weight of 0.05 to 1.5 $g/m^2$.

34.The phosphate-treated steel plate of claim 33, wherein the zinc phosphate coating contains 0.5 to 8.5 mass % of at least one selected from the group consisting of nickel, manganese, and magnesium.

35. The phosphate-treated steel plate of claim 34, wherein the organic coating contains a rust-preventive additive.

36. The phosphate-treated steel plate of claim 35, wherein the rust-preventive additive is at least one selected from the group consisting of a silica and a phosphate.

37. The phosphate-treated steel plate of claim 36, wherein the silica is dry silica.

38. The phosphate-treated steel plate of claim 36, wherein the silica is Ca-exchanged silica.

39. The phosphate-treated steel plate of claim 36, wherein the silica has specific surface areas of from 20 to 1000 $m^2/g$.

40. The phosphate-treated steel plate of claim 36, wherein the silica is at least one selected from the group consisting of a phosphate of calcium, of aluminum, and of zinc.

41. The phosphate-treated steel plate of claim 35, wherein the organic coating contains the rust-preventive additive at 1 to 100 parts by weight as solid content to 100 parts by weight of the organic resin.

42. The phosphate-treated steel plate of claim 33, wherein the organic coating contains a solid lubricant.

43. The phosphate-treated steel plate of claim 42, wherein the solid lubricant is at least one selected from the group consisting of polyethylene wax, tetrafluoroethylene resin, and boron nitride.

44. The phosphate-treated steel plate of claim 42, wherein the polyethylene wax has softening points of from 100 to 135° C.

45. The phosphate-treated steel plate of claim 42, wherein the solid lubricant has an average particle size of from 0.05 to 25 μm.

46. The phosphate-treated steel plate of claim 33, wherein the polyisocyanate compound is a polyfunctional polyisocyanate compound having at least three isocyanate groups in a single molecule thereof.

47. The phosphate-treated steel plate of claim 46, wherein the polyfunctional polyisocyanate compound is a polyfunctional polyisocyanate compound having at least four isocyanate groups in a single molecule thereof.

48. The phosphate-treated steel plate of claim 46, wherein the polyfunctional polyisocyanate compound is a polyfunctional polyisocyanate compound having at least six isocyanate groups in a single molecule thereof.

49. The phosphate-treated steel plate of claim 33, wherein the polyfunctional polyisocyanate compound is a polyfunctional body of a hexamethylene diisocyanate having at least six isocyanate groups in a single molecule thereof.

50. The phosphate-treated steel plate of claim 42, wherein the organic coating contains the solid lubricant at 1 to 80 parts by weight as solid content to 100 parts by weight of the organic resin.

51. The phosphate-treated steel plate of claim 33 further comprising a rust-preventive oil film layer on the organic coating at coating weights of from 0.01 to 10 $g/m^2$.

52. A phosphate-treated steel plate comprising:

a zinc-base plated steel plate;

a zinc phosphate coating consisting essentially of zinc phosphate, formed on the steel plate; and a phosphate coating consisting essentially of a phosphate of at least one metal selected from the group consisting of Mg, Al, Co, Mn, and Ca, formed on the zinc phosphate coating.

53. The phosphate-treated steel plate of claim 52, wherein the phosphate coating contains a phosphate of Mg at molar ratios (Mg/P) of from 0.4/2 to 1/2.

54. The phosphate-treated steel plate of claim 52, wherein the phosphate coating contains a phosphate of Al at molar ratios (Al/P) of from 0.3/3 to 1/3.

55. The phosphate-treated steel plate of claim 52, wherein the phosphate coating contains a silica at molar ratios (Si/P) of from 0.01 to 1.

56. The phosphate-treated steel plate of claim 52, wherein the phosphate coating contains at least one metal selected from the group consisting of Ni, Ca, Mg, and Mn, in a range of from 0.1 to 7% by weight.

57. The phosphate-treated steel plate of claim 52, wherein the coating weight of total coatings, which is the sum of the coating weight of the zinc phosphate coating and the coating weight of the phosphate coating, is in a range of from 0.5 to 4 $g/m^2$.

58. The phosphate-treated steel plate of claim 52, wherein the ratio of the coating weight of the phosphate coating to the coating weight of the zinc phosphate coating is in a range of from 1/100 to 100/100.

59. The phosphate-treated steel plate of claim 52 further comprising a rust-preventive oil film layer at coating weights of from 0.01 to 10 $g/m^2$ on the phosphate coating.

* * * * *

UNITED STATES PATENT AND TRADEMARK OFFICE

CERTIFICATE OF CORRECTION

PATENT NO. : 6,509,099 B1
DATED : January 21, 2003
INVENTOR(S) : Urata et al.

It is certified that error appears in the above-identified patent and that said Letters Patent is hereby corrected as shown below:

<u>Column 108</u>,
Line 27, delete "19" and insert -- 18 --.

<u>Column 109</u>,
Line 42, delete "34" and insert -- 33 --.
Line 44, delete "35" and insert -- 33 --.

Signed and Sealed this

Twenty-second Day of March, 2005

JON W. DUDAS
*Director of the United States Patent and Trademark Office*